US012604376B2

(12) United States Patent
Frederixon et al.

(10) Patent No.: US 12,604,376 B2
(45) **Date of Patent: *Apr. 14, 2026**

(54) MICROWAVE HEATING APPLIED TO MINING AND RELATED FEATURES

(71) Applicant: A.L.M. Holding Co., Onalaska, WI (US)

(72) Inventors: Drew J. Frederixon, Rockland, WI (US); Gerald H. Reinke, La Crosse, WI (US); Jacob G. Hehir, Holmen, WI (US); Michael R. Byrnes, Sarona, WI (US); Vernon R. Hegg, Plymouth, MN (US)

(73) Assignee: A.L.M. HOLDING COMPANY, Onalaska, WI (US)

( * ) Notice: Subject to any disclaimer, the term of this patent is extended or adjusted under 35 U.S.C. 154(b) by 791 days.

This patent is subject to a terminal disclaimer.

(21) Appl. No.: 17/901,256

(22) Filed: Sep. 1, 2022

(65) Prior Publication Data

US 2023/0074184 A1 Mar. 9, 2023

Related U.S. Application Data

(60) Provisional application No. 63/241,745, filed on Sep. 8, 2021.

(51) Int. Cl.
*H05B 6/80* (2006.01)
*H05B 6/76* (2006.01)
(Continued)

(52) U.S. Cl.
CPC ................ *H05B 6/80* (2013.01); *H05B 6/76* (2013.01); *H05B 6/78* (2013.01); *H05B 6/707* (2013.01)

(58) Field of Classification Search
CPC . H05B 6/707; H05B 6/76; H05B 6/78; H05B 6/784; H05B 6/80
(Continued)

(56) References Cited

U.S. PATENT DOCUMENTS

| | | | |
|---|---|---|---|
| 3,239,643 | A | 3/1966 | Kluck |
| 3,665,141 | A | 5/1972 | Schiffmann et al. |

(Continued)

FOREIGN PATENT DOCUMENTS

| | | | |
|---|---|---|---|
| CA | 2051445 | A1 | 10/1990 |
| CA | 2660700 | A1 | 2/2008 |

(Continued)

OTHER PUBLICATIONS

Jankovic et al., "The Effects of Microwave Radiation on Microbial Cultures," Hospital Pharmacology-International Multidisciplinary Journal, vol. 1, No. 2, Jan. 2014, pp. 102-108.

(Continued)

*Primary Examiner* — Quang T Van
(74) *Attorney, Agent, or Firm* — Kagan Binder, PLLC

(57) ABSTRACT

A system for processing precursor material, including at least one microwave generator, at least one microwave guide operatively connecting the at least one microwave generator to at least a first conveyor unit, and the first conveyor unit provided in a first housing that comprises at least one opening configured to receive microwave energy via a first microwave guide. The first conveyor unit is configured to receive and process a quantity of precursor material, which includes heating the precursor material to a first temperature by applying microwave energy to the precursor material within the first housing.

20 Claims, 33 Drawing Sheets

(51) Int. Cl.
*H05B 6/78* (2006.01)
*H05B 6/70* (2006.01)

(58) Field of Classification Search
USPC ....... 219/759, 678, 680, 684, 690, 695, 696, 219/697, 698, 700
See application file for complete search history.

(56) References Cited

U.S. PATENT DOCUMENTS

| | | | | |
|---|---|---|---|---|
| 3,774,003 | A | 11/1973 | Kaufman | |
| 3,856,275 | A | 12/1974 | Dydzyk | |
| 4,176,267 | A | 11/1979 | Rueggeberg | |
| 4,180,718 | A | 12/1979 | Hanson | |
| 4,246,462 | A | 1/1981 | Meisel | |
| 4,252,459 | A | 2/1981 | Jeppson | |
| 4,253,005 | A | 2/1981 | Gordon et al. | |
| 4,276,093 | A | 6/1981 | Pickermann | |
| 4,319,856 | A | 3/1982 | Jeppson | |
| 4,338,869 | A * | 7/1982 | Hoskinson | F23G 5/00 110/346 |
| 4,395,025 | A | 7/1983 | Watanabe et al. | |
| 4,488,027 | A | 12/1984 | Dudley et al. | |
| 4,619,550 | A | 10/1986 | Jeppson | |
| 4,808,782 | A | 2/1989 | Nakagawa et al. | |
| 4,861,955 | A | 8/1989 | Shen | |
| 5,083,870 | A | 1/1992 | Sindelar et al. | |
| 5,092,706 | A | 3/1992 | Bowen et al. | |
| 5,120,217 | A | 6/1992 | O'Brien et al. | |
| 5,242,493 | A | 9/1993 | Glynn et al. | |
| 5,270,000 | A | 12/1993 | Goldner et al. | |
| 5,303,999 | A | 4/1994 | Nath et al. | |
| 5,352,275 | A | 10/1994 | Nath et al. | |
| 5,447,388 | A | 9/1995 | Rouse | |
| 5,810,471 | A | 9/1998 | Nath et al. | |
| 5,843,287 | A | 12/1998 | Wicks et al. | |
| 5,902,510 | A | 5/1999 | Balbaa et al. | |
| 6,186,700 | B1 | 2/2001 | Omann | |
| 6,207,462 | B1 | 3/2001 | Barclay et al. | |
| 6,262,405 | B1 | 7/2001 | Wicks et al. | |
| 6,349,658 | B1 | 2/2002 | Tyer | |
| 6,455,826 | B1 | 9/2002 | Araya et al. | |
| 6,618,957 | B2 | 9/2003 | Novak et al. | |
| 6,768,089 | B2 | 7/2004 | Minobe et al. | |
| 7,081,605 | B2 | 7/2006 | Fritts et al. | |
| 7,432,483 | B2 | 10/2008 | Wilson | |
| 7,758,235 | B1 | 7/2010 | Collette | |
| 7,927,465 | B2 | 4/2011 | Novak | |
| 7,931,806 | B2 | 4/2011 | Logan et al. | |
| 8,101,893 | B2 | 1/2012 | Bogdan | |
| 8,490,904 | B2 | 7/2013 | Liubakka et al. | |
| 8,575,525 | B2 | 11/2013 | Mackay et al. | |
| 8,585,788 | B2 | 11/2013 | Drozd et al. | |
| 8,586,898 | B2 | 11/2013 | Novak | |
| 9,314,231 | B2 | 4/2016 | O'Neil et al. | |
| 9,624,625 | B2 | 4/2017 | Coe | |
| 9,642,194 | B2 | 5/2017 | Wilber et al. | |
| 10,081,920 | B2 | 9/2018 | Coe | |
| 10,155,866 | B2 | 12/2018 | Le et al. | |
| 10,214,786 | B2 | 2/2019 | Logan et al. | |
| 10,239,331 | B1 | 3/2019 | Gervais et al. | |
| 10,294,616 | B2 | 5/2019 | Crupi et al. | |
| 11,198,977 | B2 | 12/2021 | Eliot | |
| 12,058,799 | B2 | 8/2024 | Hegg | |
| 12,144,093 | B2 | 11/2024 | Hegg | |
| 12,144,094 | B2 | 11/2024 | Hegg | |
| 12,324,083 | B2 | 6/2025 | Frederixon et al. | |
| 2002/0046474 | A1 | 4/2002 | Novak et al. | |
| 2002/0191481 | A1 | 12/2002 | Cox et al. | |
| 2007/0122235 | A1 | 5/2007 | Kasahara et al. | |
| 2010/0020630 | A1 | 1/2010 | Musil | |
| 2011/0290788 | A1 | 12/2011 | Klemarewski | |
| 2012/0029252 | A1 | 2/2012 | Lissianski et al. | |
| 2013/0056987 | A1 | 3/2013 | Novak | |
| 2013/0336720 | A1 | 12/2013 | Jack et al. | |
| 2013/0343145 | A1 | 12/2013 | Villalobos Davila | |
| 2014/0119829 | A1 | 5/2014 | Eliot | |
| 2014/0146632 | A1 | 5/2014 | Eliot | |
| 2014/0263779 | A1 | 9/2014 | Svec et al. | |
| 2015/0164108 | A1 | 6/2015 | Logan et al. | |
| 2015/0237684 | A1 | 8/2015 | Huber | |
| 2017/0182531 | A1 * | 6/2017 | Hurlin | B09B 3/40 |
| 2018/0017323 | A1 | 1/2018 | Whitney et al. | |
| 2018/0187385 | A1 | 7/2018 | Reinke et al. | |
| 2018/0343713 | A1 | 11/2018 | Swiergon et al. | |
| 2019/0017233 | A1 | 1/2019 | Coe | |
| 2019/0100886 | A1 | 4/2019 | Eliot | |
| 2019/0274195 | A1 | 9/2019 | Magana | |
| 2019/0297922 | A1 * | 10/2019 | Takeda | A23B 2/10 |
| 2019/0320508 | A1 | 10/2019 | Vickers et al. | |
| 2019/0373926 | A1 | 12/2019 | Druga et al. | |
| 2021/0007190 | A1 | 1/2021 | Hegg | |
| 2022/0136183 | A1 | 5/2022 | Eliot | |
| 2022/0256662 | A1 | 8/2022 | Frederixon et al. | |
| 2023/0126550 | A1 | 4/2023 | Frederixon et al. | |
| 2023/0210145 | A1 | 7/2023 | Frederixon et al. | |
| 2023/0211040 | A1 | 7/2023 | Frederixon et al. | |
| 2023/0328853 | A1 | 10/2023 | Hegg | |
| 2023/0345593 | A1 | 10/2023 | Hegg | |
| 2024/0080950 | A1 | 3/2024 | Frederixon et al. | |

FOREIGN PATENT DOCUMENTS

| | | | |
|---|---|---|---|
| CL | 2017000155 | A1 | 7/2017 |
| CL | 202103591 | A1 | 10/2022 |
| CL | 2023000379 | A1 | 7/2023 |
| CN | 201172789 | Y | 12/2008 |
| CN | 102690699 | A | 9/2012 |
| CN | 106309136 | A | 1/2017 |
| CN | 206204738 | U | 5/2017 |
| CN | 108547199 | A | 9/2018 |
| CN | 107673927 | B | 10/2018 |
| DE | 2627588 | B2 | 12/1977 |
| DE | 3505570 | C1 | 1/1991 |
| EP | 0529285 | A1 | 7/1992 |
| EP | 1611788 | A1 | 1/2006 |
| EP | 2689833 | A2 | 1/2014 |
| EP | 2920533 | B1 | 6/2018 |
| EP | 2318487 | B1 | 5/2019 |
| FR | 2522798 | A1 | 9/1983 |
| FR | 2755450 | A1 | 5/1998 |
| IN | 102658077 | A | 9/2012 |
| JP | S45-014954 | B | 5/1970 |
| JP | S50-154545 | U | 12/1975 |
| JP | 852-97653 | U | 7/1977 |
| JP | S61-158091 | U | 9/1986 |
| JP | H06-000147 | B | 1/1994 |
| JP | H07-505193 | A | 6/1995 |
| JP | 2008518930 | A | 6/2008 |
| KR | 2010-0133842 | A | 12/2010 |
| KR | 101030187 | B1 | 4/2011 |
| KR | 101089213 | B1 | 12/2011 |
| KR | 101251102 | B1 | 4/2013 |
| KR | 10-2015-0098455 | A | 8/2015 |
| WO | 90/12602 | A1 | 11/1990 |
| WO | 1993009647 | A1 | 5/1993 |
| WO | 93/10952 | A1 | 6/1993 |
| WO | 1996034241 | A1 | 10/1996 |
| WO | 2006050122 | A1 | 5/2006 |
| WO | 2006057563 | A1 | 6/2006 |
| WO | 2011036773 | A1 | 3/2011 |
| WO | 2013166489 | A1 | 11/2013 |
| WO | 2013166490 | A2 | 11/2013 |
| WO | 2016/003583 | A1 | 1/2016 |
| WO | 2016/012334 | A1 | 1/2016 |
| WO | 2017165664 | A1 | 9/2017 |
| WO | 2018154094 | A1 | 8/2018 |
| WO | 2018/170218 | A1 | 9/2018 |
| WO | 2020/106263 | A1 | 5/2020 |
| WO | 2021003250 | A2 | 1/2021 |
| WO | 2022/245348 | A1 | 11/2022 |
| WO | 2022/250663 | A1 | 12/2022 |
| WO | 2023/069159 | A1 | 4/2023 |

(56) References Cited

FOREIGN PATENT DOCUMENTS

WO 2023/133182 A1 7/2023
WO 2023/133186 A1 7/2023
WO 2023/249650 A2 12/2023

OTHER PUBLICATIONS

U.S. Appl. No. 17/782,830, filed Jun. 6, 2022, naming inventors Drew J. Frederixon et al.
International Search Report and Written Opinion of International Application No. PCT/US2022/042334, mailed Feb. 6, 2024, 14 pp.
Wang et al., "Impact of Thermal Pretreatment Temperatures on Woody Biomass Chemical Composition, Physical Properties, and Microstructure," Energies, vol. 11, No. 1, Dec. 2017, 20 pp.
Wisconsin Department of Natural Resources (WI DNR) Chapter NR 204—Domestic Sewage Sludge Management, May 2011, No. 665, May 2011, 13 pp.
Zafar, S., "Thermal Conversion of Biomass," BioEnergy Consult—Powering a Greener Future, Sep. 2021, 10 pp.
Zhang et al., "Liquefaction of Biomass and Upgrading of Bio-Oil: A Review," Molecules, vol. 24, No. 12, Jun. 2019, 30 pp.
"Animal Feeding Operations—Uses of Manure," National Pollutant Discharge Elimination System (NPDES), United States Environmental Protection Agency (EPA), Jan. 2022, 12 pp.
"Animal Product Manual" from the USDA Animal and Plant Health Inspection Service, U.S. Department of Agriculture, Second Edition issued 2014, 730 pp. (Filed in 8 parts).
"Bedding Options for Dairy Cows," UMass Extension Crops, Dairy, Livestock, and Equine Program, CDLE Pub. 11-48, retrieved from https://ag.umass.edu/sites/ag.umass.edu/files/fact-sheets/pdf/BeddingOptionsforDairyCows(11-48 on Dec. 28, 2021, 2 pp.
"Conveyorized Modular Industrial Microwave Power Systems," from Thermex Thermatron, accessed from https://thermex-thermatron.com/industrial-microwave-systems, on Apr. 10, 2019, 1 pp.
"DM-6: Lesson 12 Physical Methods—Thermal Processing," Module 4. Microbiology of food preservation, from Food and Industrial Microbiology, Nov. 2012, retrieved from http://ecoursesonline.iasri.res.in/mod/page/view.php?id=5130 on Jan. 2021, 10 pp.
"Environmental Regulations and Technology—Control of Pathogens and Vector Attraction in Sewage Sludge," United States Environmental Protection Agency (EPA) Section 503.32, Jul. 2003, 186 pp.
European Union Animal By-Products Regulations (Regulation 1069/2009), Oct. 2009, 62 pp.
"Food Additive Status List," United States Food and Drug Administration (FDA) Food Additive Status List, retrieved from https://www.fda.gov/food/food-additives-petitions/food-additive-status-list current as of Aug. 2021, retrieved Jan. 2022, 99 pp.
"Food additives," from the World Health Organization dated Jan. 31, 2018, retrieved from https://who.it/news-room/fact-sheets/detail/food-additives on Dec. 29, 2021, 4 pp.
"Good Practices for the Feed Industry, Implementing the Codex Alimentarius Code of Practice on Good Animal Feeding," FAO Animal Production and Health Manual, Food and Agriculture Organization of the United Nations and International Feed Industry Federation, 2010, 106 pp.
"Heating, ventilation, and air conditioning," Wikipedia, retrieved from https://en.wikipedia.org/wiki/Heating,_ventilation,_and_air_conditioning on Sep. 7, 2020, 17 pp.
"Industrial Microwaves Information-Industrial Microwave Systems Components," from Cellencor, Apr. 10, 2019, 1 pp.
Seed Heat-Treatment: A Management Strategy for Controlling Bacterial Diseases, Sustainable Farming on the Urban Fringe, Jan. 2012, retrieved from https://sustainable-farming.rutgers.edu/seed-heat-treatment-manage-bacterial-diseases/ on Apr. 20, 2022, 4 pp.
"Mechanical Heat Treatment of Municipal Solid Waste," from Department for Environment Food and Rural Affairs (Defra), 2007, 32 pp.
"Thermal Pre-treatment of Biomass for Large-scale Applications, Summary and Conclusions form the IEA Bioenergy ExCo66 Workshop," IEA Bioenergy: ExCo: 2011:05, Oct. 2010, 24 pp.
Whitepaper entitled "Thermal Processing of Food," from Safefood 360°, Inc., 2014, 23 pp.
Aramideh, S., "Numerical simulation of biomass fast pyrolysis in fluidized bed and auger reactors," Thesis for degree of Master of Science at lowa State University, Jan. 2014, 121 pp.
Baiano, A., "Recovery of Biomolecules from Food Wastes—A Review," Molecules, vol. 19, No. 9, Sep. 2014, 22 pp.
Code of Federal Regulations, Chapter 21, Part 112—Standards for the Growing, Harvesting, Packing, and Holding of Produce for Human Consumption, May 2022, 50 pp.
Code of Federal Regulations, Chapter 40, Part 503—Standards for the Use of Disposal of Sewage Sludge, May 2022, 47 pp.
Carlson et al., "Bedding Recovery From Manure: The Solution To Livestock Bedding," Feeco International, retrieved from https://feeco.com/bedding-recovery-from-manure-the-solution-to-livestock-bedding/ on Dec. 28, 2021, 5 pp.
Data Sheet entitled "80dB Stainless steel RFI shielding Aaronia X-Steel," from Aaronia AG, Rev. 1.6, dated Jun. 1, 2015, 3 pp.
Data Sheet entitled "Fireproof Shielding Fabric Aaronia Mesh," from Aaronia AG, Rev. 1.1, dated Sep. 19, 2014, 3 pp.
Doran et al., "Chapter 7. Treatments to Promote Seed Germination," from Handbook on Seeds of Dry-Zone Acacias: A Guide for Collecting, Extracting, Cleaning, and Storing the Seed and for Treatment to Promote Germination of Dry-zone Acacias, 1983, retrieved from http://www.fao.org/3/q2190e/q2190e07.htm on Apr. 20, 2022, 11 pp.
Drygas et al., "The impact of heat treatment on the components of plant biomass as exemplified by Junniperus sabina dn Picea abies," Econtechmod: An International Quarterly Journal on Economics of Technology and Modelling Processes, vol. 5, No. 3, Jul. 2016, 10 pp.
European Directive 86/278/EEC of Jun. 12, 1986 on the protection of the environment, and in particular of the soil, when sewage sludge is used in agriculture, Document 31986L0278, 7 pp.
European Directive 91/271/EEC of May 21, 1991 concerning urban waste-water treatment, Document 31991L0271, 13 pp.
European Directive 2008/98/EC of the European Parliament and of the Council of Nov. 19, 2008 on waste and repealing certain Directives (Text with EEA relevance), Document 32008L0098, 28 pp.
Hassani et al., "The influence of microwave irradiation on rocks for microwave-assisted underground excavation," Journal of Rock Mechanics and Geotechnical Engineering, vol. 8, No. 1, Dec. 2015, 15 pp.
John et al., "Understanding microwave induced sorting of porphyry copper ores," Minerals Engineering, vol. 84, Dec. 2015, 37 pp.
Kingman, S., "Recent developments in microwave processing of minerals," International Materials Reviews, vol. 51, No. 1, Feb. 2006, 12 pp.
Koleini et al., Chapter 4, "Microwave Heating Applications in Mineral Processing," The Development and Application of Microwave Heating, Edited by Wenbin Cao, Nov. 2012, 26 pp.
Kostas et al., "The application of microwave heating in bioenergy: A review on the microwave pre-treatment and upgrading technologies for biomass," Renewable and Sustainable Energy Reviews, vol. 77, Apr. 2017, 63 pp. (Paper).
Kouhkannejad, M., "Post-thermal application of feed additives," from All About Feed, Aug. 17, 2020, retrieved from https://www.allaboutfeed.net/animal-feed/feed-processing/post-thermal-application-of-feed-additives/ on Apr. 20, 2022, 6 pp.
Kwong et al., "Combustion of Biomass in Fluidized Beds: A Review of Key Phenomena and Future Perspectives," Energy & Fuels, vol. 35, No. 20, Oct. 2021, 32 pp.
Leach et al., "Recycling manure as cow bedding: Potential benefits and risks for UK dairy farms," The Veterinary Journal, vol. 206, No. 2, Nov. 2015, 8 pp.
Li et al., "Effectiveness of microwave-assisted thermal treatment in the extraction of gold in cyanide tailings," Journal of Hazardous Materials, vol. 384, Oct. 2019, 3 pp. Abstract Only.

(56) References Cited

OTHER PUBLICATIONS

Masthoff et al., "A systematic review of the effect of thermal processing on the allergenicity of tree nuts," Allergy European Journal of Allergy and Clinical Immunology, vol. 68, No. 8, Aug. 2013, 11 pp.
McGrath, M., "Heat Treating Seeds for Disease Management," by Cornell University, retrieved from http://vegetablemdonline.ppath.cornell.edu/NewsArticles/Hot-Water-Seed-Trt_McGrath_2016-17f56dy.pdf on Apr. 20, 2022, 38 pp.
Ozkoc et al., "Chapter 20—Recent Developments in Microwave Heating," Emerging Technologies for Food Processing (Second Edition), Aug. 2014, 23 pp.
Reyes et al., "Heat-Assisted Batch Settling of Mineral Suspensions in Inclined Containers," Minerals, vol. 9, No. 4, Apr. 2019, 19 pp.
Satish, H., "Exploring Microwave Assisted Rock Breakage for Possible Space Mining Applications," Thesis for the degree of Master of Engineering, for McGill University, Jun. 2005, 128 pp.
Setyawan, E., "Torrefaction of Biomass: An Overview," BioEnergy Consult—Powering a Greener Future, Jan. 2022, 7 pp.
Smeenk et al., "Experience with Atmospheric Fluidized Bed Gasification of Switchgrass," BioEnergy '98 conference, Dec. 1998, 9 pp. found at https://www.osti.gov/servletspurl/334227.
Taqi et al., "Understanding microwave heating in biomass-solvent systems," Chemical Engineering Journal, vol. 393, Mar. 2020, 10 pp.
Teimoori et al., "Twenty years of experimental and numerical studies on microwave-assisted breakage of rocks and minerals—a review, " arXiv: Applied Physics, Nov. 2020, 43 pp.
Tumuluru et al., "Formulation, Pretreatment, and Densification Options to Improve Biomass Specifications for Co-Firing High Percentages with Coal," Industrial Biotechnology, vol. 8, No. 3, Jun. 2012, 20 pp.
United States Code, Title 33, Navigation and Navigable Waters, Chapter 26, Water Pollution Prevention and Control, 1972, 233 pp. (Filed in 10 parts).
Vorster, W., "The Effect of Microwave Radiation on Mineral Processing," Thesis for the degree of Doctor of Philosophy at the University of Birmingham, Jun. 2001, 256 pp.
Vorster et al., "The effect of microwave radiation upon the processing of Neves Corvo copper ore," International Journal of Mineral Processing, vol. 63, No. 1, Jun. 2001, pp. 29-44. (Abstract Only).
Office Action from counterpart Chilean Application No. 2024-00677, dated Sep. 25, 2025, 23 pp.
International Preliminary Report on Patentability of International Application No. PCT/US2022/042334, mailed Mar. 21, 2024, 9 pp.
Office Action from counterpart Bolivia Application No. SP 172-2022, dated Jan. 15, 2025, 12 pp.

* cited by examiner

700

700

800

800

802

MICROWAVE HEATING APPLIED TO MINING AND RELATED FEATURES

CROSS REFERENCE TO RELATED APPLICATIONS

This application claims priority to and the benefit of U.S. Provisional Patent Application No. 63/241,745, filed Sep. 8, 2021, the entire contents of which is incorporated herein by reference in its entirety.

BACKGROUND

Microwave energy can be radiated within an enclosure to process materials. Molecular agitation within the material resulting from its exposure to microwave energy provides energy to heat, dry, weaken, expand, fracture, etc. the material. Applying a desired amount of microwave energy to the material can take a certain amount of time based on various factors, e.g., general or specific to the intended use of the material in its final processed form.

Many industrial microwave heating applications require that there be access apertures into the enclosure so that materials may be continuously transported utilizing such as, for example, a conveyor unit or other mechanism. Some government agencies allocate frequency bands centered at 915 MHz and 2450 MHz for use in microwave heating systems. The intensity of the microwave energy that is permitted to leak is sometimes restricted to less than 10 milliwatts (mW) per centimeter squared.

There is a desire for suppression of microwave energy from these apertures. Continuous microwave heating arrangements have presented a problem that is more complex than the suppression of microwave energy from a simpler batch microwave system.

While applying microwave heating to materials, such as moisture-containing particles, a problem can include preventing microwaves from escaping to an inlet and/or an outlet/discharge region from a channel or region where the microwaves are applied. This can be handled at present by introducing material through a metal grate including two by two inch (5.1 by 5.1 cm) square channels. The same type of grate and channels can be employed on an outlet end. However, these grates have limitations. For example, granular materials or particles (such as moisture-laden granular materials) are sometimes introduced through a square channel system. In these systems, a blockage or slowdown in the process can occur. For instance, larger chunks of material may have difficulty passing through the grates unless the size of the grate's square metal channels are increased accordingly.

Other technological approaches are currently used to prevent potential harmful effects of microwave emissions, but can be less flexible than desirable. For example, other ways of suppressing microwave energy from escaping from a microwave system as a product or material is moving through can include, for example, water jackets or reflectors.

There remains a desire to improve microwave suppression, especially in continuous microwave heating systems. There also remains a desire to provide modular and/or portable heating systems that can be flexibly deployed as needed.

It is also known that at present, mining operations and sometimes related material processing often leads to large stockpiles of unused and/or mining materials (e.g., gangue, tailings, overburden, slurries, etc.) that result from mining of desirable minerals for extraction from ore or the like.

Material recovery and mining can use heat to improve mineral, metal, gemstone, etc. separation or extraction, e.g., copper from copper tailings.

There also exist challenges related to mobile deployment of heating systems for mining and related material processing, particularly in areas where a reliable permanent power source may not be present or accessible.

Furthermore, where heat is used to assist mineral and material extraction, much energy is used and often wasted. Heating of mining related materials is often very energy intensive. Processing costs can therefore be improved for mining when by making heating more efficient. Therefore, many challenges remain.

SUMMARY

This disclosure relates to microwave-based heating methods and systems for improving mineral, metal, gemstone, rock and other valuable material or natural resource extraction from various precursor materials especially as applied to various mining and processing operations. Microwave heating can be used for various mining uses and can provide effective and efficient improvements to mining, separation, extraction, and other processing of otherwise difficult and/or expensive to process materials, including minerals, metals, and the like.

In particular, aspects of this disclosure relate to a continuous system for using a microwave heating process at the point of extraction, such as at or near a mining site or precursor material repository, such as a pile, silo, vessel, trucking operations, or railroad car or facility. Alternatively, the microwave heating process can be conducted at a processing facility located a distance from a mining site, for example. The disclosed material processing systems can be used in any suitable location, and can be stationary/permanent or mobile in various embodiments. Also disclosed and contemplated are batch-type systems for heating and/or fracturing various raw precursor materials from which desirable minerals, metals, materials, and the like can be extracted.

According to the present disclosure, modular heating systems can be arranged to be sequentially configured as multiple conveyor units, mechanical processors, and lifting units. Further arrangements provide at least partially parallel arrangements of multiple conveyor units, optionally in combination with sequential arrangements. Disclosed embodiments are fully scalable according to particular desired requirements, specifications, and circumstances.

Also disclosed are embodiments of a microwave energy suppression tunnel and system with one or more flexible or bendable (e.g., steel) microwave reflecting components, such as mesh flaps, for substantially reducing or preventing the leakage of microwave energy from a microwave vessel, e.g., on a conveyor unit, while having a continuous flow of material through the vessel and suppression tunnels. The suppression tunnels can be installed on the inlet and the outlet side of the vessel and are sized to suppress leakage of the microwaves produced by the microwave system, whatever the size of the constituent parts or chunks of the material.

Stated differently, embodiments of the invention include the addition of at least one microwave energy suppression tunnel configured for substantially preventing the leakage of microwave energy from one or more access openings in a microwave energized system while the material to be heated is flowing, e.g., continuously, through the microwave vessel, including, for example, a trough of a conveyor unit also fitted with a helical auger. The suppression tunnel can be used at inlets and/or outlets of the microwave energy system, and in some embodiments each suppression tunnel comprises a rectangular, U-shaped, or other suitably shaped tunnel about three feet or more in length installed flat or at an angle of preferably no more than about 45 degrees with multiple plies or layers of steel or other microwave material, such as metallic shielding mesh attached to the inner top of the rectangular or U-shaped tunnel or trough. The size of materials to be heated can be used as a guideline for adjusting tunnel or trough size for various embodiments. The tunnel and trough of the heating system can be sized and shaped differently in various embodiments.

Flexible or bendable mesh shielding (e.g., in the form of flaps) can be spaced at various intervals and be the same cross-sectional size as the tunnel in which they are mounted. The shielding mesh preferably operates to absorb, deflect, or block various frequency ranges, preferably from about 1 MHz to 50 GHz in radio frequency (RF) and low frequency (LF) electric fields.

Comminution (e.g., crushing or grinding), mixing, sizing, sorting, screening, transporting, filtering, blending, cooling/freezing, and/or introduction of liquids (e.g., quenching or saturation for freezing) steps are also contemplated in order to improve material processing and extraction performance. Optionally, the application of microwave energy and heating as disclosed herein can be continuous and/or pulsed or otherwise varied according to various material characteristics and the like.

According to a first aspect of the present disclosure, a system for processing precursor material is disclosed. According to the first aspect, the system includes a material inlet and a material outlet. The system also includes at least a first conveyor unit associated with at least one of the material inlet and the material outlet. The system also includes at least one microwave generator. The system also includes at least a first microwave guide operatively connecting the at least one microwave generator to at least the first conveyor unit. According to the first aspect, the first conveyor unit is provided in a first housing that includes at least one microwave opening configured to receive microwave energy via at least the first microwave guide. Also, according to the first aspect, at least one microwave suppression system is associated with the first conveyor unit. According to the first aspect, each microwave suppression system includes a tunnel associated with at least one of the material inlet and the material outlet, and at least one flexible and/or movable microwave reflecting component included within the tunnel, where at least a portion of the at least one microwave reflecting component is configured to be deflected as a quantity of precursor material passes through the tunnel and then to return to a resting, closed position when the precursor material is no longer passing through the tunnel. Also, according to the first aspect, the first conveyor unit is configured to receive and process the precursor material, the processing including heating the precursor material to at least a first temperature by applying microwave energy to the precursor material within the first housing.

According to a second aspect of the present disclosure an apparatus for processing precursor material is disclosed. According to the second aspect, the apparatus includes a material inlet and a material outlet. The apparatus also includes a conveyor unit including an auger having an auger shaft provided along an auger rotational axis, the auger configured to rotate in a direction such that a quantity of precursor material received at the conveyor unit is caused to be transported according to the auger rotational axis. The apparatus also includes at least one microwave energy generator, each microwave energy generator being operatively connected to at least a respective microwave guide configured to cause microwaves emitted by the microwave energy generator to heat the precursor material within the conveyor unit by converting the microwaves to heat when absorbed by at least a portion of the precursor material within the conveyor unit. The apparatus also includes at least a first microwave suppression system including a tunnel associated with at least one of the material inlet and material outlet, where the first microwave suppression system includes at least one flexible and/or movable microwave reflecting component within the tunnel, where the at least one microwave reflecting component is configured to absorb, deflect, or block microwave energy, and where the at least one microwave reflecting component is configured to be deflected as the precursor material passes through the tunnel and then to return to a resting, closed position when the precursor material is no longer passing through the tunnel. Also, according to the second aspect, the precursor material is heated using the microwave energy, and where the precursor material is caused to a) be heated to at least a first temperature or b) to receive sufficient energy to reach a first reaction point, by the microwaves emitted by the at least one microwave generator.

According to a third aspect of the present disclosure, a method of processing precursor material using microwave energy is disclosed. According to the third aspect, the method includes receiving a quantity of precursor material at a conveyor unit, where the precursor material passes through at an inlet microwave suppression tunnel before entering the conveyor unit, where the inlet microwave suppression tunnel includes at least one flexible and/or movable inlet microwave reflecting component within the inlet microwave suppression tunnel, and where the at least one inlet microwave reflecting component is configured to absorb, deflect, or block microwave energy. The method also includes deflecting the at least one inlet microwave reflecting component as the precursor material passes through the inlet microwave suppression tunnel and then optionally returning the at least one inlet microwave reflecting component to a resting, closed position when the precursor material is no longer passing through the inlet microwave suppression tunnel. The method also includes transporting the precursor material using at least the conveyor unit. The method also includes heating the precursor material within at least the conveyor unit using at least one microwave generator operatively connected to a respective microwave guide configured to cause microwaves emitted by the microwave energy generator to heat the precursor material within at least the conveyor unit by converting the microwaves to heat when absorbed by at least a portion of the precursor material within at least the conveyor unit. The method also includes causing the precursor material to exit through an outlet microwave suppression tunnel after the precursor material is heated such that at least a portion of the precursor material: a) reaches a first temperature and/or b) undergoes a reaction within at least the conveyor unit.

DETAILED DESCRIPTION

Figure 1:
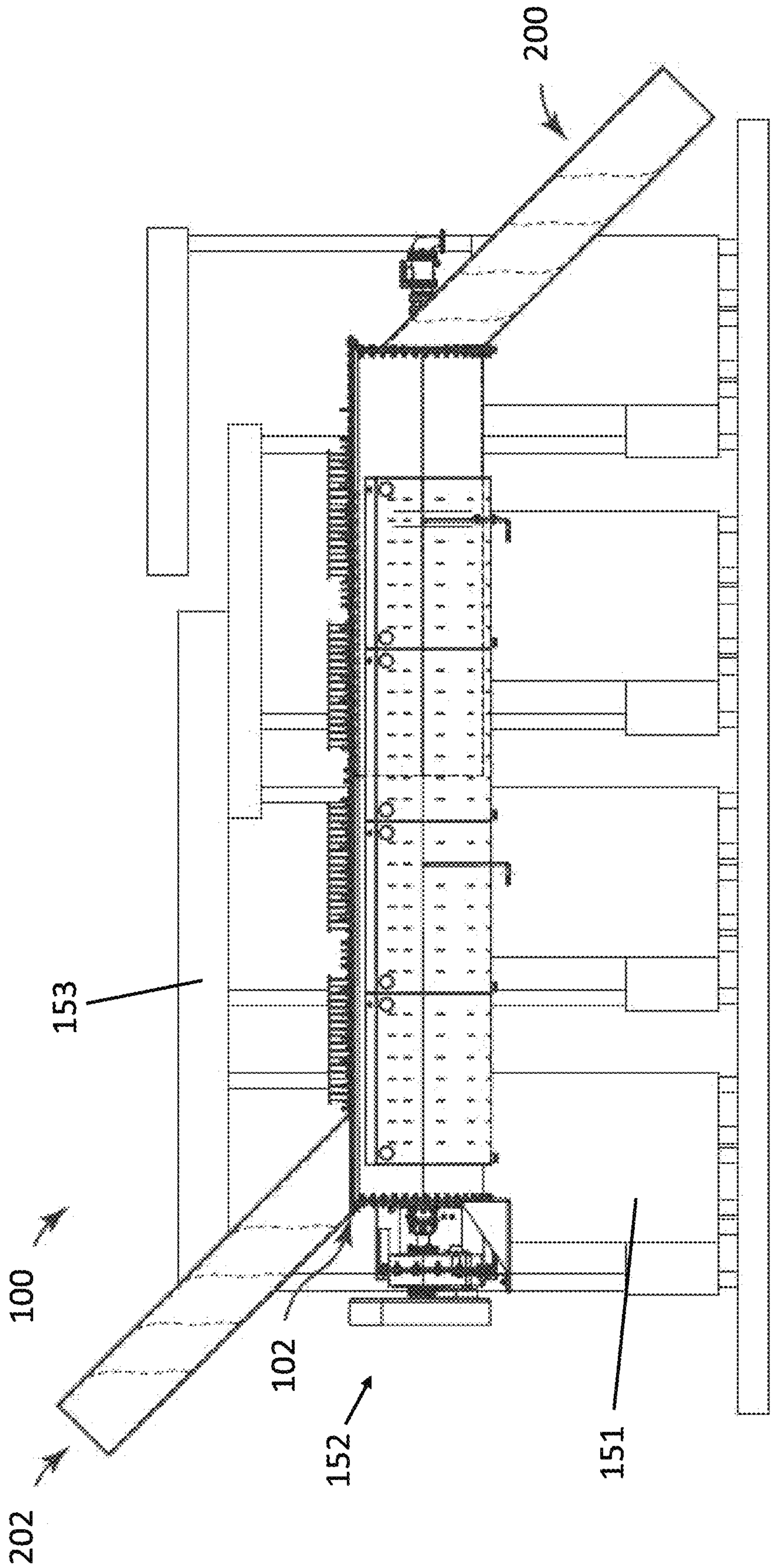
FIG. 1 is a side view of a continuous material processing system, according to various embodiments.
Figure 2:
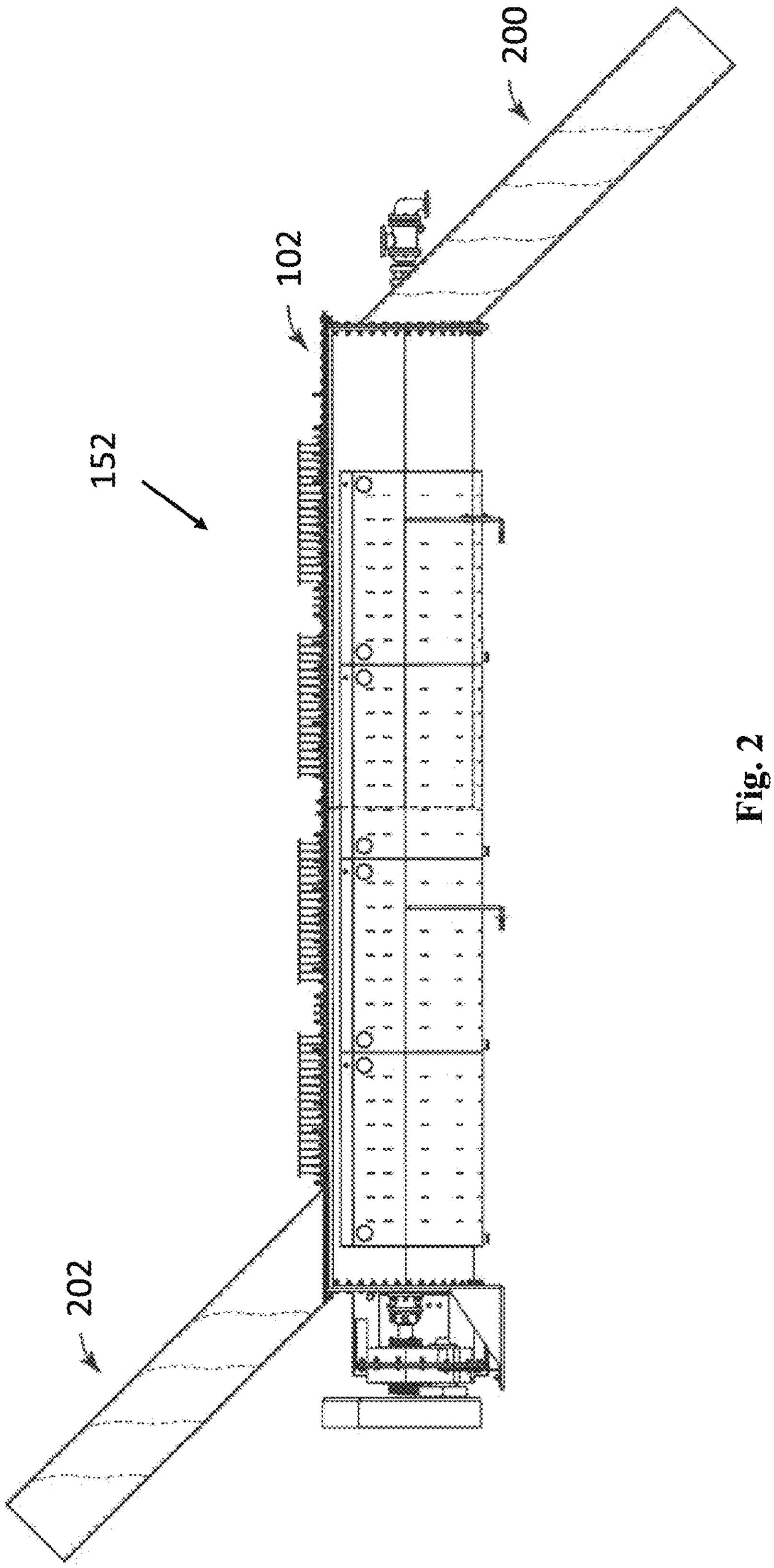
FIG. 2 is a side view of trough and suppression tunnel components of the continuous material processing system of FIG. 1

According to the present disclosure, many challenges currently exist in processing materials, particularly mined materials, metals, and minerals which in initial or raw/rough form are generally referred to more generally as precursor materials in this disclosure. Precursor materials, such as copper tailings, can be received for processing before (or in some cases after) initial breakage, mining, removal, or extraction, such as rough extraction. For example, pure copper can be extracted from copper tailings, which can contain desirable copper in addition to other substances and materials. In some cases, precursor materials can contain more than one desirable constituent substances, which may be desirable to extract and/or isolate from other substances within a precursor material, e.g., both copper and nickel.

Processing materials as contemplated herein includes heating (or otherwise applying energy to) an extracted mineral-based material or composition, e.g., based on a quantity, chemical composition of material, moisture content, a desired final heating temperature, fracture point, other physical or chemical reaction, desired or observed temperature, state, or the like, using microwave energy while continuously moving the material during processing.

As used herein, material can refer to any mineral or substance of value that can be removed, extracted, mined, or otherwise sourced from natural or artificial deposits as known in the art, for example in rough precursor material form. For example, material can refer to any geological mineral, metal, gemstone, and other valuable material especially that is found naturally in the ground or any type of deposit. Desirable minerals can be found in various assemblages of various mineralizations and the like, including various ores, lodes, veins, seams, reefs, placer deposits, tailings, overburden, and the like. Deposits containing primary and any number of secondary ores and assemblages of materials are contemplated herein. It is common that at least some desirable material would be discarded incidentally during various stages of mining and/or processing. Furthermore, a precursor material in some cases can be previously processed, such as copper tailings and the like. In such a case a precursor material is in a second (or third, etc.) processing phase, and can be beneficially reprocessed according to embodiments herein.

Although various forms of material processing using microwave energy are contemplated in this disclosure, removal of precursor materials from a source (e.g., a mine or other deposit, including natural deposits, is generally referred to as "removal" in this disclosure, and processing and further breaking down and separation of materials once removed is referred to herein as "extraction," among other terminology such as "fracturing," "liberation," "loosening," etc. According to various embodiments of the present disclosure it is possible to use microwave heating methods and systems to more fully extract the valuable portions from the non-valuable (or secondary) portions of mined precursor materials. It is known that most materials contain at least some electrons and are thus able to be heated using microwave energy.

Precursor materials, or materials more generally in this disclosure, include minerals and ores among any number of other materials, any of which include metals, coals, oil shales, gemstones, limestone, chalk, dimension stone, rock salt, potash, gravel, clay, among others. Examples of metals that can be extracted and/or processed as described herein, include but are not limited to gold, silver, platinum, copper (e.g., as found incorporated in copper tailings, porphyry copper deposits, etc.), aluminum, and nickel, among many others. Materials as used in this disclosure can include one or more of the following, combinations and variations thereof, among any other material that can be sourced or mined; barium, bauxite, cobalt, fluorite, halite, iron ore, lead, lithium, manganese (including ore), mica, pickle, pyrite, quartz, silica/silicon, lanthanum, cerium, praseodymium, neodymium, promethium, samarium, europium, gadolinium, terbium, dysprosium, holmium, erbium, thulium, ytterbium, lutetium, sodium carbonate, sulfur, tantalum, titanium, uranium, vanadium, zeolite, zinc, gypsum, rhodium. Gems are also contemplated, such as amethyst, diamond, emerald, opal, ruby, turquoise, rose quartz, sapphire, etc. Yet other materials contemplated include sand, phosphate rock and other phosphors, feldspar, beryllium, molybdenum, zirconium, magnesium, chromium, strontium, bismuth, mercury, tin, tungsten, niobium, cadmium, gallium, iridium, tellurium, sulfide ores, cassiterite, and any rare earth elements, metals, etc.

As used herein, an initial material to be processed for extraction can be referred to as a precursor, raw, or rough material, tailing, or the like. A desirable and/or valuable material, such as a mineral or metal, to be extracted can be generally referred to in this disclosure as a resulting extracted or separated material or constituent substance or material thereof. Various materials for processing can be flowable, or partially flowable, whether in liquid or solid form, including dust or very small particles. Comminution or other mechanical processing of materials can further make materials relatively more flowable (e.g., smaller particle or chunk size of the material) as desired.

In various embodiments of processing using the application of microwave energy, a precursor material containing one or more type of desired material to be extracted is heated to a point such that the component minerals, metals, or the like of the precursor material matrix fracture more easily for separation and/or sorting; making desired material(s) more accessible in the process. One concept of heat-assisted materials processing is referred to as thermally-assisted liberation (TAL). For instance, various materials have corresponding coefficients of thermal expansion that vary from other materials, causing relative movement and separation during heating and extraction.

Optionally, water or other liquid is added to a precursor material, before, during, or after microwave heating/processing. For example, water or other liquid or fluid can be used to rapidly cool or "quench" the heated materials to further assist fracture and/or separation of valuable materials from non-valuable parts to be discarded and/or processed further for various purposes. In other embodiments, liquid can optionally be added to precursor materials, after which the precursor materials with or without the liquid are intentionally cooled below ambient temperature (e.g., freezing). This rapid cooling process can occur before or after heating to allow for easier extraction. Various cooling steps can occur before or after introduction of precursor material to one or more conveyor units described herein. Liquids such as water typically expand upon reaching their freezing point(s), converting thermal energy to mechanical energy; thus, providing a mechanism for size reduction of precursor materials. In some embodiments, the liquid is introduced to the precursor materials to partially or fully saturate the precursor material (e.g., into a slurry or slurry-like flowable composition), followed a freezing step, and then followed by a rapid heating (e.g., using microwaves) to the point of a phase change of at least he introduced liquid into gaseous steam.

Although liberation, separation, and extraction are contemplated, any form thermally-assisted processing of any material for any purpose, including removal, is also contemplated herein. Microwave heat-assisted comminution or other types of microwave-assisted mechanical processing more generally are also contemplated herein.

Certain alternative contemplated configurations use a "batch" style heating and processing system. In batch systems, a quantity of material is heated and/or mixed together as a single stage and then is dispensed. It is often desirable to have more flexibility than a batch-style heating system affords because flexible operation of the heating and/or mixing system is preferred. Continuous-type heating and/or mixing systems (as shown in embodiments herein) can be preferable because they can provide greater efficiency, control, and flexible scalability and operation, among other benefits. Batch-type systems for heating mineral-laden materials for use in mining removal, extraction, liberation, and other processing are also contemplated herein.

Using microwave-based heating of precursor materials for extraction has many benefits over other forms of energy application, e.g., heating. An overview of heating as it applies to mining and material processing is provided in "The Development and Application of Microwave Heating" (2012) by S. M. Javad Koleini and Kianoush Barani ("Koleini et al."). Koleini et al. includes Chapter 4, titled "Microwave Heating Applications in Material Processing," which is hereby incorporated by reference in its entirety for all purposes. Koleini et al. provides a brief history of heating as it pertains to material processing, including various applications of microwave heating to material processing applications and further citations to other scholarly works referenced therein up to contemporary times.

Also incorporated by reference for all purposes herein is "The influence of microwave irradiation on rocks for microwave-assisted underground excavation" (2015) by Ferry Hassani, Pejman M. Nekoovaght, and Nima Gharib in the Journal of Rock Mechanics and Geotechnical Engineering 8

(2016) 1-15. Also incorporated by reference for all purposes herein is "Recent developments in microwave processing of minerals) (2006) by Samuel Kingman in the International Materials Reviews—February 2006. "Twenty years of experimental and numerical studies on microwave-assisted breakage of rocks and minerals—a review" by Khashayar Teimooi and Ferri Hassani. (2020) is also incorporated by reference for all purposes herein.

More generally, and separate from the details of materials processing using microwave energy, challenges also exist relating to microwave emissions escaping a material processing and heating system. At high material flow rates in a continuous microwave material processing system, microwave energy leakage can be particularly undesirable and challenging.

Another common complication for materials processing relates to rapid distribution and deployment of heating apparatuses to remote or non-grid-connected regions or situations. Microwave-based heating is generally more portable than other types of heating apparatuses and allows for portable generator use to power the microwave heating units (e.g., microwave generators) and systems if grid power is not readily accessible. Some examples of situations where grid power is not available include rural or remote areas, or other areas that have temporarily lost a grid power connection. Some mining processing sites may be located at a distance from any grid power connections or other energy storage solutions.

According to the present disclosure, portable, modular, parallel, and/or sequential heating and/or processing conveyor units can provide a modular, scalable, and portable system for heating extracted materials even in remote, or otherwise off-grid mining or processing locations. In some embodiments, sharing of portable material processing systems between multiple mining locations and/or processing facilities is also contemplated. Stationary, semi-permanent, and permanent embodiments are also contemplated. Various mechanical processing apparatuses and/or lifting conveyors can also be used in-line at any location with the conveyor units as suitable. Packaging various operative components within or attached to containers or other housings, such as shipping containers, can further simplify and streamline rapid and simple distribution, setup, and operation.

Further, various microwave suppression systems and features, such as included in or related to inlet/outlet tunnels can be sized to accommodate the size of the flow of whatever received or raw material is being processed (e.g., heated), such as various precursor materials and the like. Crushing, comminution, screening, filtering, sorting, blending, mixing, transporting, mechanically homogenizing, and the like are also contemplated and can be performed before or after receiving materials at the processing system.

In some embodiments, a microwave heating system of the present disclosure can be configured to process/heat about 100 U.S. tons (90.7 metric tons) of received precursor material per hour or more according to various specifications and standards, although the process could be scaled to accommodate quantities of less than 100 U.S. tons (90.7 metric tons) of material per hour and reach target specifications. For example, certain types of material can comprise a greater amount of moisture than other types of material. A rated capacity of a system can be configured based on an end goal of a particular facility and/or site. For instance, one goal may be to assist material processing by fracturing the various materials according to desired and known specifications. These specifications may therefore require less energy and allow for higher throughput than certain other specifications. It is known that various substances can react differently to microwave heating. Some materials readily absorb microwave energy and heat, and others are nearly inert to microwave energy. Some substances are more susceptible to pulsed or varied intensity of microwave energy received. Throughputs and configurations can be determined based on end goals and targeted specification of a user, entity, regulation, or standard.

In order to reduce microwave leakage from a processing system, one or more microwave suppression systems (e.g., tunnels or chutes) comprising one or more (e.g., flexible and/or movable) microwave-blocking fabric and/or mesh flaps can be used at one or more openings within a microwave-based heating system in order to reduce microwave emissions that would otherwise reach the outside of the microwave heating system. Each microwave suppression system can comprise a flap or series of flaps that are capable of and configured to cover one or more inlets and/or exits from a microwave heating system. The microwave suppression systems can prevent or suppress the escape of microwave emissions from the material heating system. Therefore, one or more of the microwave-blocking fabric and/or mesh flaps can be positioned at outlets and/or inlets of the continuous microwave material heating system. Each flap can be generally shaped to conform to a shape of a corresponding suppression tunnel, chute, or the like. Outlets and/or inlets of the continuous microwave heating system can include one or more suppression tunnels. In particular, moisture-laden or dry material, mineral, or other component particles or precursor material can be allowed to enter into the heating region of microwave heating while microwaves are simultaneously substantially prevented from escaping a heating trough via the suppression tunnels within the system. As multiple modular heating and processing conveyor units (e.g., including augers) can be arranged sequentially and/or in parallel, various material inlets and outlets are particularly suitable for microwave suppression systems, including tunnels and other related features. In preferable embodiments, separate suppression systems such as tunnels are supplied and connected to both an inlet and an outlet of a system. In other embodiments, additional suppression tunnels or related features can be included intermediately within a precursor material flow path or otherwise to the system such that more than two such suppression systems are included in order to maximize microwave suppression from any number of openings in the system.

It is known that microwave energy is particularly efficient for heating water (e.g., water molecules), which leads to efficient microwave heating of materials that include at least some of such water molecules. Precursor materials (including slurries thereof) in some embodiments disclosed in this disclosure can contain about 2-10% water, although embodiments containing less than 2% (even 0%) or more than 10% water are also contemplated herein. Water can escape a material in the gaseous form of steam when the water is heated to its boiling point (e.g., about 212 degrees Fahrenheit [° F.] or 100° C.). Steam can escape from a heating system through natural convective ventilation, and in some cases by forced ventilation, through positive or negative pressure applied to the system (e.g., an air blower or fan to expedite or assist ventilation). Vents can also be added to improve ventilation and facilitate steam escape characteristics. However, excessive quantities of water can have a negative effect on heating mineral or other materials. Furthermore, heat exchangers can be used to reclaim heat released as steam (or otherwise) during microwave heating processes, and in particular heat that is emitted from the phase change (e.g., boiling) of water when the material containing at least some water is heated.

In some typical cases, extracted or reprocessed precursor material can be about 4-7% water content by weight, or any other percentage according to each situation. In other examples, precursor material can be less than 4% or greater than 7% water content by weight. In cases where a liquid is introduced to the precursor material for freezing, a water content can be relatively higher prior to heating.

Heating a quantity of precursor material to a temperature above the boiling point of water (about 212° F. or 100° C.) can therefore in some cases be less efficient because the water particles boil off and escape as steam. During heating organic or inorganic precursor materials (or compounds) to certain temperatures (or other reaction, such as at a reaction point, or a total quantity of energy received or absorbed), e.g., at or above a boiling point of water, the water that the microwaves can easily heat through molecular oscillation can decrease. Heating of the precursor material then becomes reliant on the microwaves' oscillation of materials other than water and require more energy.

A phase change of liquid water to gaseous steam can occur around 180-212° F. (82-100° C.) depending on air pressure or vacuum, and it can be desirable to heat a material, e.g., a precursor material, to any temperature (or other reaction point) such that the precursor material reaches a temperature (and optionally for a certain time). Heating to a temperature or reaction point as used herein can include applying microwave energy to a precursor material such that, e.g., a dielectric stress between various constituent materials of the precursor material, such as between precious metal(s) and a conglomerated material containing the metal (s), becomes sufficient to assist extraction, according to various embodiments. Steam that is produced from the heating can escape the heating system via vents once the phase change occurs.

As used herein, a "reaction point" can be any stage of reaction of at least one precursor material, including any reaction from a complete fracture or liberation, or any measurable reaction of at least one precursor material as a result of applied microwave or any other energy to the precursor material. It is also contemplated that a precursor material can contain more than one constituent substance, and thus each substance can have one or more reaction points, and any number of substances and reaction points are therefore contemplated herein.

According to various embodiments contemplated in this disclosure, steam and/or other heat produced and/or emitted during microwave heating can be captured for re-use using one or more air-air, and air-liquid heat exchangers or the like. The steam can exit the system by natural and/or forced ventilation. In some embodiments a carbon scrubber or other filtration or emission capture system can be implemented that is configured to trap or scrub emitted steam, vapor, particulates, and/or odors that result from material processing. In various embodiments, carbon scrubber technology can be used in combination with one or more condensate units.

According to various embodiments the material to be heated and/or processed is a precursor material or other material. In certain embodiments the material can comprise various particles, such as particles to be heated. The material, e.g., extracted or mined precursor materials, can have an initial, first maximum particle or chunk size or hardness. The initial, first particle or chunk size or hardness can be reduced to a second, smaller size by a component or feature of or operatively coupled to at least one of the first and second conveyor units, such as a mechanical processing apparatus or baffle as described herein. Any other suitable mechanical processing apparatus or component for reducing particle size, such as a crushing device, screen, filter, sorter, separator, shredder, mixer, mesh, brush, mill, press, or the like, is also optionally included in various embodiments. If present, the mechanical processing apparatus, can be separate from the first and second conveyor units. Sensed torque load (or motor rotational speed, etc.) on a motor in a conveyor unit can be used as a proxy for hardness, viscosity, density, type, mix, composition, and/or size of precursor materials being processed.

According to various embodiments, and as discussed above, the precursor material typically contains at least some water. Optionally, the precursor material contains less than 7 percent water by weight, and in other embodiments less than 4 percent water by weight. In various further embodiments, the precursor material contains at least 7 percent water by weight. In yet further embodiments, the precursor material contains less than 4 percent water by weight. In yet further embodiments, the precursor material contains between 2-10 percent water by weight. In even yet further embodiments, the precursor material contains between about 1-15 percent water by weight. As discussed herein, in at least some embodiments, one heat exchanger apparatus configured to recover a heat byproduct from the precursor material. In some embodiments the heat byproduct is recovered from the steam resulting from a heating of the water within the precursor material.

In some embodiments, one or more additives, such as water, can be added to precursor material to be heated and at various stages before, during, and/or after processing. Examples of additives contemplated herein include cyanide, sodium cyanide, potassium cyanide, hydrocyanic acid, nitriles, any other compound from the cyano group and the like or combinations thereof. Another example of an additive contemplated herein is NaCl (sodium chloride, or table salt). Various additives can provide a number of different properties when added to material before, while, or after being processed. For example, additives can increase microwave energy absorption and efficiency during heating or can reduce odor or other material processing emissions. In other examples, additives like cyanide, can be added to precursor materials before processing, in various quantities, and for various periods of time.

Optionally, water or other liquid can be added to a heated material during or after a microwave (or any other) heating process. This added liquid can rapidly cool the heated material is a process known in the art as "quenching." As discussed herein, in various embodiments precursor materials can be cooled below ambient temperatures, and in some cases frozen, before or after heating for improved ease of material extraction, fracture, and separation.

In some embodiments, a continuous microwave heating process can include ramp-up time, hold time, process time (e.g., based on time and temperature of processing), and various heating peaks. Mixing of precursor materials of differing physical properties can improve performance during microwave heating, according to some embodiments.

A continuous microwave heating system can be sized in order to get a desired material processing throughput and to accommodate the physical size of the precursor material being processed. This can be due to limitations, such as with existing heating, mixing, and tunnel design in view of target processing specifications as described herein. An example of (e.g., steel) mesh or fabric flap design of a microwave outlet suppression tunnel 200, as shown in FIG. 1, is better suited for high-volume continuous flow of various sized and consistencies of precursor materials (as explained in greater detail below). Microwave outlet suppression tunnel 200 is an embodiment of a microwave suppression system as used herein. Also as shown in FIG. 1, multiple flaps can be used in a single microwave outlet suppression tunnel 200, e.g., four positioned sequentially as shown. Each flap is preferably shaped to conform to a shape of a corresponding outlet suppression tunnel 200, chute, or the like.

Heating, treating, cooling, freezing, wetting, drying/dehydrating, condensing, breaking, shredding, filtering, fracturing, loosening, separating, liberating, crushing, milling, sorting, sifting, shaping, lifting, moving/transporting, extracting, mixing, etc. (collectively "processing") of materials such as precursor materials is contemplated herein. Processing steps can involve naturally occurring (e.g., freezing) and/or artificial or human-made steps (e.g., microwave heating). However, any one type of suitable material or tailing, chunk, or clump including one or more materials can be heated, such as any other mineral that can be heated, and conveyed or flowed through a microwave heating system. For example, mining material can include any type of mined or sourced material, especially found at sites in a mine. Other applications of the microwave heating of materials are also contemplated. Various applications of microwave-based processing of materials discussed herein are applicable on Earth as well as other celestial bodies (e.g., moons, asteroids, etc.), spacecraft, and/or in space according to various embodiments. As discussed herein, a post-processed (or in some cases at least partially processed) precursor material can be referred to as a product or the like.

One usage of microwave-based processing of various materials, such as mined minerals, is for microwave-assisted breaking. For example, norite, granite, and basalt can have high strength and therefore associated difficulties related to breaking and comminution absent assistance, such as heat-related comminution assistance. Tensile and uniaxial strengths, such as compressive strengths of materials, can be reduced with increased exposure time and power levels of microwave-based heating and processing. Therefore, a microwave power level correlates to a level of heat at a material (e.g., rock) surface during mining and/or processing. Microwave-based mining and applications can reduce energy consumption, e.g., during comminution of various materials (e.g., ores) and can also make removing and separating the desirable portions from undesirable portions of mined or sourced rock material easier.

Embodiments of the present disclosure can be applied to hard rock material breakage. Hard rock breakage, a type of material processing, involves separating a portion of rock from a larger, parent, (e.g., precursor material) deposit. Hard rock breakage can include material extraction and/or removal, as used herein. Typically, various bits and tools are used for boring and mining extraction (including removal and/or extraction). These bits and tools often are subject to intense wear and need to be replaced frequently. By using heat, and especially microwave-based heat, various rocks and deposits can be softened or weakened such that bit and tool wear is reduced. Fuel and energy consumption can also be reduced, in addition to less time requirements for mining or material processing. Contemplated in this disclosure is processing of chunks of material such that desirable portion or portions of the chunks are more easily separated and extracted (or removed) from a larger chunk received at a microwave-based material processing system.

For processing, a deposit or chunk of rock or other precursor material can be heated through the application of energy and therefore weakening or broken to a degree based on time and power of a microwave generator. The compositions of the rock or material being processed also affect breaking and processing characteristics. Some materials, such as calcite, are fully transparent to microwaves, while others, such as pyrite, are efficient microwave absorbers. Roughly 3-200 kW of microwave power can be used in a particular system, but any power level is contemplated according to situation and specifications. Microwaves heat up materials based on various dielectric properties, and different portions of different rocks and materials are therefore heated at different levels according to the varying dielectric properties thereof.

Certain embodiments of the present disclosure are more specifically directed to microwave-assisted comminution of materials. Various materials, such as rocks and ores, can be more easily ground into smaller pieces with the assistance of microwave-based processing and heating as described herein. In various embodiments, cutters or grinders, such as disc-based cutters, can also be incorporated for material breaking and separation for reducing size or otherwise breaking down material deposits into small pieces or various shapes and the like according to various system constraints.

Various embodiments of heating and/or processing systems discussed in this disclosure can have various total weight, and/or throughput capacities, depending on dimensions, power capacity, arrangements, and the like. In some embodiments, a continuous material processing system discussed herein has a capacity of about 10-1000 U.S. tons (9.1-907.2 metric tons) of precursor material per hour. In further embodiments, the capacity can be between 50-100 U.S. tons (45.4-90.7 metric tons) of precursor material per hour.

Figure 3:
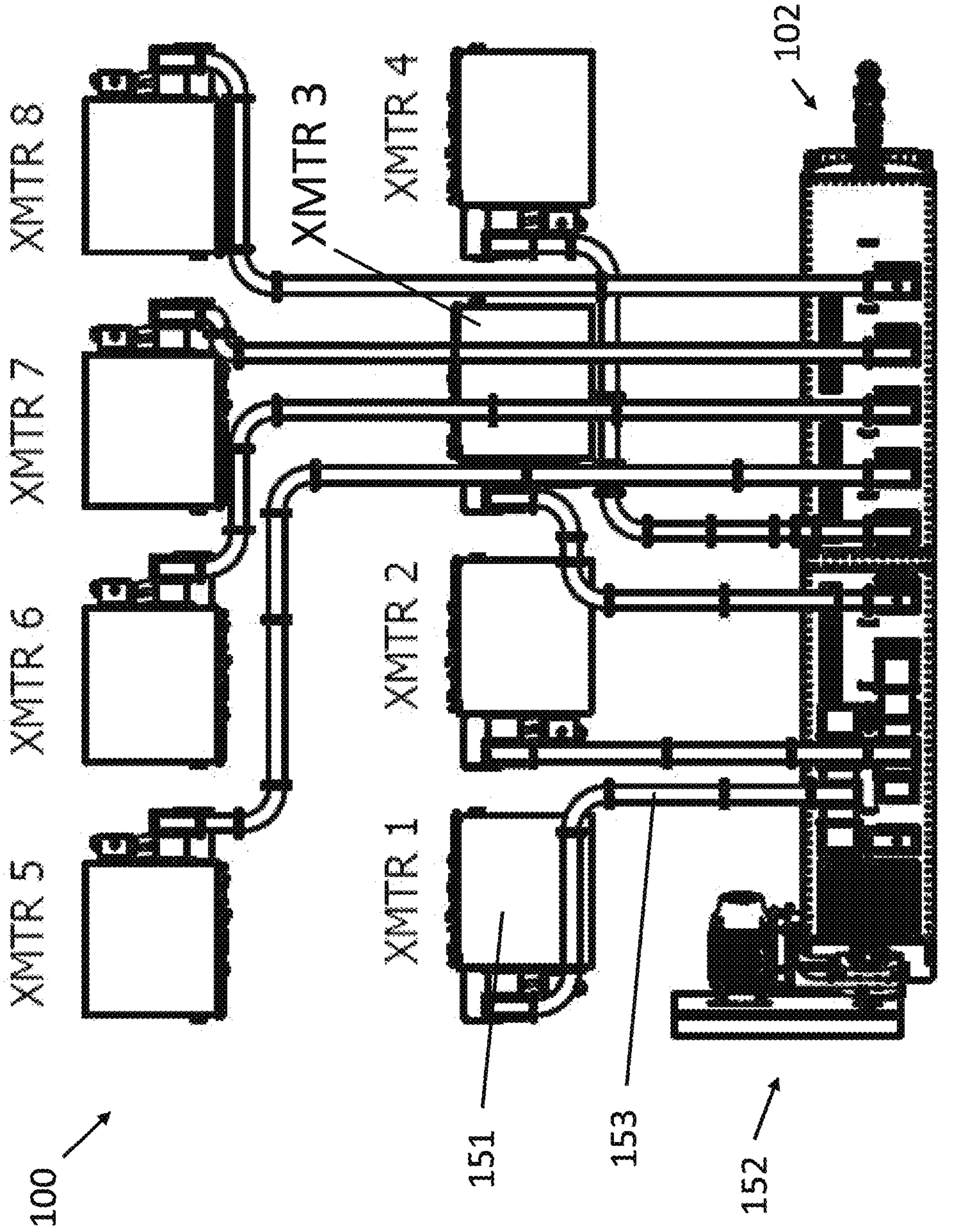
FIG. 3 is a top view of the continuous material processing system of FIG. 1.

FIGS. 1-9 illustrate an embodiment of an optionally portable, continuous precursor material (e.g., mineral) processing system 100 having a housing, vessel, or trough 102 (as shown in FIGS. 1-5) (or alternative trough 104 as shown in FIGS. 6-9) comprising a microwave heated apparatus with one or more microwave heating units 151 each with at least a corresponding waveguide 153 to define a guide path for microwaves (see e.g., FIGS. 1 and 3). The continuous processing system 100 also preferably includes at least an outlet suppression tunnel 200, as shown. The continuous processing system 100 also includes a housing including a trough 102 including one or more microwave heating units 151, a conveyor system such as including an auger 106, an inlet suppression tunnel 202, and the outlet suppression tunnel 200. These and other contemplated components are described in greater detail herein.

According to FIGS. 1-9, a single conveyor unit continuous material heating and/or processing system 100 is shown, although in various embodiments in this disclosure (e.g., FIGS. 10, 11, and 14) it is also shown that multiple conveyor units can be assembled and/or arranged sequentially. Conveyor units can therefore be assembled sequentially, but also in parallel, or both in order to achieve a desired throughput for a given conveyor unit size and/or heating capacity; or in order to achieve a desired heating capacity and throughput for a production or processing rate needed to fulfill specification and standards requirements for heating a precursor material. Arrangements and the like can be adjusted for a given conveyor unit specification by introducing multiples of the conveyor unit and/or arrangements thereof. For example, running two conveyor units in parallel can offer twice the heating (energy delivery) capacity and/or throughput of processed material compared to a single conveyor unit, provided suitable microwave heating units are used.

Figure 4:
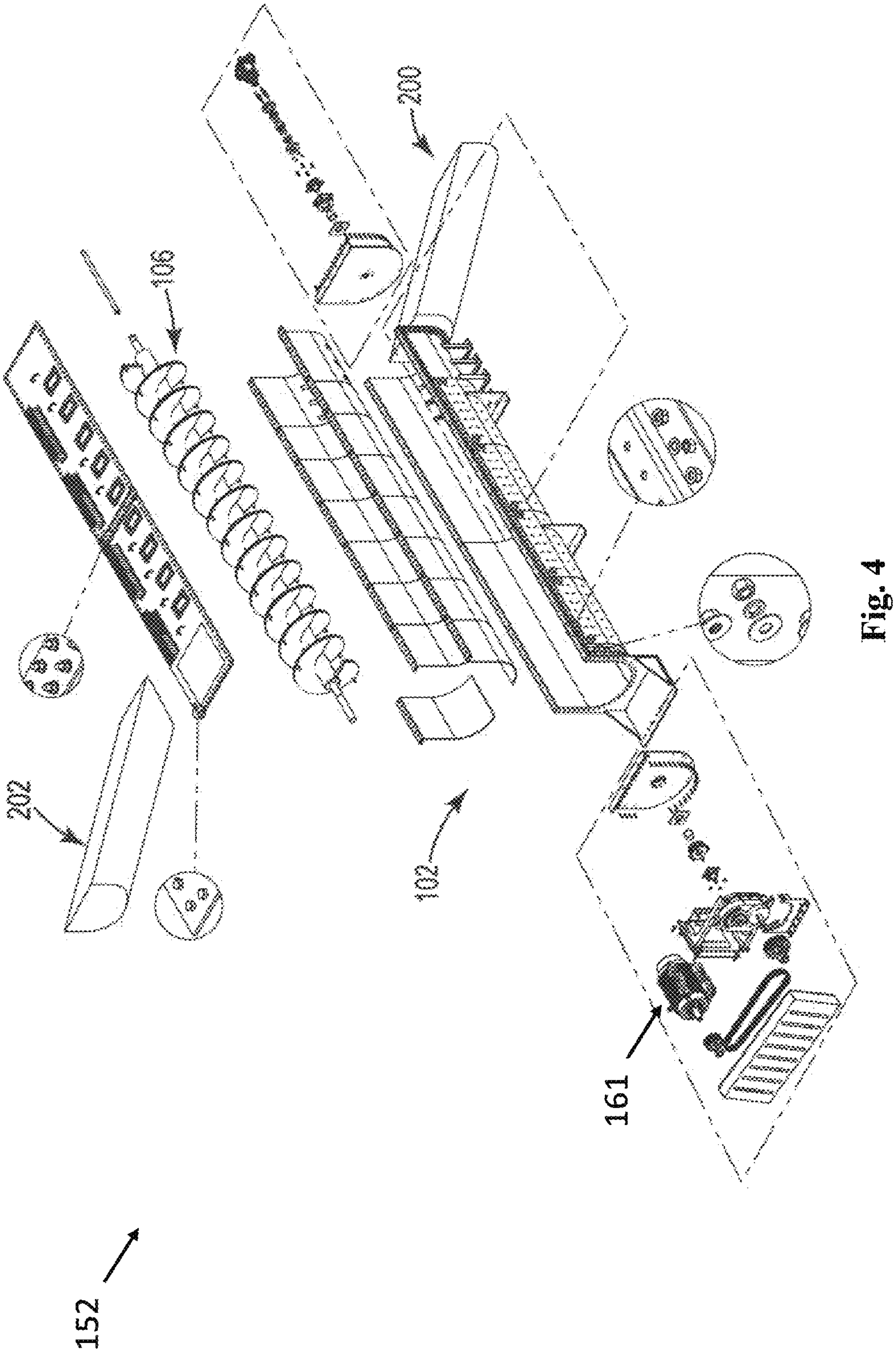
FIG. 4 is a perspective exploded view of the trough of the continuous material processing system of FIG. 1.
Figure 6:
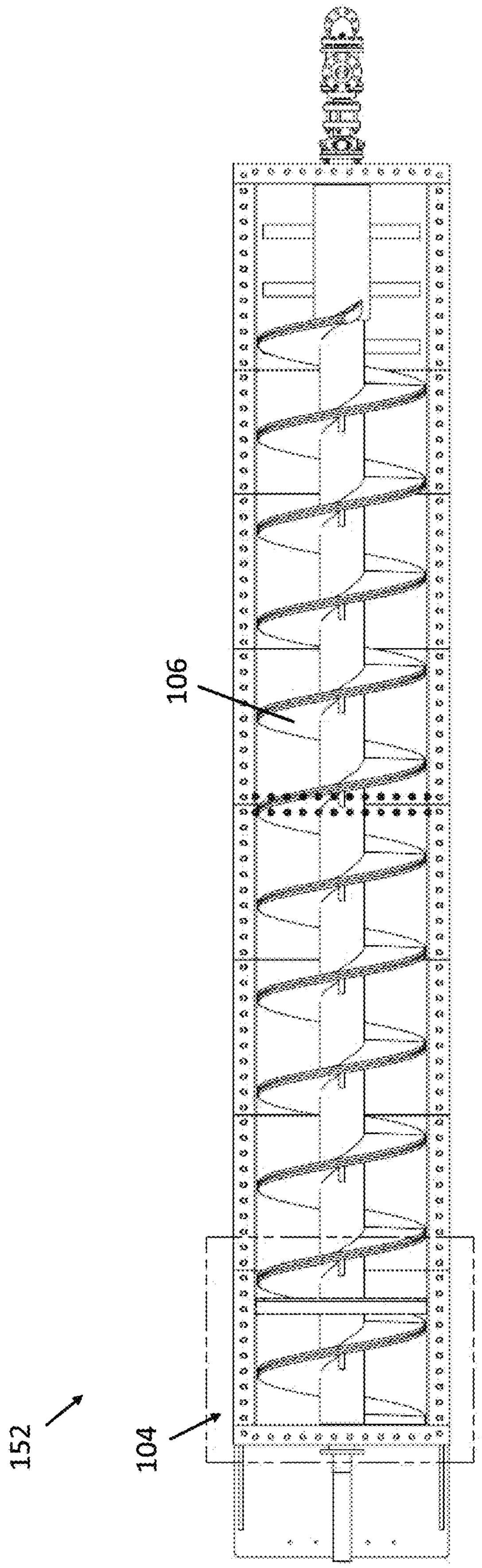
FIG. 6 is a top view of an auger for use with the trough of the continuous material processing system of FIG. 1.
Figure 8:
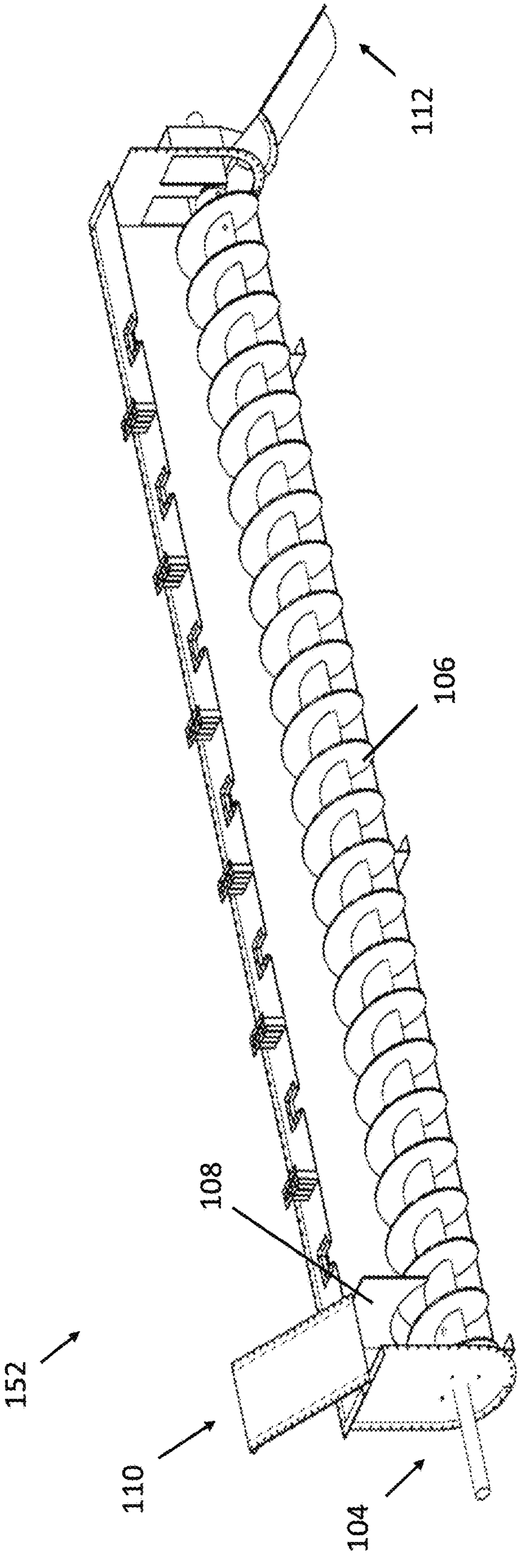
FIG. 8 is a partial cut-away view of the alternative trough of FIG. 7.

Shown in FIGS. 4, 6, and 8, a helical auger 106 or (e.g., a helical screw) is one option for a conveyance mechanism by which material particles or chunks can be caused to pass through the housing trough 102 longitudinally. The auger 106 can be completely or partially covered in particles or chunks (e.g., mineral or any other form of material) to be heated during operation, but the particles or chunks are not shown for clarity. The auger 106 can be a heated auger, and in some embodiments can be a jacketed auger (e.g., where an auger has a hollow fighting that heating fluid is run through as desired). The outlet suppression tunnel 200 can be connected to an outlet and/or inlet of trough 102. The trough 102 can be level or can be canted at an angle to the horizontal plane according to various embodiments. An angled trough 102 (and/or auger 106 in some embodiments) can facilitate movement of the material during processing by utilizing gravity assistance to flow downhill. A trough 102 can be about twelve feet long and five feet wide, although any suitable size and/or shape is also contemplated.

FIGS. 2-9 show various components of the trough 102, auger 106, inlet suppression tunnel 202, outlet suppression tunnel 200, and other components of the system 100 in greater detail. Selected embodiments and variations of the inlet suppression tunnel 202 and the outlet suppression tunnel 200 and components are shown in yet greater detail with respect to FIGS. 16-31. Furthermore, various embodiments of multiple-conveyor microwave-based material heating systems are shown with reference to FIGS. 10-15.

FIG. 3 shows a general configuration of a single-conveyor unit 152, continuous heating system 100 of the present description, including eight microwave heating units 151, a microwave waveguide 153 for each heating unit 151, an auger-based continuous heating assembly with trough 102, and various other components. In particular, FIG. 3 shows an embodiment including eight microwave heating units 151 labeled as XMTR 1, XMTR 2, XMTR 3, XMTR 4, XMTR 5, XMTR 6, XMTR 7, and XMTR 8. More or fewer microwave heating units 151 (and corresponding waveguides 153) can be used in alternative embodiments. A number of waveguides 153 and therefore microwave generators 151 used with a trough 102 can be limited by a surface area on top (or other side) of the trough 102, including any vents, inlets, and/or outlets included thereon. In some embodiments 1-30 waveguides 153 can be utilized for each conveyor unit, and in more specific embodiments 7-10 waveguides can be utilized for each conveyor unit.

In one embodiment, microwave heating unit 151 can be a microwave power system sourced from Thermax Thermatron. The microwave heating units 151 can have a variety of shapes and sizes according to the requirements of the continuous heating process and system 100. Each microwave heating unit can apply about 100 kW of power to the precursor material being heated and preferably operates at about 915 MHz. In various embodiments, various quantities of microwave energy can be received by the precursor material while in a conveyor unit. Various conveyor units described in this disclosure (e.g., conveyor unit 152) can have a nominal weight capacity of about 500-40,000 lbs (227-18,144 kg). In some embodiments, the conveyor units can each have a weight capacity of about 8,500 lbs (3,856 kg) of precursor material at a point in time.

Various embodiment waveguide 153 configurations and embodiments for a single conveyor unit 152 are shown in FIGS. 1 and 3. The various waveguides 153 can be configured to bend and be routed such that no two waveguides 153 collide, and in some cases the waveguides can be configured to minimize turns or bends in the waveguides, as practical. Similar waveguide 153 configurations can be adapted for use with multiple-conveyor unit material processing systems described below. Each microwave heating unit 151 can optionally be connected to more than one waveguide 153.

Still referring to FIG. 1, a side view of the continuous heating assembly is shown, including an inlet suppression tunnel 202, outlet suppression tunnel 200, and trough 102 of system 100. Although not shown, the trough 102 can be generally mounted or positioned, or provided with a shape generally comprising an angle relative to horizontal to facilitate material movement or production during heating and/or conveying precursor material for processing described herein, e.g., by at least partially utilizing gravity to move the precursor material through the trough 102. Non-stick coating can be applied to the trough 102, such as to an interior portion of the trough 102 such that precursor material is less prone to get stuck and resist movement during processing.

FIG. 4 is an exploded view of system 100. Shown is a conveyor motor 161 for rotating the auger 106, the housing trough 102 for holding and carrying the precursor material to be heated, the inlet suppression tunnel 202, the outlet suppression tunnel 200, and various other components. The conveyor motor 161 can be an electric, brushed or brushless, induction or permanent magnet, synchronous, asynchronous, variable reluctance motor (or any other type of electric motor) and can utilize alternating current (AC) or direct current (DC) power of any voltage or power as suitable. Any other suitable type of motor, including an internal combustion engine or gas turbine, can also be implemented. In particular, FIG. 4 provides a more detailed view of system 100, including the trough 102, auger 106, inlet suppression tunnel 202, outlet suppression tunnel 200, and related components.

Figure 5:
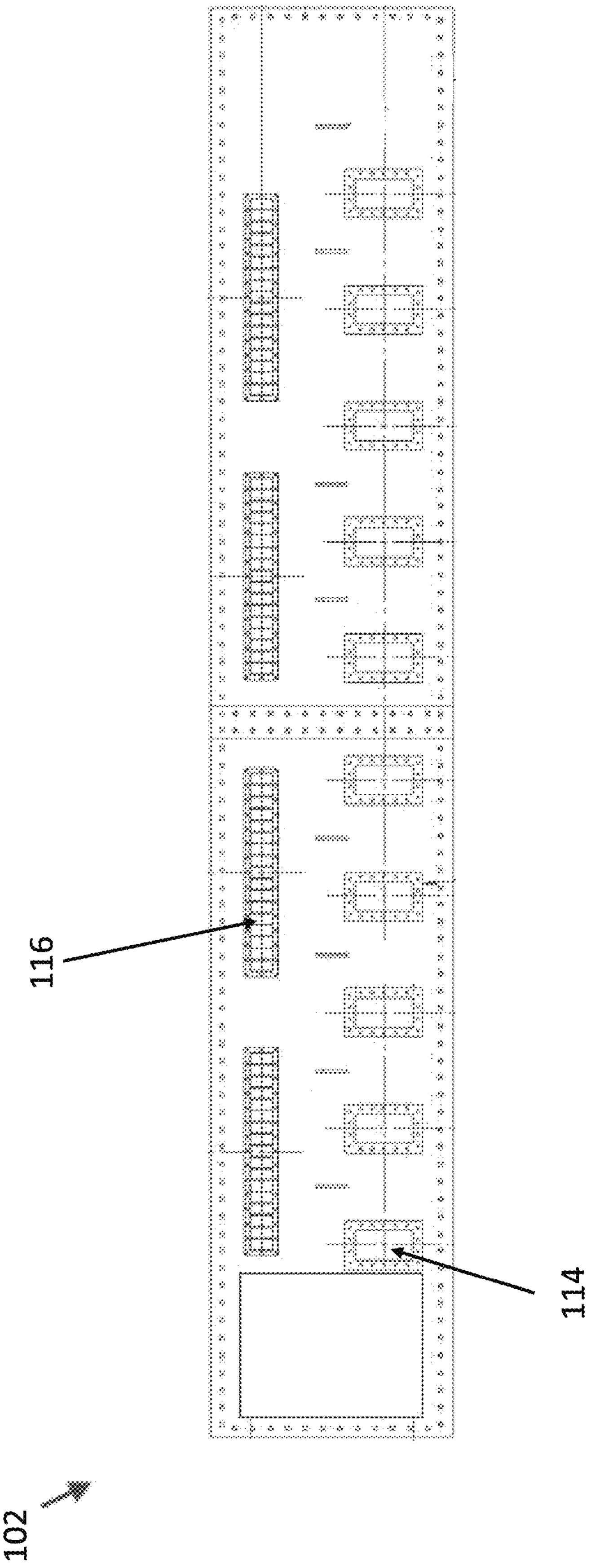
FIG. 5 is a top view of the trough of the continuous material processing system of FIG. 1.
Figure 7:
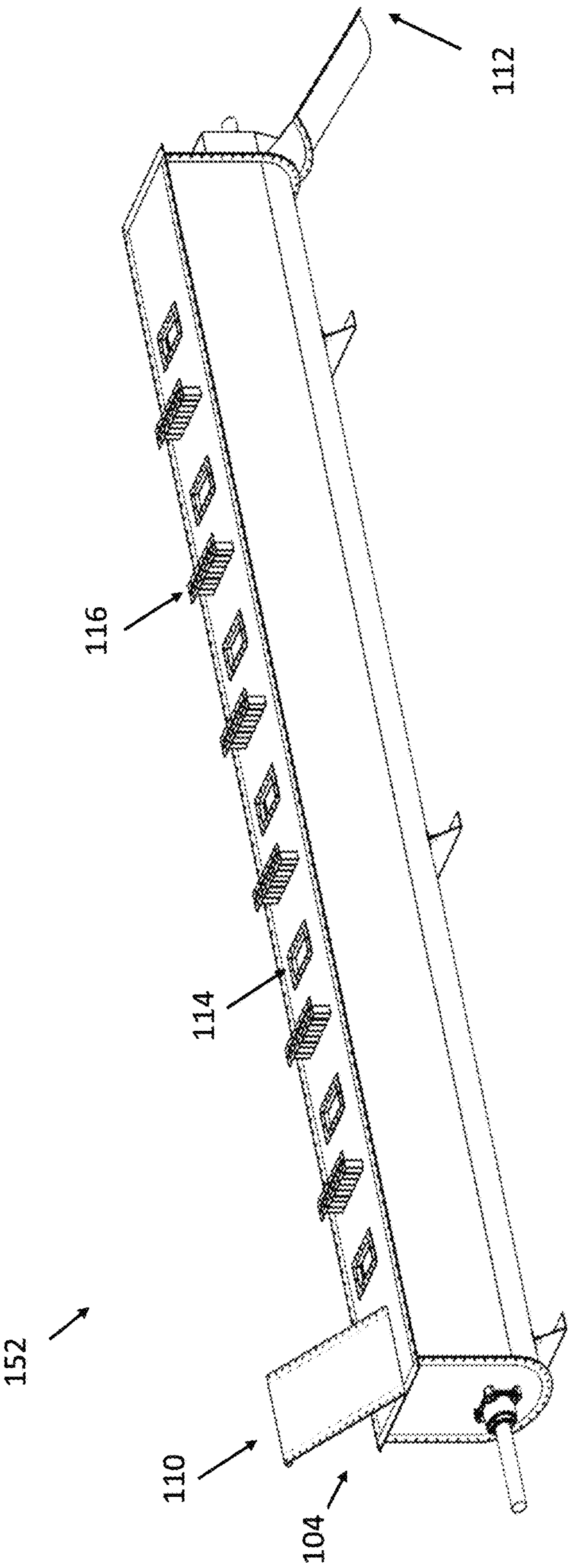
FIG. 7 is a perspective view of an alternative trough for use with the continuous material processing system of FIG. 1
Figure 9:
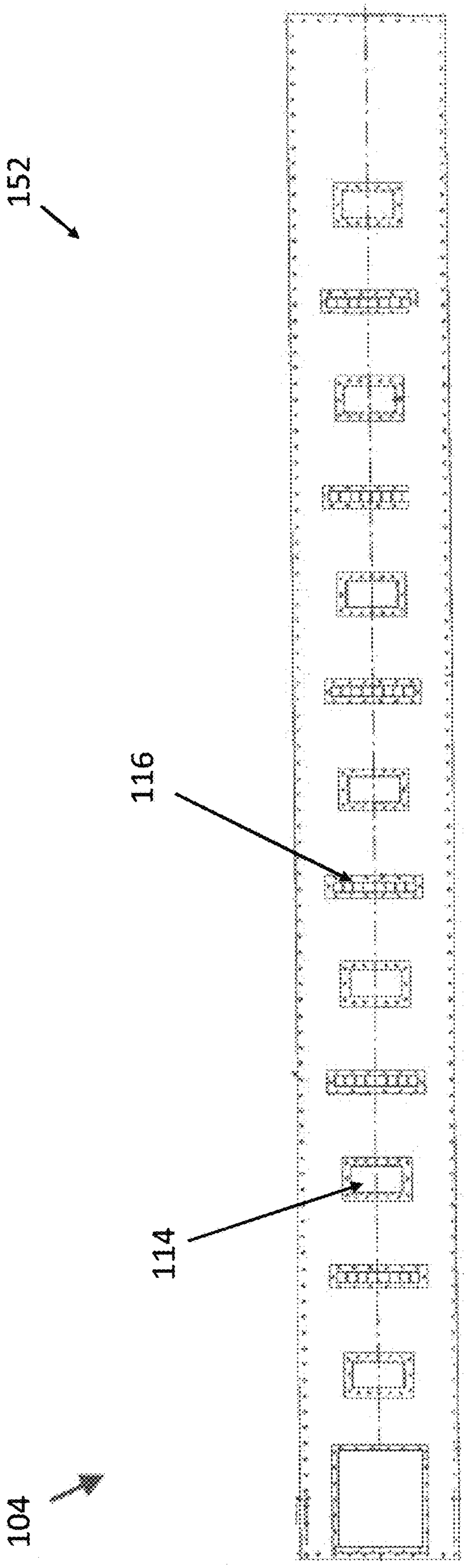
FIG. 9 is a top view of the alternative trough of the continuous material processing system of FIG. 1.

Various entry points for microwaves via the multiple waveguides 153 in a top of trough 102 are shown in FIG. 5. FIG. 9 shows alternative entry points in a top of the alternative trough 104. Various other arrangements and configurations of troughs, conveyor units, and/or systems are also contemplated herein. Waveguides 153 are also referred to as microwave guides herein. As shown in FIGS. 7 and 8, the alternative trough 104 can include a material inlet 110 and a material outlet 112. One or both of inlet 110 and outlet 112 can include a microwave suppression tunnel and/or features as described herein. Various components herein, such as inlet 110 and outlet 112 may not be shown to scale, and various other shapes and configurations are also contemplated.

In the conveyor unit 152 configuration of FIG. 6, the example, alternative trough 104 (or housing) of the continuous heating assembly that includes the auger 106. The auger 106 can optionally be heated and used to cause precursor material to be heated using liquid and/or microwave heating to be moved longitudinally along the trough 102 of the conveyor unit 152 during material heating, processing, and/or production. The auger 106 can also be caused to rotate directly or indirectly by the conveyor motor 161 (see FIG. 4) (or alternatively, an engine), according to various embodiments. Furthermore, the auger 106 can rotated by conveyor motor 161 either slowly or more quickly according to various parameters, which can be based on need or usage, such as target temperature, microwave heating power, and the like. The motor 161 can have a power rating of 50-150 kW, 70-130 kW, 80-110 kW, or 90-100 kW in various embodiments. Embodiments with the motor having any power rating, including below 50 kW or above 150 kW are also contemplated.

As shown, the auger 106 can be helical, and in some embodiments the auger 106 can be single helical or double helical, among other variations. In yet further variations, a single trough 104 can comprise two separate augers 106, which can be counter-rotating or otherwise (not shown). As shown, a fluid connection can be attached to one or more ends of the auger 106, which can be used for additional auger-based heating or cooling of precursor material being produced.

FIGS. 7-9 show various views of the alternative configuration 104, where various apertures within the alternative trough 104 cover are instead positioned in alternative locations as compared to trough 102. More specifically, the microwave inlets 114 and vents 116 are generally placed inline as shown with trough 104. Various embodiments that utilize trough 104 can be similar to embodiments that utilize trough 102, and various other configurations are also contemplated herein.

Figure 10:
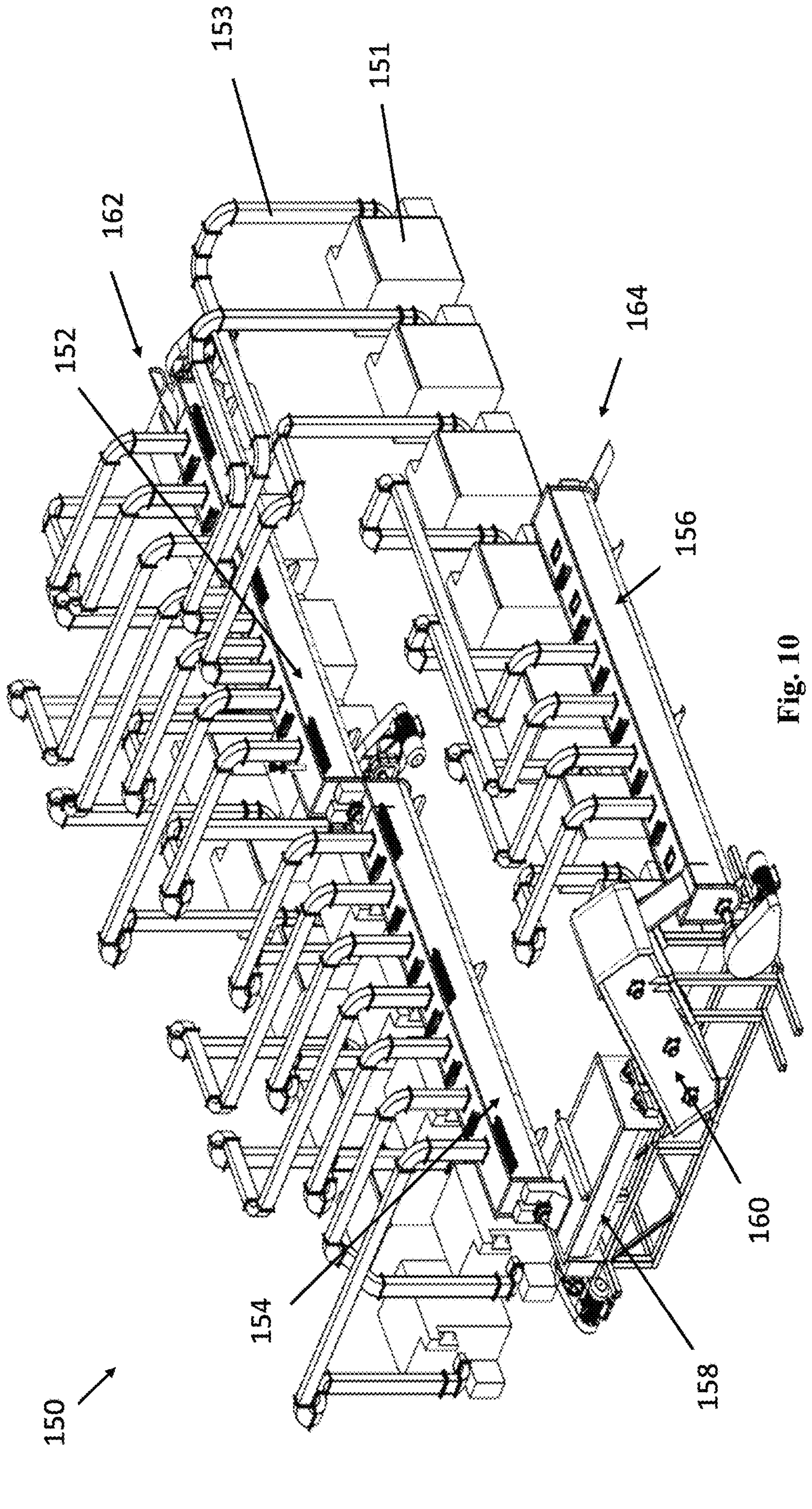
FIG. 10 is a perspective view of a multi-conveyor continuous material processing system, according to various embodiments.
Figure 11:
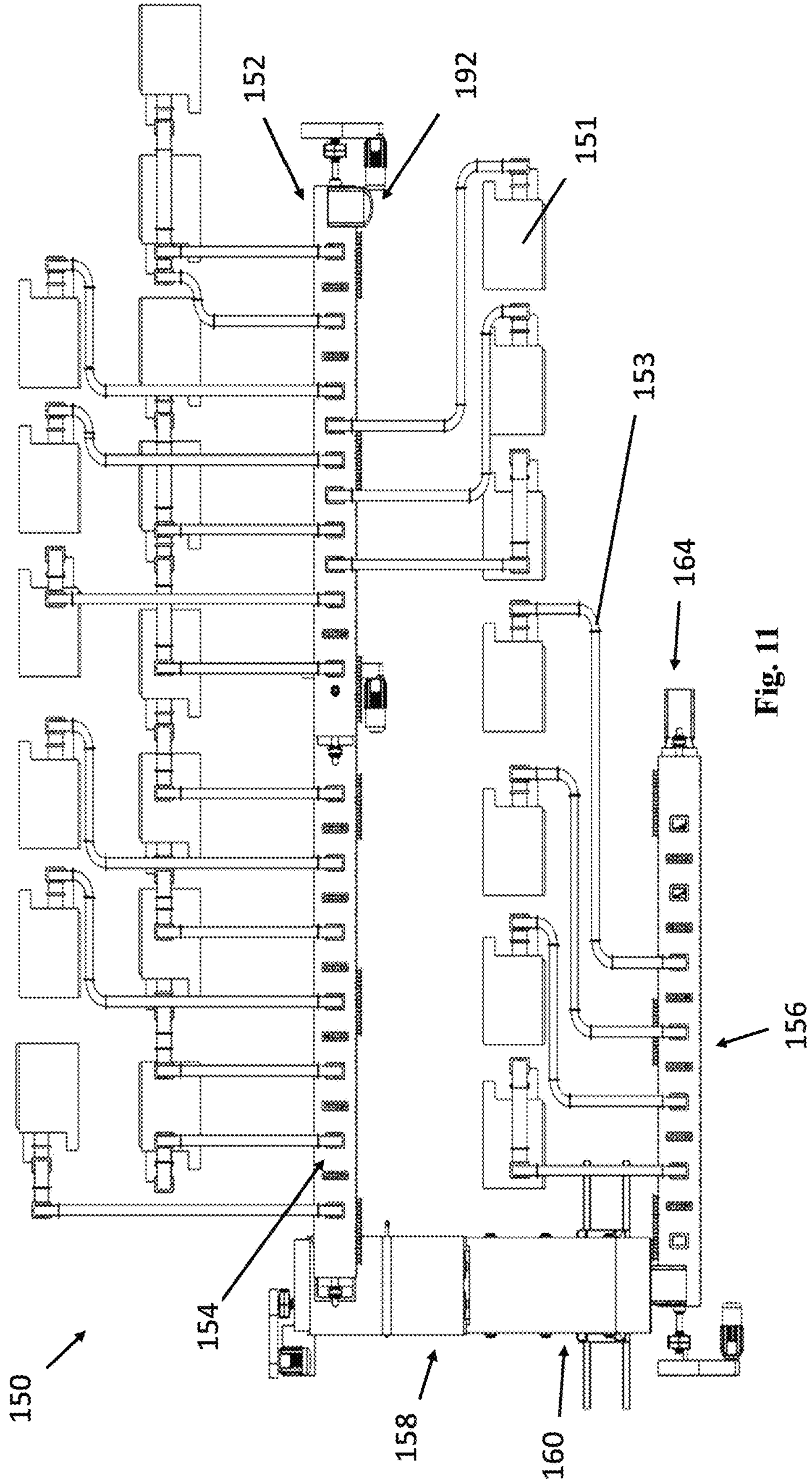
FIG. 11 is a top view of the multi-conveyor continuous material processing system of FIG. 10.

FIGS. 10 and 11 show an embodiment of multi-conveyor continuous material processing system 150. The system 150 as shown comprises three conveyor units similar to conveyor unit 152 described above, in addition to a mixer 158, lifting conveyor 160, and two microwave suppression tunnels (e.g., 200, 202) shown at inlet 162 and outlet 164. Multiple microwave heating units 151 are also shown connected to the conveyor units via multiple corresponding waveguides 153 as described herein.

A first conveyor unit 152 receives a precursor material to be heated, and the system 150 operates sequentially by passing the precursor material to a second conveyor unit 154 following the first conveyor unit 152, and to a third conveyor unit 156 following the second conveyor unit 154. One (optionally more than one) optional mechanical processing apparatus, e.g., mixer 158 (described in greater detail with reference to FIGS. 12 and 13), and a lifting conveyor 160 are also shown inline and between the second conveyor unit 154 and the third conveyor 156 in a sequential or serial arrangement. One or more mechanical processing apparatus 158 can preferably be utilized with, or to create more flowable or slurry type materials. In other optional embodiments, a return system can be implemented where precursor material is returned to the inlet 162 once it has approached or left the outlet 164 or equivalent. In this way, a given system 150 can simulate a larger system and can achieve higher temperatures and/or longer heating times as desired.

In particular, the mixer 158, an example of a mechanical processing apparatus, can be located sequentially after an outlet of the second conveyor unit 154, and the lifting conveyor 160 can be located sequentially after the mixer 158 and before the third conveyor unit 156. The mixer 158 can be a pugmill, a drum mixer, mixing chamber, or any other type of suitable mixer or other mechanical processing apparatus, as known in the art.

As described and shown in this disclosure, any number of conveyor units 152, 154, 156, etc. and any number of mixers 158, lifting conveyors 160 can be utilized in various systems such as 150. Various power levels to be applied at least conveyor unit 152 are also contemplated. Moreover, the various components within the system 150 can be arranged in any suitable order according to a desire or need. Furthermore, microwave suppression tunnels (e.g., 200, 202) are preferably utilized at various inlets and/or outlets of the system 150 according to various embodiments.

The various conveyor units 152, 154, 156 can positioned such that the first conveyor unit 152 is vertically elevated and that the second and/or third conveyor units 154, 156 are positioned sequentially lower than the first conveyor unit 152 so as to utilize gravity to facilitate movement of material being heated between the various conveyor units when in use. In some embodiments, one or more lifting conveyor 160 can also be utilized to lift or raise the precursor material being heated and reduce a total amount of height required for various conveyor units. Although not shown, additional lifting conveyors can be used before or after processing of the precursor material, such as to receive materials to be heated or to form a pile of processed materials after processing.

When arranged sequentially, the first conveyor unit 152 can heat the flowing precursor material to a first temperature (and/or a first reaction point of at least one precursor material or a constituent substance thereof), the second conveyor unit 154 can heat the material to a second temperature (and/or a second reaction point of at least one precursor material) greater than the first temperature, and the third conveyor unit 156 can heat the precursor material to a third temperature (and/or a third reaction point of at least one precursor material) that is greater than the second temperature according to various embodiments. Each conveyor unit preferably applies energy (e.g., heats) the precursor material using microwave energy as the material flows and such that a third or final desired temperature (and/or a final reaction point of at least one precursor material) is reached before the precursor material exits the heating and/or processing system, e.g., after achieving a desired heating, reaction, and/or time specification per various regulations.

The various conveyor units 152 can heat the material to the first temperature (and/or reaction point) for a first amount of time, and similar to the second, third, etc. temperatures (or reaction points). Each temperature can have an associated time therewith, such as to meet certain specifications of heating or an associated chemical, physical, or other reaction. Alternatively, a temperature and/or time can be set variably based on a sensed reaction or state of material being processed, e.g., when a certain state, point, fracture, separation, expansion or the like has been achieved, such as according to certain specifications, regardless of temperature and/or time for processing.

Any conveyor unit, such as the first conveyor unit 152, can further include a baffle 108 (see FIG. 8), preferably a vertical baffle or a baffle that is otherwise at least partially transverse to a direction of material flow within the conveyor unit 152, which is configured to restrict, guide, and shape the precursor material as it proceeds through the first housing of the first conveyor unit 152. For instance, the baffle 108 can assist the auger 106 in restricting the flow of, leveling the precursor material to a desired maximum level within the first conveyor unit 152, or reducing the particle size of received precursor material to a desired diameter for processing and/or heating.

In some embodiments, the precursor material to be processed, before or after passing the baffle 108, has a maximum material chunk diameter or size of about eight inches (20.32 cm). In other embodiments the maximum chunk diameter is about six inches (15.2 cm). In yet further embodiments, one or more mill or other mechanical processing apparatus is utilized (as described herein), which can include one or more mill, mixer, impactor, shredder, and/or comminution device, which can be used to reduce a maximum largest dimension of the precursor material chunk (e.g., an ore, etc.). In some embodiments at least some precursor material is crushed or reduced in size within or prior to entering the first conveyor unit 152. Other conveyor units can also include various types of baffles (e.g., baffle 108) or other restrictive or material guiding members or features. In other embodiments, the precursor material is received as a semi-solid, slurry, liquid, or any other at least minimally flowable state. During heating the precursor material can progressively become more solid and less flowable as water is evaporated or boiled off the precursor material, e.g., a slurry of the precursor material.

Figure 12:
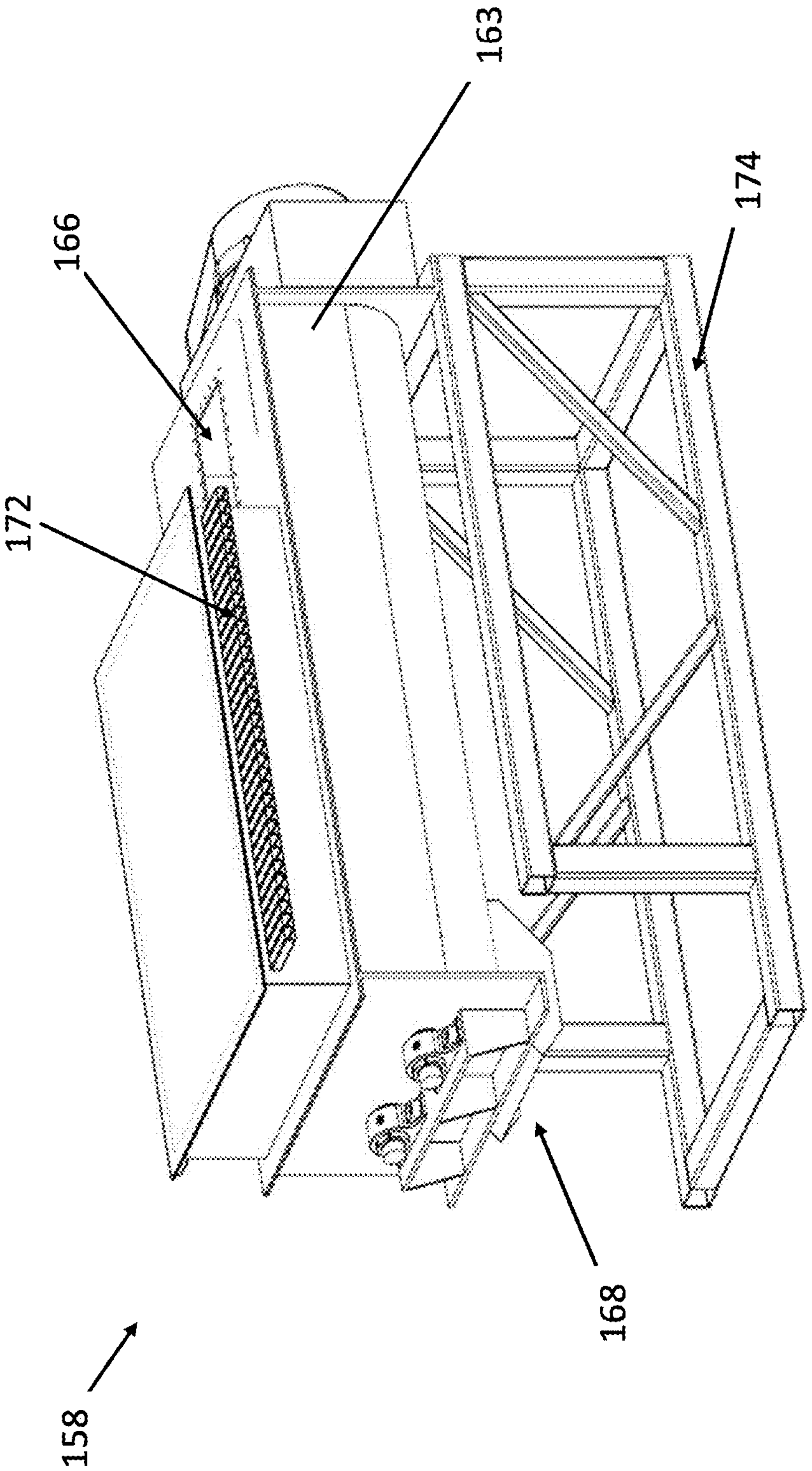
FIG. 12 is a perspective view of a mechanical processing apparatus for use with the multi-conveyor continuous material processing system of FIG. 10.
Figure 13:
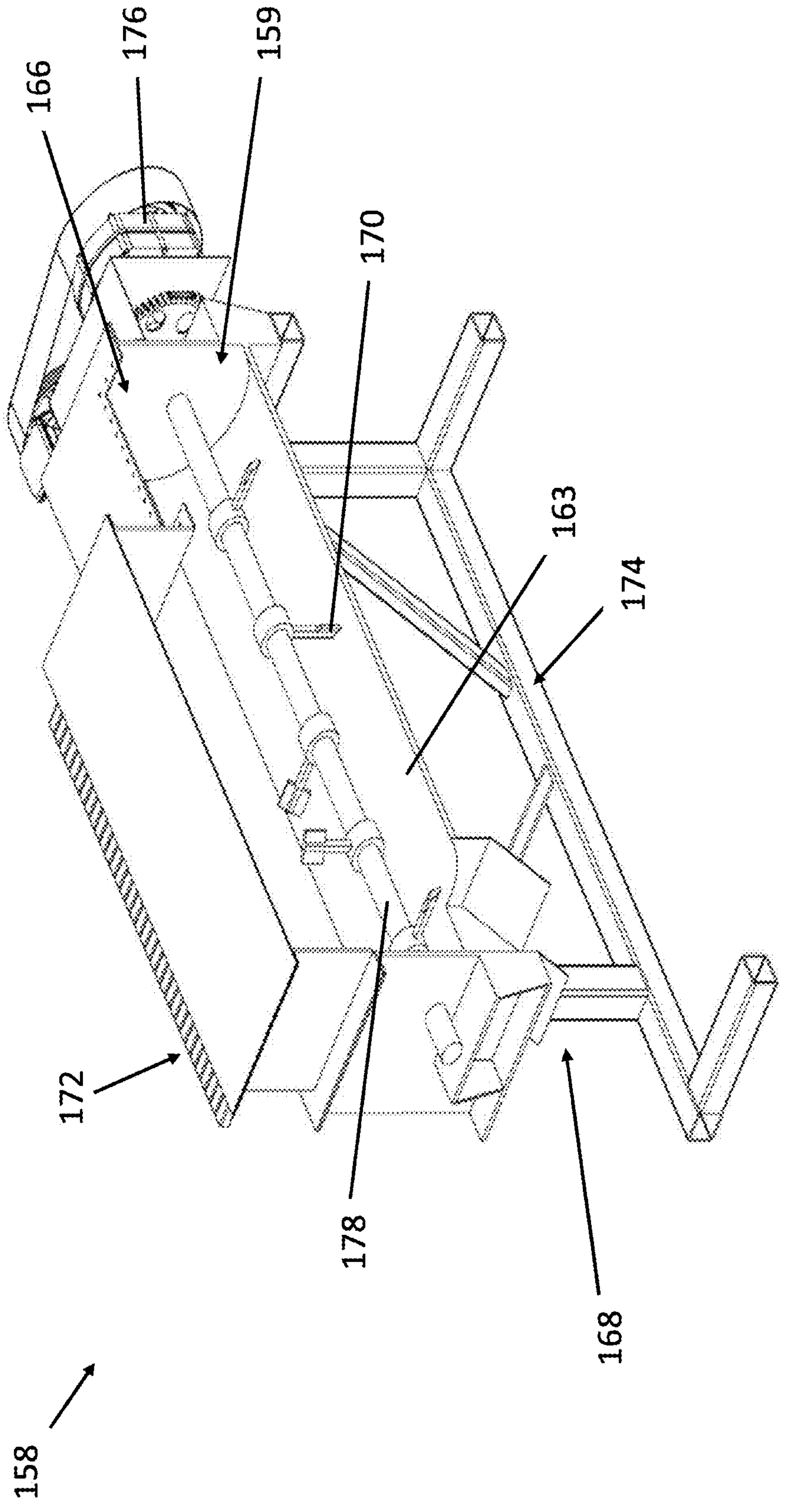
FIG. 13 is a partial cut-away view of the mechanical processing apparatus of FIG. 12.

FIGS. 12 and 13 show an example of the optional mechanical processing apparatus, e.g., mixer 158 of system 150 in greater detail. The mixer 158 generally includes a mixer trough 163 supported by a mixer support structure 174, which can be height-adjustable in various embodiments. The mixer 158 also preferably comprises one or more mixer vents 172, and a mixer material inlet 166 and outlet 168. With reference to the cross-sectional view of the mixer 158 in FIG. 13, the mixer trough 163 has an interior 159 for holding and mixing a material being processed. The mixer trough 163 also supports a mixer shaft 178 (e.g., via one or more bearings, not shown) that is operatively driven by a mixer motor 176. Connected to and protruding from the mixer shaft 178 are one or more mixer axially-mounted paddles 170 that are configured to mix a material held within the interior 159 of the mixer trough 163. Optionally, various heat exchanger components and/or heat recovery components or features can be positioned within or near the mixer 158. As shown the material is not heated during mixing within mixer 158. However, in alternative embodiments, the material can be heated while in the mixer 158. Multiple mixer shafts 178 can optionally be included in mixer 158.

Figure 14:
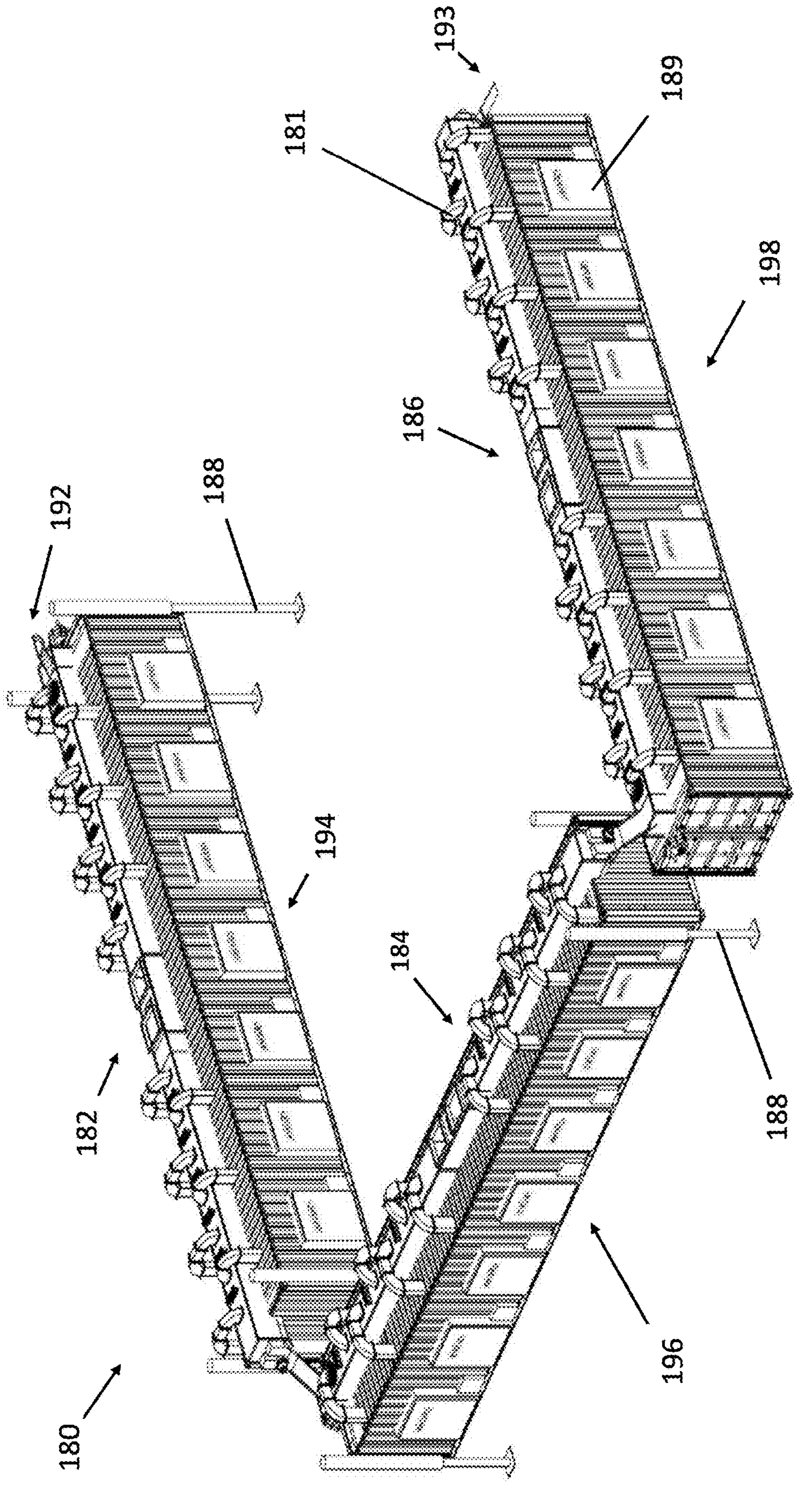
FIG. 14 is a perspective view of a mobile multi-conveyor unit continuous material processing system, according to various embodiments.
Figure 15:
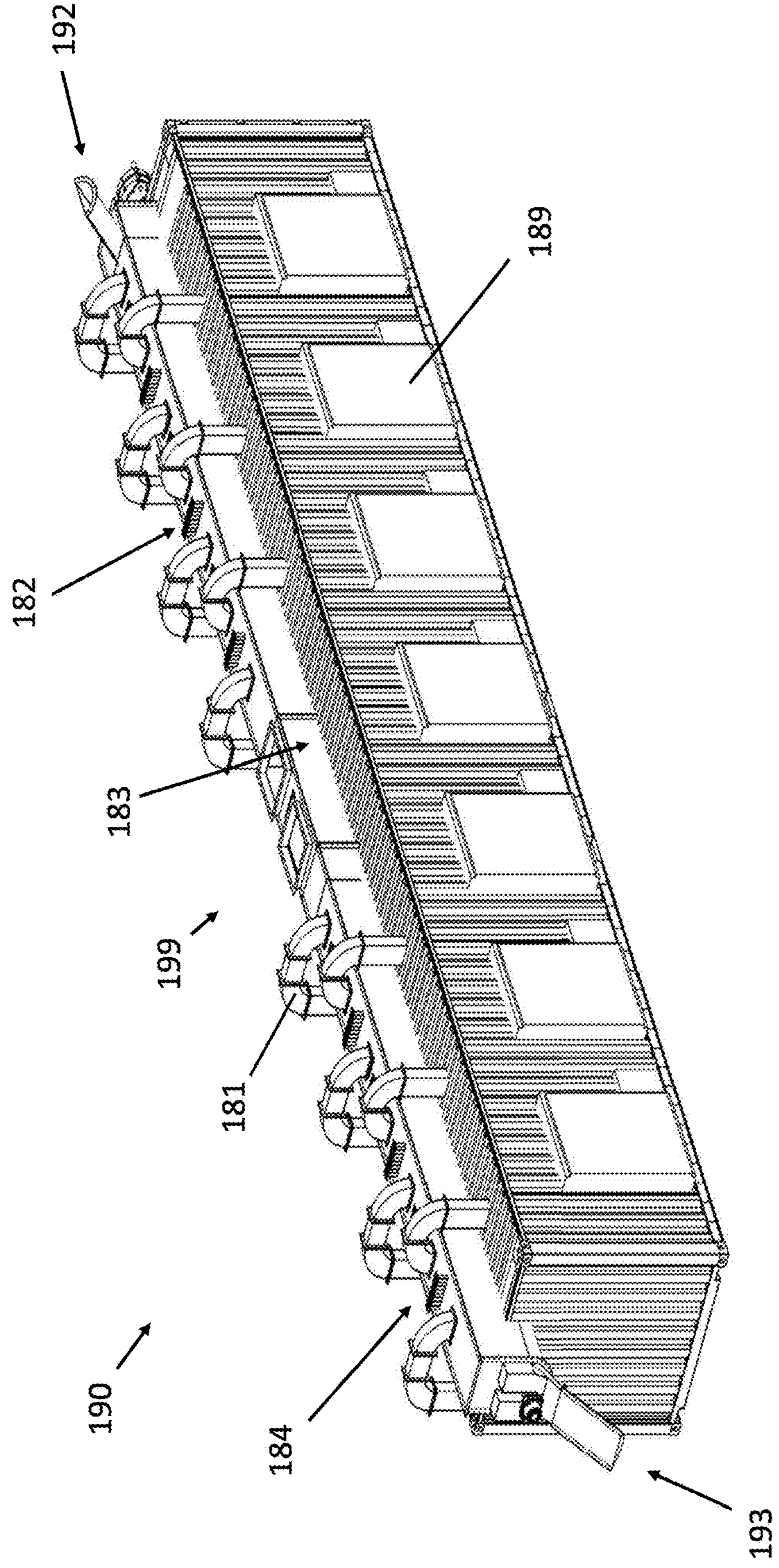
FIG. 15 is a perspective view of an alternative mobile multi-conveyor continuous material processing system, according to various embodiments.

FIGS. 14 and 15 show various mobile multi-conveyor continuous processing systems, including 180 (three conveyor unit) and 190 (two conveyor unit).

Mobile and/or modular multi-conveyor continuous processing systems, such as systems 180 or 190, can be beneficially modular and easily transported. With mobile and/or modular systems, scalability of production can be improved because additional mobile units can be added for a jobsite as needed, provided there is sufficient space, and without having to do any additional fabrication.

As shown in FIG. 14, a three-module, mobile multi-conveyor material mixer and processing system 180 is shown. The system 180 as shown is composed of three generally similar mobile container units 194, 196, and 198, each comprising a conveyor unit 182, 184, and 186, respectively. As shown, each mobile container unit also comprises one or more microwave units 189, one or more waveguides 181, and optionally one or more system material inlet 192 and/or outlet 193. According to some embodiments, each mobile container unit 194, 196, and/or 198 is one or more reused or modified industry standard corrugated steel shipping container. Various openings and/or portions can be removed or modified such that the various components can fit onto or within each mobile container unit. The conveyor units 182, 184, 186 are generally positioned above or on an upper portion of the respective mobile container unit 194, 196, 198. The microwave heating or power units 189 are shown as being at least partially integrated into the mobile container units 194, 196, 198, and at least a portion of each microwave heating unit 189 can be exposed to the outside when installed within the mobile container unit.

Each mobile container unit 194, 196, 198 can further be provided with a mechanism for adjusting a vertical position of height of the mobile container unit operative components, such as the conveyor unit. The mechanism can include one or more adjustable height support structures 188, e.g., four with one positioned at each corner of each mobile container unit. The first mobile container unit 194 is positioned at a more raised position, the second mobile container unit 196 is positioned at a less raised position, and the third mobile container unit 198 is positioned at a fully lowered position, e.g., set on a ground or floor without use of the adjustable height support structures 188. Although a mixer (e.g., 158) or a lifting conveyor (e.g., 160) are not shown in the system 180, in other embodiments one or more mixers and/or lifting conveyors can be utilized with the system 180, and can be integrated into one or more mobile container units, such as 194, 196, and/or 198.

FIG. 15 shows an alternative mobile multi-conveyor material mixer and processing system 190 with a single combined mobile container unit 199 with two conveyor units 182, 184 therein. As shown, a single container, such as a shipping container, can be modified to receive two conveyor units 182, 184 in sequence, and optionally can include a mixing and/or venting chamber 183 positioned between the first and second conveyor units 182, 184. Multiple systems 190 can be operated in parallel in order to adjust a throughput of heated material according to a particular need or desire for a mobile operation.

FIGS. 16-31 illustrate various arrangements of features of microwave suppression tunnels or chutes, such as the inlet suppression tunnel 202 or the outlet suppression tunnel 200. As used in this disclosure, the inlet suppression tunnel 202 and the outlet suppression tunnel 200 can be operatively similar and the features of either can be incorporated into the other in various embodiments. Although the inlet suppression tunnel 202 is shown with a single flap 218, multiple flaps 218 can be used in the inlet suppression tunnel 202 among other features of the outlet suppression tunnel 200. Where multiple flaps 218 are used, the flaps 218 can be optionally spaced at about six-inch (15.2 cm) intervals or any other suitable interval.

Figure 16:
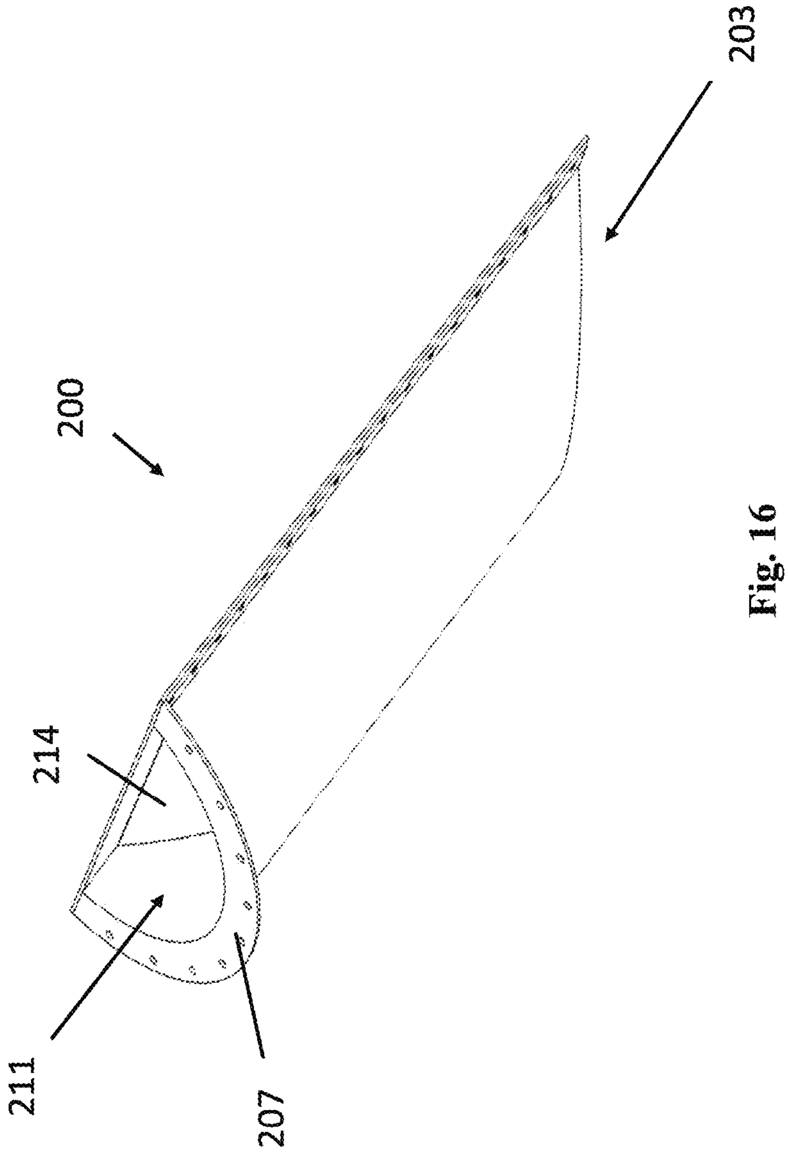
FIG. 16 is a perspective view of a microwave suppression tunnel, according to various embodiments.

As shown in FIG. 16, the outlet suppression tunnel 200 can be configured to include one or more microwave absorbing, deflecting, or blocking flaps 214, variously including inlet and outlet suppression tunnel embodiments. Each suppression tunnel can be located attached to or comprised within a material inlet (e.g., inlet suppression tunnel 202) or outlet (e.g., outlet suppression tunnel 200) of various conveyor units as described herein. The outlet suppression tunnel 200 preferably comprises a chute flange 207 for attachment at or near a conveyor unit outlet, or the like. The outlet suppression tunnel 200 can also be configured for use as an "inlet" suppression tunnel with only minor changes, such as changing the location of the chute flange 207, a direction of permitted flap 214 movement relative to the outlet suppression tunnel 200, positioning, and the like. The flap 214 can be a single unit that is movable, flexible, or the like as described below. Flap 214 is attachable and/or pivotably attached to an upper portion of the outlet suppression tunnel 200.

Figure 17:
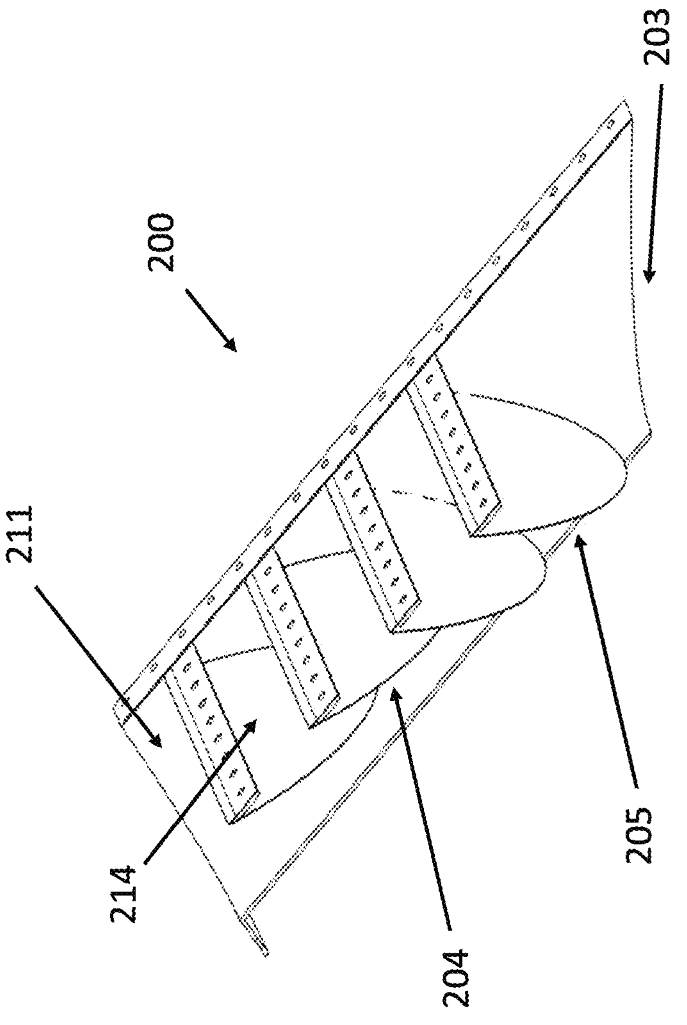
FIG. 17 is a partial cut-away view of the microwave suppression tunnel of FIG. 16.
Figure 19:
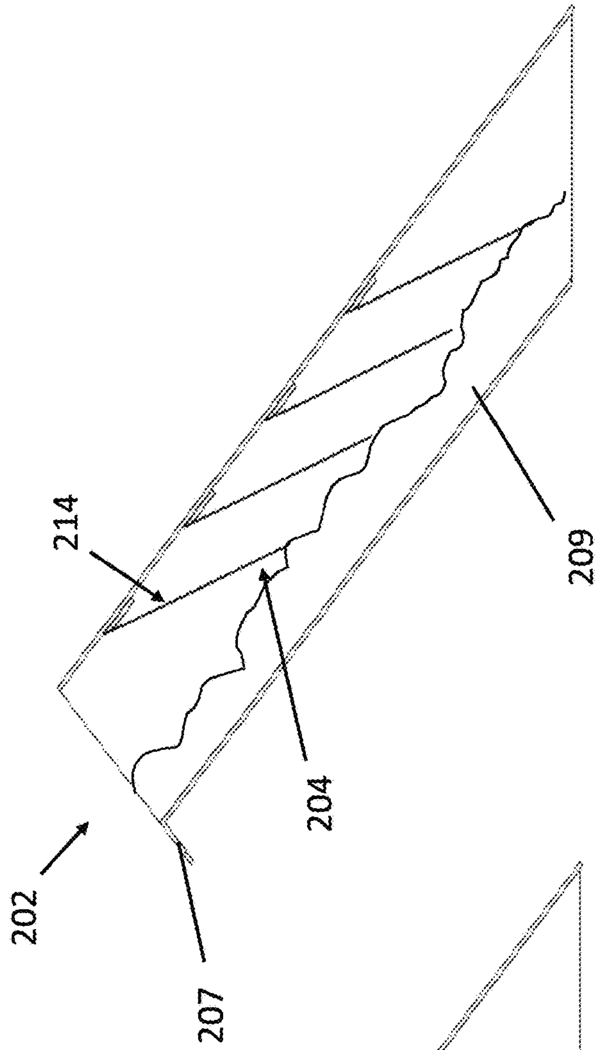
FIG. 19 is cross-sectional side view of the microwave suppression tunnel of FIG. 16, showing multiple flaps in an open position as flowing material passes the flaps.
Figure 18:
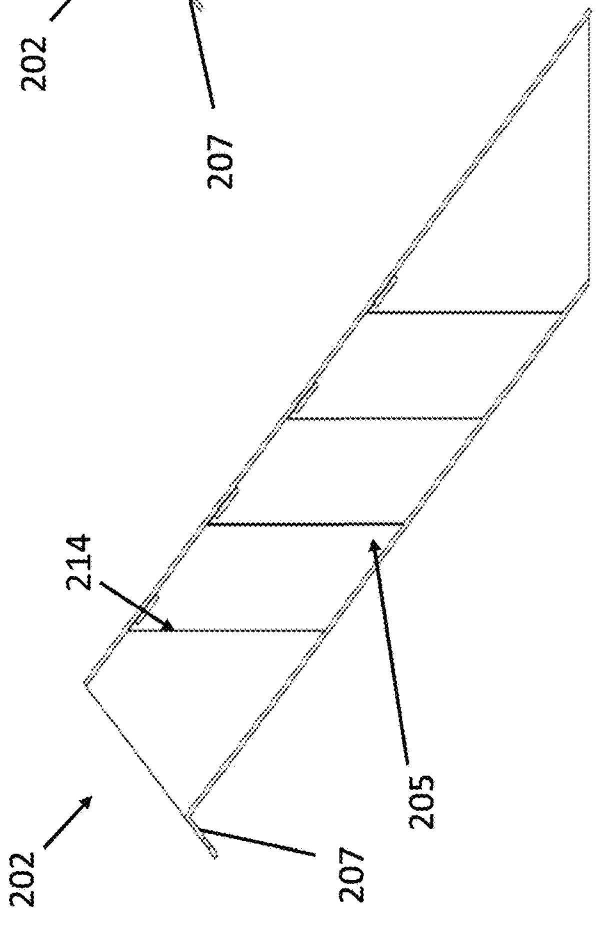
FIG. 18 is cross-sectional side view of the microwave suppression tunnel of FIG. 16, showing multiple flaps in a closed position.
Figure 21:
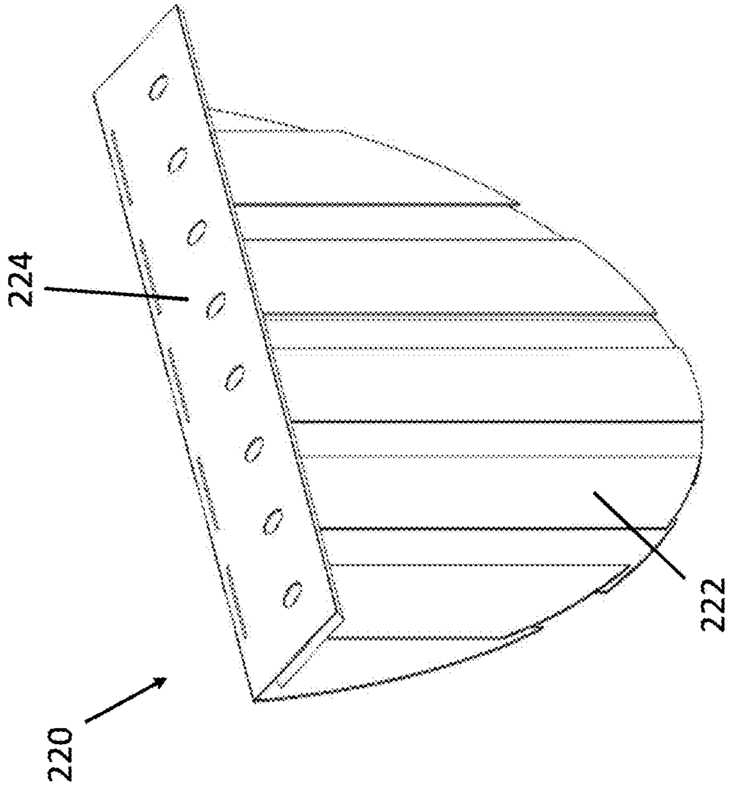
FIG. 21 is a perspective view of the alternative arrangement mesh strip flap of FIG. 20.
Figure 20:
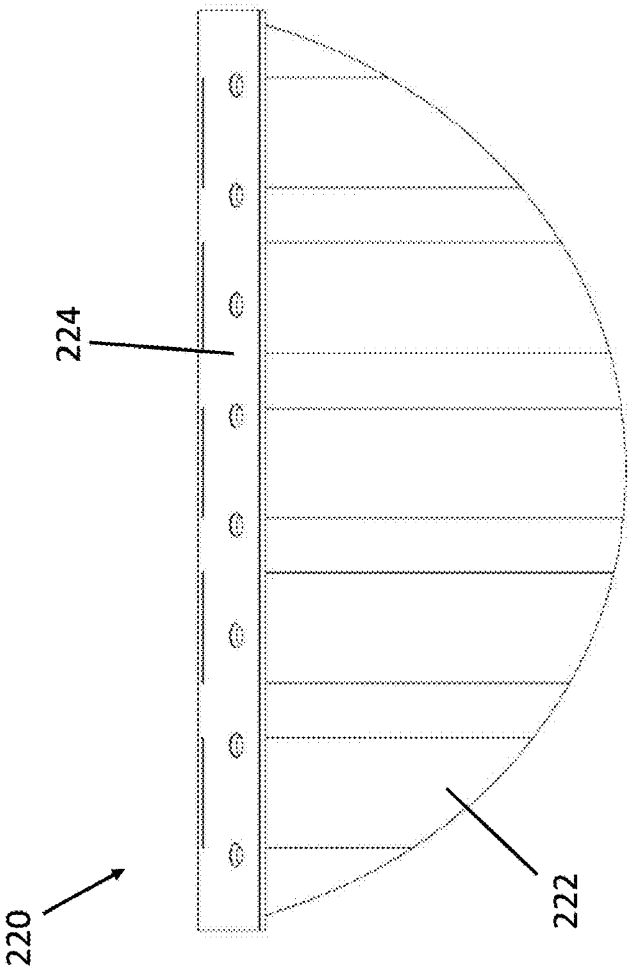
FIG. 20 is a front view of an alternative arrangement mesh strip flap for use in a microwave suppression tunnel.

Shown in perspective cross-sectional view in FIG. 17, the outlet suppression tunnel 200 includes flaps 214 that can move from a default, closed position 205 of the flap 214 as it contacts the outlet suppression tunnel 200, to a dynamic, open position 204 as precursor material 209 flows past (see FIG. 19), and applies a pressure on the flap 214, thereby opening it until the precursor material 209 stops flowing or is cleared from the outlet suppression tunnel 200 (see FIG. 18). The outlet suppression tunnel 200 as shown in FIGS. 16 and 17 includes an attachment side, tunnel inlet 211, and an exit side, tunnel outlet 203.

An alternative embodiment of a flap 220 for use herein, is instead composed of multiple sub-portions 222, such as strips of microwave blocking, deflecting, or absorbing material, which are attached to an attachment flange 224 of the flap, which is usable for attachment (e.g., pivotable attachment) of flap 220 to an upper portion of the suppression tunnel 220. In yet further alternative embodiments of suppression flaps, chains, combinations of materials, or any other suitable microwave-suppression composition can be utilized.

Figure 22:
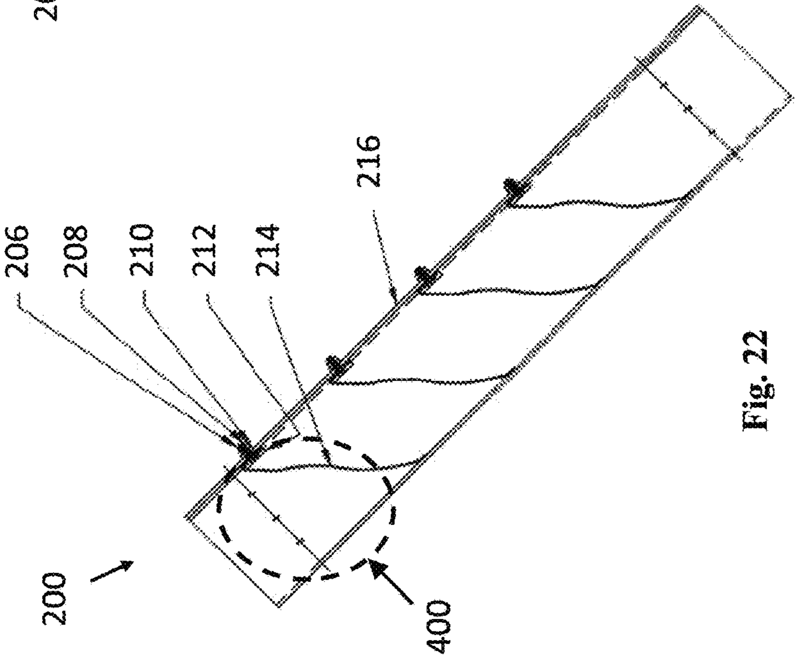
FIG. 22 is a cross-sectional side view of a U-shaped microwave suppression tunnel of an outlet side.

FIG. 22 is a cross-sectional side view of a U-shaped outlet suppression tunnel 200 of an outlet side. As shown, a series of four, single-ply (e.g., single layer) microwave suppression flaps 214 are shown in the outlet suppression tunnel 200 in a down position. At hardware detail section 400 of FIG. 28, flaps 214 can be attached to a top outlet side portion 216 of the outlet suppression tunnel 200 along with attachment hardware including bolt fastener 206, nut 208, bolt washer 210, metal bracket 212, and shielding mesh flap 214.

Figure 23:
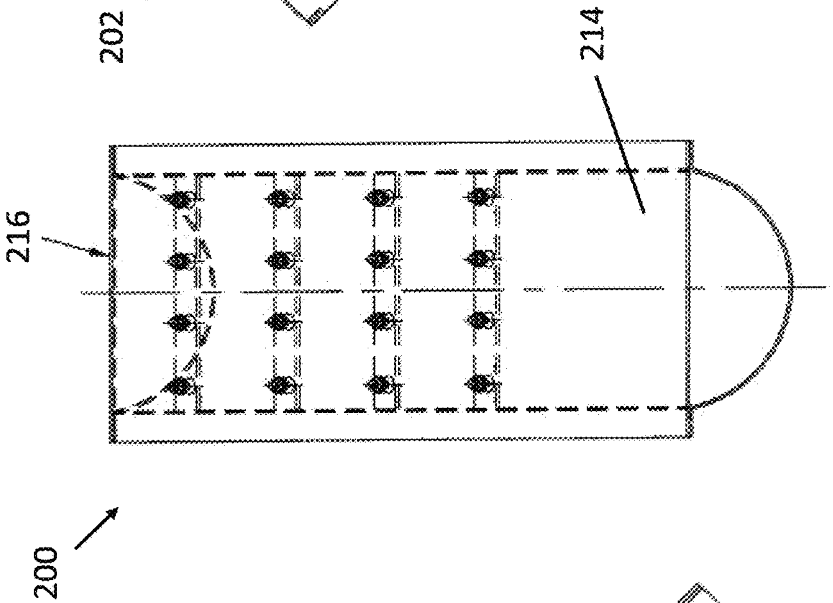
FIG. 23 is a cross-sectional top view of the U-shaped microwave suppression tunnel of FIG. 22.

FIG. 23 is a cross-sectional top view of the outlet U-shaped microwave outlet suppression tunnel 200 of FIG. 22. As shown, multiple attachment points (e.g., using hardware shown at FIG. 28) for each flap 214 are contemplated, although any suitable attachment or arrangement for the flap 214 is also contemplated herein.

Figure 24:
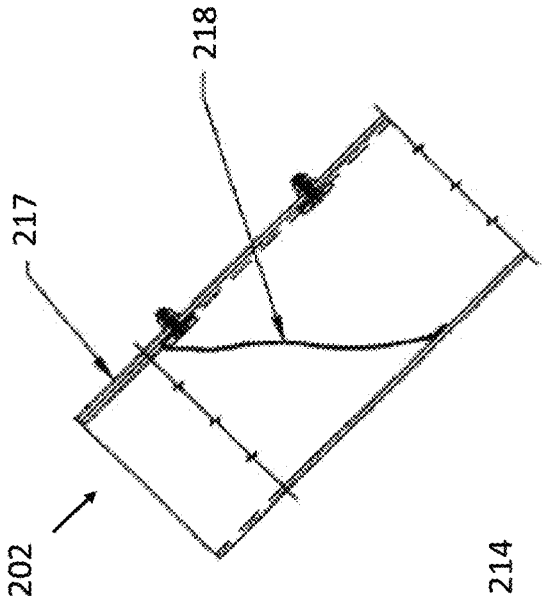
FIG. 24 is a cross-sectional side view of a U-shaped microwave suppression tunnel of an inlet side.

FIG. 24 is a cross-sectional side view of a U-shaped inlet microwave suppression tunnel 202 for use with or connection to an inlet side of a conveyor unit, such as conveyor unit 152 of the system 100. System 100 described above with reference in particular to FIGS. 1-4 can have inlet and outlet ends of a continuous motion particle pathway (e.g., motivated by auger 106 or other conveyance mechanism of the conveyor unit 152), an inlet suppression tunnel 202 can be used with or without an outlet suppression tunnel 200 as shown in FIGS. 22 and 23. A single, single-ply (e.g. single layer) microwave suppression flap 218 is shown in FIG. 24 attached to a top inlet side portion 217, e.g., using hardware as shown and described with respect to FIG. 28, below. As shown in the embodiments of FIGS. 22-24, the outlet/inlet suppression tunnels 200 and 202 use a single-ply (e.g., single layer) microwave-absorbing, deflecting, or blocking mesh flap 214 or 218, respectively. With reference to mesh flaps 214 and 218 and the like, the term "absorbing" is understood generally to optionally include any of absorbing, deflecting, blocking, and/or any other suppression technique of microwaves.

Figure 25:
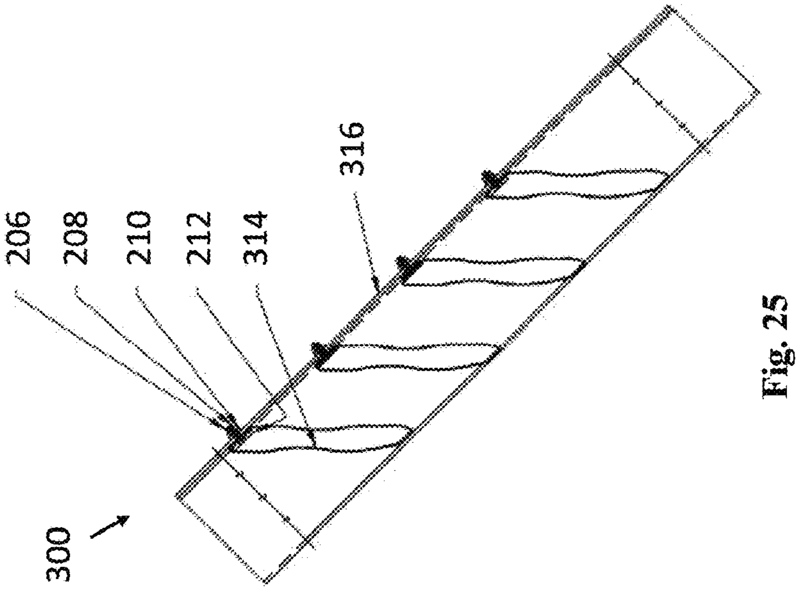
FIG. 25 is a cross-sectional side view of a rectangular microwave suppression tunnel of an inlet side.
Figure 26:
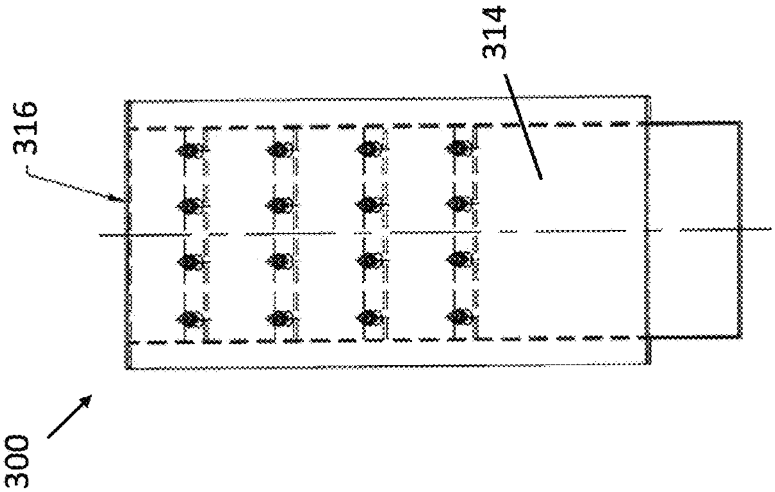
FIG. 26 is a cross-sectional top view of a rectangular microwave suppression tunnel of FIG. 25.
Figure 27:
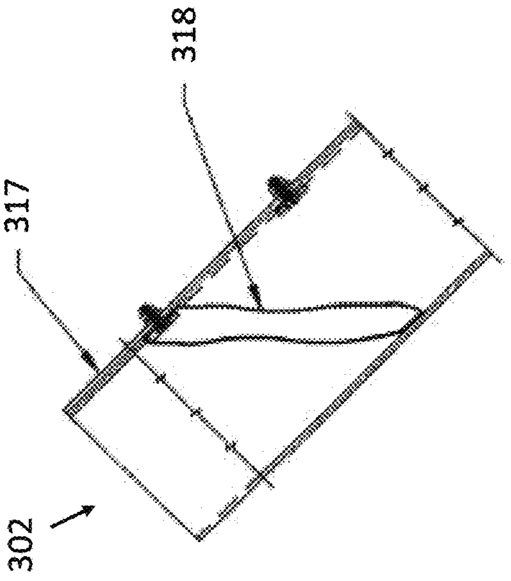
FIG. 27 is a cross-sectional side view of a rectangular microwave suppression tunnel of an outlet side.

FIGS. 25-27 illustrate alternative embodiments where mesh flap(s) 314, 318 are doubled over as two-ply for increased microwave absorption. FIGS. 25-27 are similar to FIGS. 22-24, respectively, with the exception of the folded over, two-ply (two layer) mesh flap(s) 314, 318.

FIG. 25 is a cross-sectional side view of a rectangular microwave outlet suppression tunnel 300. Four flaps 314 are shown, and each flap 314 can be attached to a top portion 316 of the outlet suppression tunnel 300 along with attachment hardware including bolt fastener 206, nut 208, bolt washer 210, metal bracket 212, and shielding mesh flap 314.

FIG. 26 is a cross-sectional top view of the rectangular microwave outlet suppression tunnel 300 of FIG. 25. FIG. 27 is a cross-sectional side view of a corresponding rectangular microwave inlet suppression tunnel 302. Folded flap 318 is attached to top outlet side 317.

Figure 28:
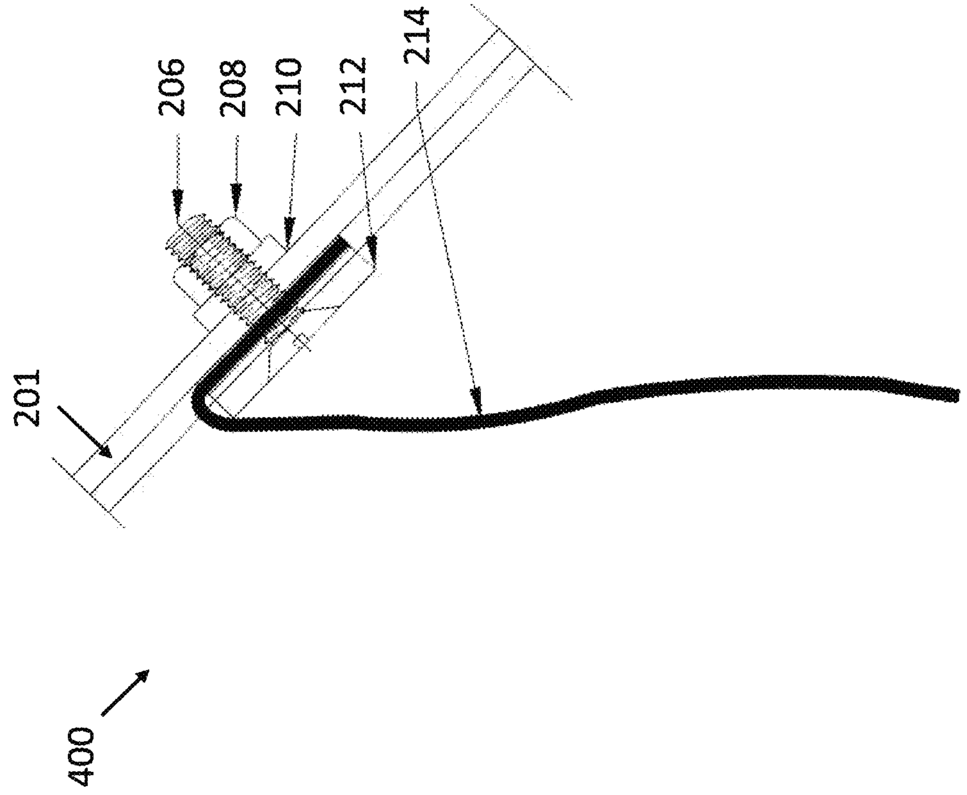
FIG. 28 is a schematic side view of a hardware detail section of a non-looped microwave absorbing flap with a mesh attached to a microwave suppression tunnel.

FIG. 28 shows greater detail of hardware detail section 400 of FIG. 22. As shown, a flap 214 can be attached to (e.g., a top inlet or outlet side portion) of a suppression tunnel along with attachment hardware including bolt fastener 206, nut 208, bolt washer 210, metal bracket 212, and shielding mesh flap 214. FIG. 28 shows a side view of a non-looped, single-ply microwave absorbing, deflecting, or blocking flap 214 with a microwave-absorbing, deflecting, or blocking mesh described in greater detail in this disclosure that is attached to an upper portion of a suppression tunnel (or chute thereof, etc.). Only one fastening arrangement is shown at hardware detail section 400, but other arrangements are contemplated. In other embodiments, the flap 214 with mesh can be looped, causing a two-ply (e.g., two layer) flap to be attached at two ends in a manner similar to the fastening arrangement shown at hardware detail section 400.

Flap 214 as shown in FIG. 28 (and any other embodiments of flaps herein) is preferably electrically grounded to a heating system frame 201. The heating system frame 201 is preferably grounded to a power source electrical grid (not shown) according to various embodiments.

Turning now to FIGS. 29A-29C and 30A-30C, various cross-sectional end views are shown that provide detail of flap configuration within a suppression tunnel or chute in addition to flap articulation or flexing that occurs during continuous material (e.g., mineral) production and movement along the tunnel.

Inlet and/or outlet microwave suppression tunnels (e.g., 202, 200, etc.) can be positioned and connected relative to the continuous heating assembly or system as described herein. During heating operation, it is possible that at least some microwave energy will not be absorbed by material being heated or other components within the assembly. This non-absorbed, escaped, or "leaked," microwave energy can be unsafe, undesirable, or otherwise beneficial to avoid in practice. In order to address this shortcoming, one or more movable and/or pivotable flaps can be positioned at the inlet tunnel, the outlet tunnel, or both.

In various embodiments, a microwave absorbing, deflecting, or blocking flap, for inlet or outlet of material, such as mineral, can comprise a flexible mesh configured to feely pivot when contacted by moving precursor material as described herein. Inlet and/or outlet microwave suppression tunnels can have rounded, rectilinear, or a combination of the two for an outline along the various tunnels.

In various embodiments, the various microwave suppression tunnels are preferably in a substantially horizontal position, but preferably at an angle of no more than 45 degrees from horizontal.

Figure 29A:
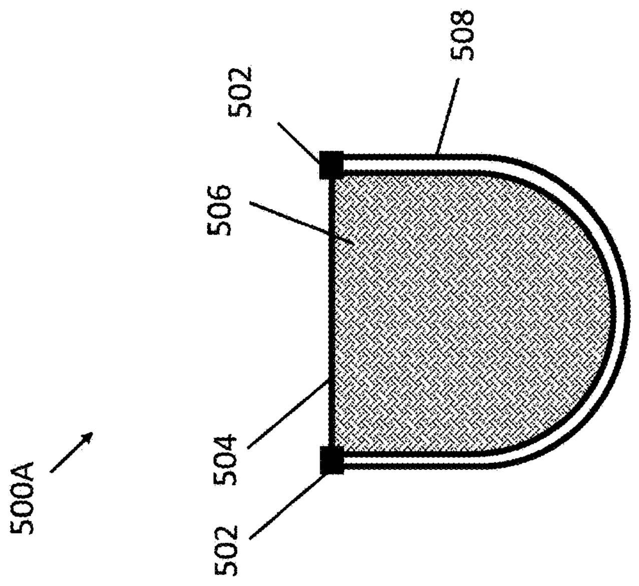
FIG. 29A is a cross-sectional end view of a U-shaped microwave suppression tunnel configuration with a top-mounted pivoting mesh flap in a closed position.

FIG. 29A is a cross-sectional end view of a U-shaped microwave suppression tunnel configuration 500A with a top-mounted pivoting mesh flap 506 in a closed position. Attachment points 502 show one alternative mounting configuration that allows flap 506 to pivot within U-shaped flap surround 508. The flap 506 can pivot along a top flap portion or axis 504, or can bend alternatively when a pressure is applied to the flap 506.

Figure 29B:
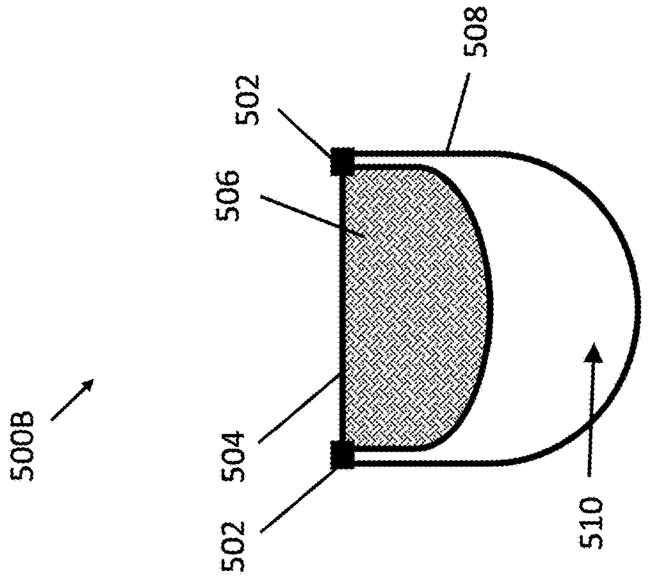
FIG. 29B is a cross-sectional end view of the U-shaped microwave suppression tunnel configuration of FIG. 29A with the mesh flap in a partially open position.

FIG. 29B is a cross-sectional end view of a U-shaped microwave suppression tunnel configuration 500B, similar to 500A of FIG. 29A with the mesh flap 506 in a partially open position. As particles are moved along a trough defined by surround 508, flap 506 can be caused to pivot or bend such that an opening 510 between the flap 506 and the surround 508 is revealed. Opening 510 can allow precursor material particles to pass while allowing minimal microwaves to escape. Particles of precursor material causing flap 506 to at least temporarily open can at least partially block microwaves that would otherwise have escaped the microwave suppression tunnel (e.g., outlet suppression tunnel 200 or inlet suppression tunnel 202, among other embodiments described herein).

Figure 29C:
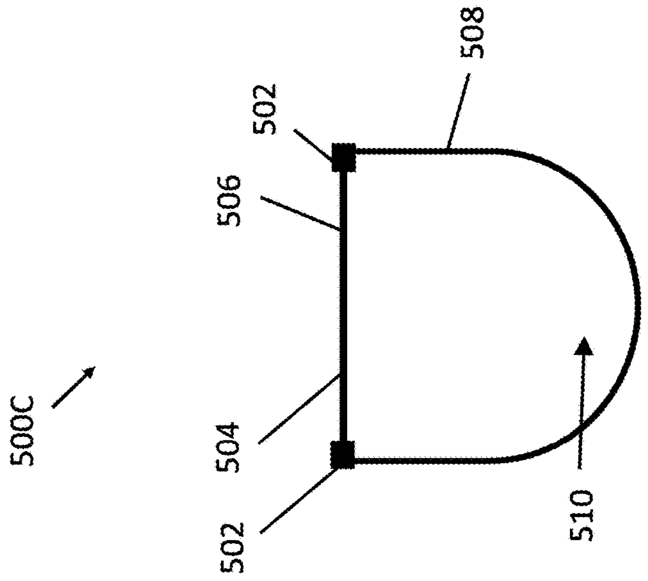
FIG. 29C is a cross-sectional end view of the U-shaped microwave suppression tunnel configuration of FIG. 29A with the mesh flap in a fully open position.

FIG. 29C is a cross-sectional end view of the U-shaped microwave suppression tunnel configuration 500C similar to 500A of FIG. 29A with the mesh flap 506 in a fully open position, causing a larger opening 510 than in configuration 500B.

Figure 30A:
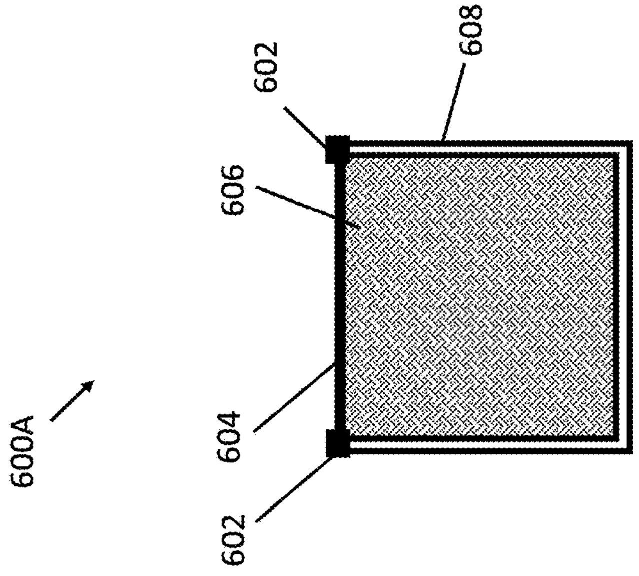
FIG. 30A is a cross-sectional end view of a rectangular microwave suppression tunnel configuration with a top-mounted pivoting mesh flap in a closed position.
Figure 30B:
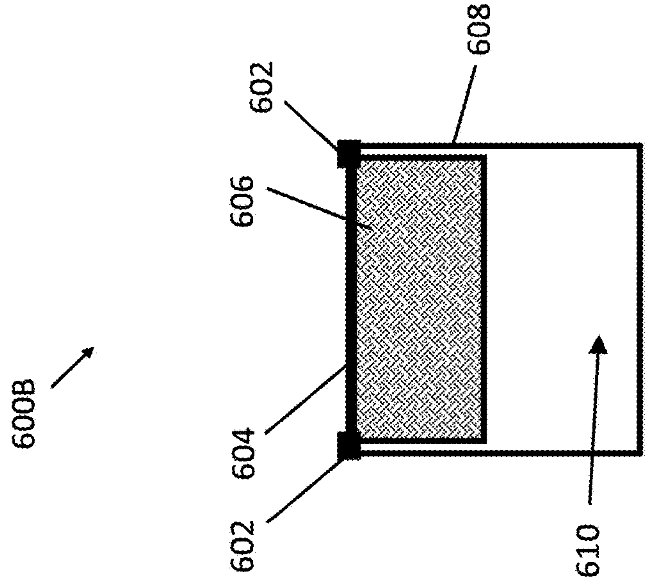
FIG. 30B is a cross-sectional end view of the rectangular microwave suppression tunnel configuration of FIG. 30A with the mesh flap in a partially open position.
Figure 30C:
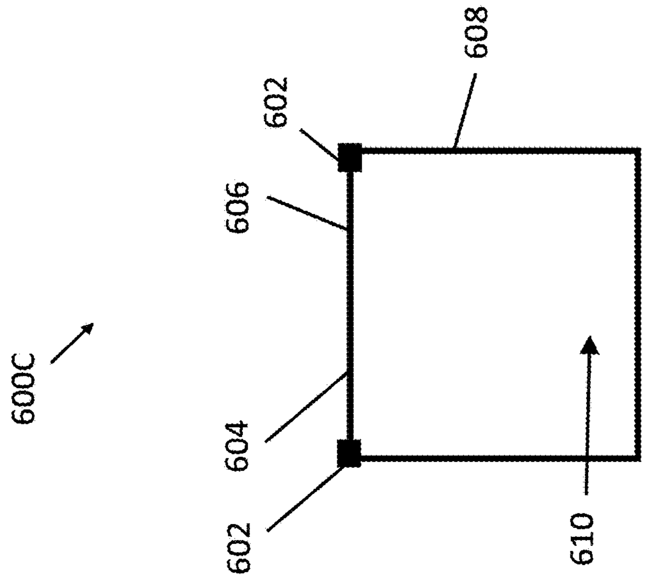
FIG. 30C is a cross-sectional end view of the rectangular microwave suppression tunnel configuration of FIG. 30A with the mesh flap in a fully open position.

The embodiments shown in FIGS. 29A-29C can also be configured to include a rectangular flap 606 with a corresponding rectangular tunnel or chute surround 608, as shown in FIGS. 30A-30C.

FIG. 30A is a cross-sectional end view of a rectangular microwave suppression tunnel configuration 600A with a top-mounted pivoting mesh flap 606 in a closed position. Attachment points 602 show one alternative mounting configuration that allows flap 606 to pivot within rectangular flap surround 608. The flap 606 can pivot along a top flap portion or axis 604, or can bend alternatively when a flowing material pressure is applied to the flap 606.

FIG. 30B is a cross-sectional end view of a rectangular microwave suppression tunnel configuration 600B, similar to 600A of FIG. 30A with the mesh flap in a partially open position. As precursor material particles are moved along a trough defined by surround 608, flap 606 can be caused to pivot or bend such that an opening 610 between the flap 606 and the surround 608 is revealed. Opening 610 can allow particles to pass while allowing minimal microwaves to escape. Material particles causing flap 606 to open can at least partially block microwaves that would otherwise have escaped the microwave suppression tunnel.

FIG. 30C is a cross-sectional end view of the rectangular microwave suppression tunnel configuration 600C similar to 600A of FIG. 30A with the mesh flap 606 in a fully open position, causing a larger opening 610 than in configuration 600B.

Figure 31:
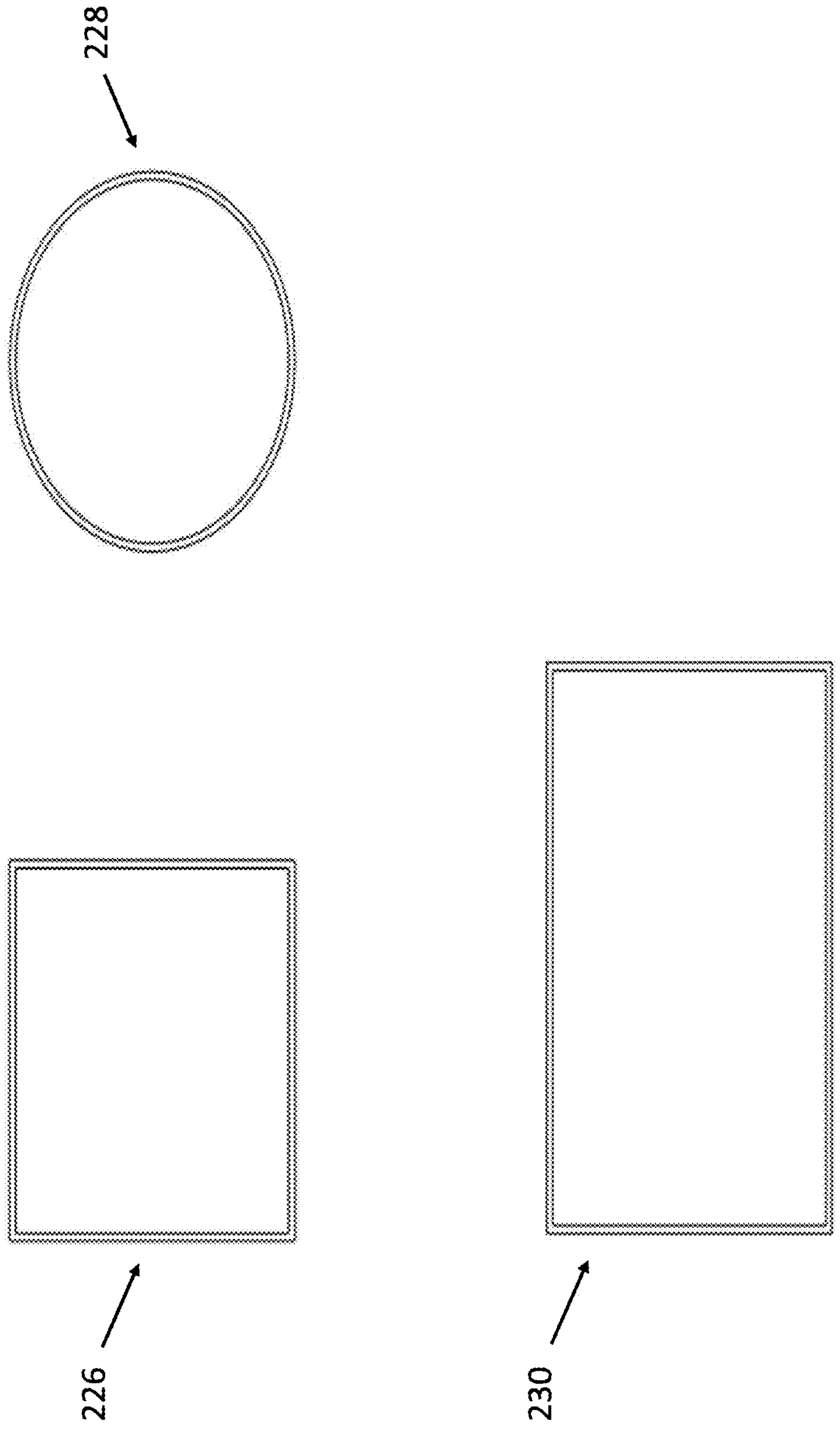
FIG. 31 shows various alternative chute cross-sectional shapes of a microwave suppression tunnel.

Many other microwave suppression system flap and tunnel configurations are also contemplated in this disclosure, and the examples above are merely shown as selected embodiments. Various embodiments and alternative cross-section shapes of chute are shown at FIG. 31. A generally square chute cross-section is shown at 226, a generally round chute cross-section is shown at 228, and a generally rectangular chute is shown at 230. Any other shape of chute or suppression tunnel (and correspondingly shaped flap[s]) is also contemplated herein.

Figure 32:
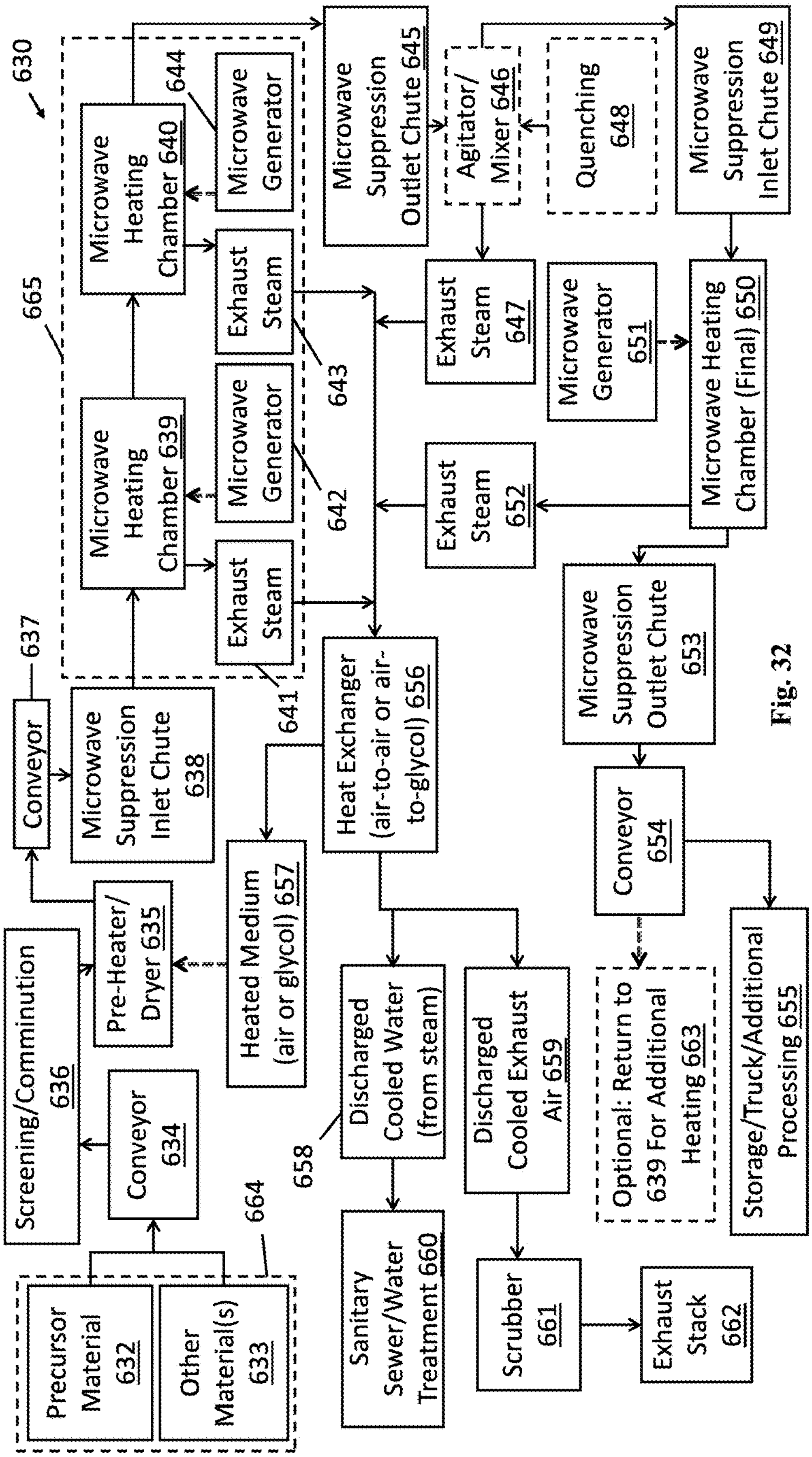
FIG. 32 is a flowchart of a process according to various embodiments of the present disclosure.

FIG. 32 is a flowchart of a process 630 according to embodiments of the present disclosure.

Process 630 can start with operations 632 and/or 633. At operation 632 of process 630, one or more hoppers (e.g., containers, piles, trailers, train cars, etc.) or other source of precursor material are received and optionally weighed. At operation 632, the one or more hoppers or other source of precursor material are optionally received and also optionally weighed. Any other material, such as an additional precursor material, quantity of precursor material(s), or various additives as described herein can be received at operation 633. In various alternative embodiments, and as shown at 664, multiple bins of various precursor materials and/or additives can optionally be combined with different and/or other materials (e.g., an additive, a liquid to create a slurry, for freezing, etc.) to obtain a precursor material blend. The optional precursor material blend for processing is referred to as "precursor material" (or simply "material") below for simplicity. In other optional and alternative embodiments, one or more precursor material can be combined with an additive such as cyanide, e.g., for a matter of time such as hours, days, or weeks in various embodiments, and in accordance with a pile of precursor materials. For example, certain types of precursor material may be mixed in small quantities to another precursor material for processing according to various properties.

Next, process 630 proceeds to operation 634, where a conveyor (e.g., a loader unit) carries precursor material to an optional pre-heater or drier at 635. The precursor (e.g., mined) materials and/or other materials from 632/633 can be assessed, and can be mechanically processed, such as being milled, screened, filtered, sorted, shredded, wetted, or crushed (comminution) at operation 636 (optionally before operation 635). In some cases, it may be beneficial to reduce a chunk size of a precursor material being processed. Optionally, a moisture/water content of the precursor material can be determined or an average moisture content level for the type of precursor material can be estimated and entered, particularly if the precursor material is received as a liquid-based, liquid-suspended, or otherwise finely crushed (e.g., comminution), flowable form, slurry or the like. Various slurries can include particle ranging in size from a grain of sand (or larger) to particles as small as a few micrometers (or smaller). By determining an initial moisture content, the initial weight of the precursor material can be used to predict or determine final dry weight and the mass of water to be removed. Also at 635, energy can be transferred to (or optionally away from) the pre-heater or dryer from a heated (or cooled) medium, such as air or glycol from operation 657, as discussed further below.

Following operation 635, the precursor material can be further moved using another conveyor at operation 637 until the precursor material reaches a microwave suppression inlet chute (or tunnel) at operation 638. Next, the precursor material can proceed to a microwave heating chamber (e.g., a trough of a conveyor unit), which can emit heated exhaust steam at 641, and can receive power via microwaves emitted by a microwave generator at 642 (e.g., via one or more waveguides as discussed herein).

Optionally, the precursor material for processing can then proceed to another microwave heating chamber of another conveyor unit at 640, which can also emit exhaust steam at 643 and/or receive microwave energy from another microwave generator at 644 (e.g., a microwave heating unit, etc.). As shown at 665, multiple heating sections can be added to get the required energy input to reach a specific throughput and/or reach a specification according to a regulation. After the precursor material is sufficiently heated in accordance with desired specifications, the material can proceed to as past a microwave suppression outlet chute (or tunnel) at 645.

As described herein, various mechanical processing steps are optionally performed. After the precursor material passes the microwave suppression outlet chute at 645, optionally the material can enter an agitator or mixer at 646. The precursor material when in the mixer 646 or other mechanical processing apparatus (if present) can emit exhaust steam at 647, and can optionally receive a liquid or other cooling substance for quenching at 648. It is contemplated that in some embodiments no mixer 646 is used, and the microwave heating chamber 640 can proceed to microwave heating chamber 650 without a mixer. If the mixer 646 is used, and once the precursor material is sufficiently mixed at 646, the material can proceed to another microwave suppression inlet chute (or tunnel) at 649.

At 650 (and similar to 639 and 640), the precursor material can proceed to a third microwave heating chamber at 650. The chamber 650 can also receive microwave energy via one or more microwave generator at 651, and exhaust steam can also be used to extract heat from the heated precursor material at 652. Once the precursor material is heated to a desired, final temperature (or final reaction point) and moisture content level at 650, the precursor material can proceed through another microwave suppression outlet chute at 653, and can proceed via a conveyor 654 to a storage medium, such as a silo or shipping truck at 655, among other destinations for storage or use, including at various remote locations or for additional processing locally or remotely. If the precursor material may benefit from additional processing (e.g., heating and/or drying), at 663, the precursor material being processed can be returned to, e.g., microwave heating chamber 639 (e.g., via microwave suppression inlet chute 638) for additional processing. Precursor material can be returned for additional processing two, three, four or any number of times and suitable based on target specifications of the precursor material. Final (or other additional) processing of the heated and/or fractured precursor material can then take place on-site or off-site at a specialized location. Mining-based precursor material processing can include multiple steps and the process 630 can provide more efficient and easier extraction of valuable purer minerals from ores, tailings, and the like.

Exhaust steam heat received at 641, 643, and/or 652 can be recovered as heat energy using one or more heat exchanger 656. The heat exchanger 656 can be an air-to-air heat exchanger, or an air-to-liquid (e.g., glycol) heat exchanger in various embodiments. The heat exchanger 656 can provide heat via a heated (or optionally cooled) medium at 657 to be used in the pre-heater (or optionally pre-cooler or freezer) or dryer 635 as discussed above.

Heat exchanger at 656 can discharge cooled water (from steam) at 658 and/or discharged cooled exhaust air at 659. The discharged cooled water at 658 can then proceed to a sanitary sewer or water processing at 660. Furthermore, the discharged cooled exhaust air at 659 can proceed to an optional scrubber at 661, and then to one or more exhaust stacks at 662. The optional scrubber at 661 can condense steam and reduce odors, emissions, and the like.

In some embodiments, a shielding mesh used for blocking or absorbing microwave emissions can be an aluminum mesh with a pitch or opening size of about 0.15" (3.81 mm) or less. The shielding mesh can be optionally encapsulated or coated in a protective substance, such as silicone or the like. In some embodiments, such silicone can reduce the likelihood of screens touching and resulting arcing. Reducing arching between screens can prolong useful life of the screen. Also contemplated is an aluminum particle filled silicone structure. Other variations and types of shielding mesh also contemplated are discussed below. Various flaps described herein can utilize a shielding mesh, as described above.

Figure 33:
FIG. 33 is a detail view of an RFI shielding mesh according to various embodiments.
Figure 34:
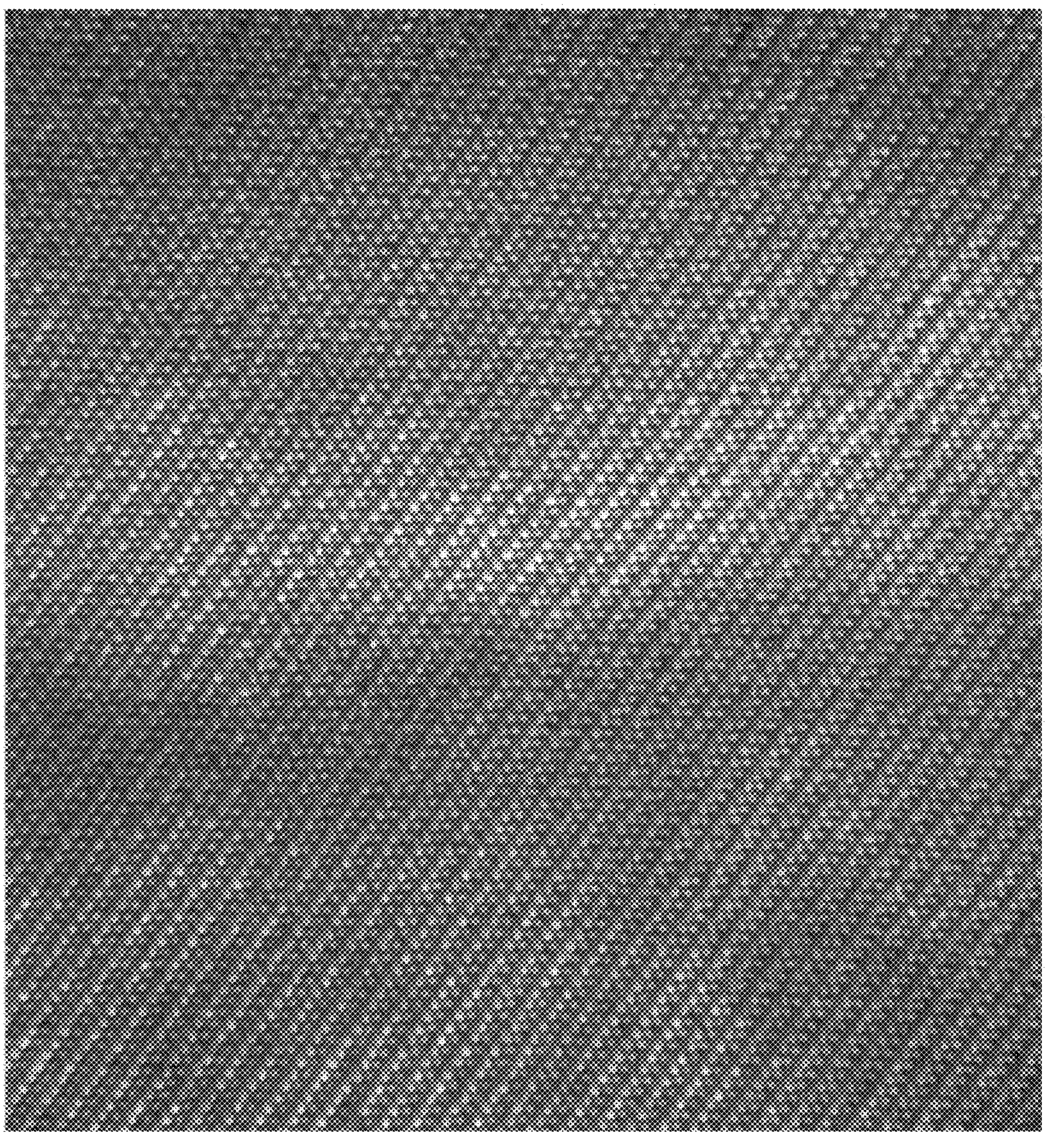
FIG. 34 is another view of the shielding mesh of FIG. 33.

FIGS. 33 and 34 show an embodiment of stainless-steel radio frequency interference (RFI) shielding mesh 700. The mesh 700 can be a carbon cover metal.

The shielding mesh 700 can be sourced from Aaronia USA/Aaronia AG. The shielding mesh 700 can be an 80 dB Stainless Steel RFI Shielding Aaronia X-Steel model, which can provide military or industrial grade screening to meet various demanding usage cases. In some embodiments, the shielding mesh 700 can be coated with a polytetrafluoroethylene (i.e., PTFE or "Teflon") coating, silicone, polyurethane, plastic, or the like.

The steel mesh 700 is preferably durable, effective up to about 600° C., operates under a very high frequency (VHF) range, and be permeable to air. In more detail, shielding mesh 700 is an Aaronia X-Steel component that can operate to at least partially shield both radio frequency (RF) and low frequency (LF) electric fields.

Some specifications of the shielding mesh 700 can include a frequency range of 1 MHz to 50 GHz, a damping in decibels (dB) of 80 dB, a shielding material including stainless steel, a carrier material including stainless steel, a color of stainless steel (silver), a width of 0.25 m or 1 m or some variation, a thickness of about 1 mm, available sizes of about 0.25 $m^2$ or 1 $m^2$, a mesh size of approximately 0.1 mm (multiple ply/layer), and a weight of approximately 1000 $g/m^2$. The shielding mesh 700 can be suitably durable, and can be configured and rated for use in industrial or other applications, can have a temperature range up to 600° C., can be permeable to air, and permit easy handling.

In some embodiments, the shielding mesh 700 can be electromagnetic compatibility (EMC) screening Aaronia X-Steel from Aaronia AG, which can be made from 100% stainless steel fiber. The shielding mesh 700 can meet various industrial or military standards. The shielding mesh 700 can be very temperature stable for at least 600° C., does not rot, is permeable to air. The shielding mesh 700 can be suitable for EMC screening of air entrances and can be very high protective EMC clothing, etc. The shielding mesh 700 can protect against many kinds of RF fields and can offer a 1000-fold better shielding-performance and protection especially in the very high GHz range as compared to various other types of shielding mesh. The shielding mesh 700 provides high screening within the air permeable EMC screening materials. Application embodiments of the shielding mesh 700 include: Radio & TV, TETRA, ISM434, LTE800, ISM868, GSM900, GSM1800, GSM1900, DECT, UMTS, WLAN, etc.

Figure 35:
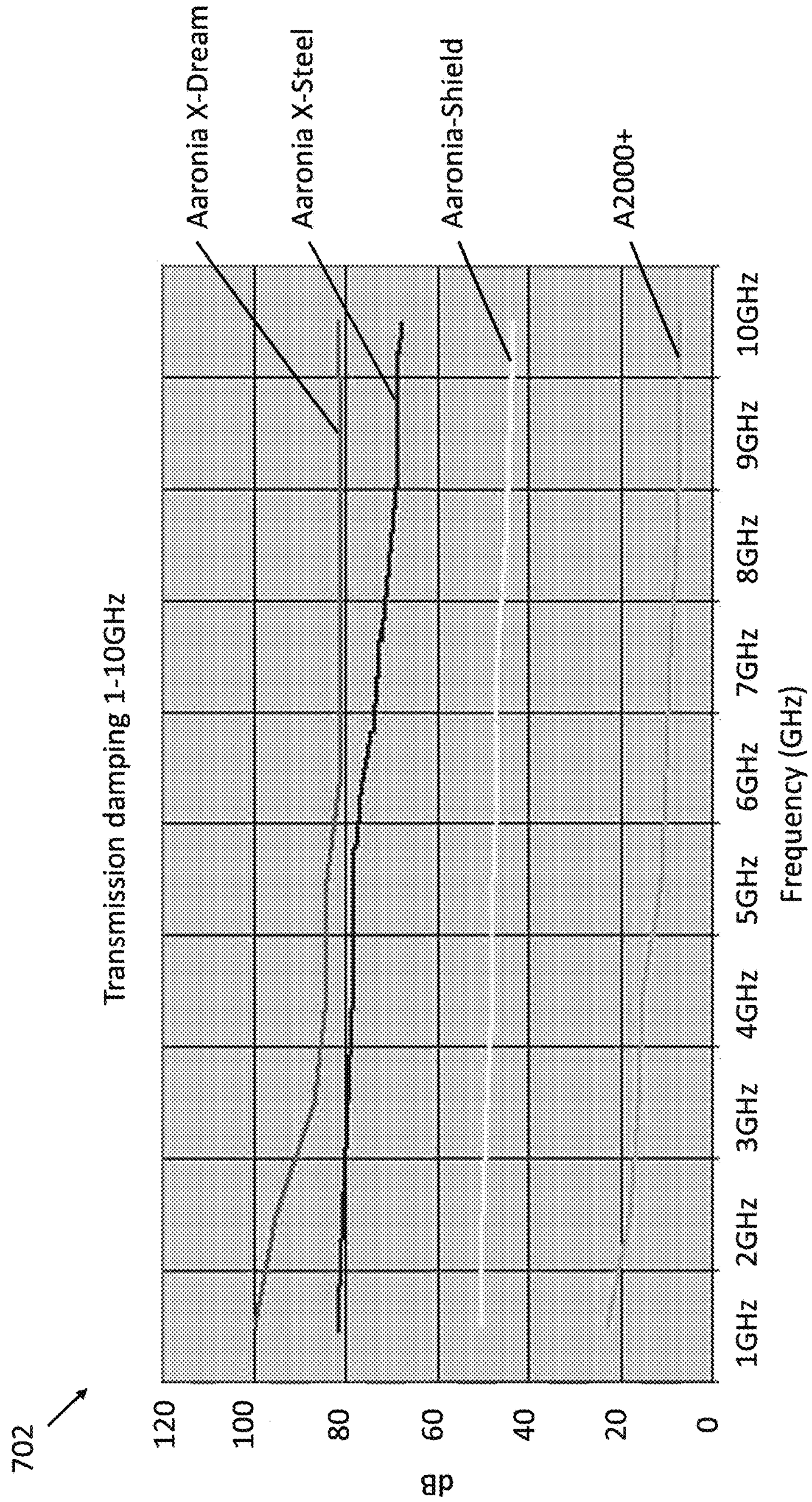
FIG. 35 is a transmission damping chart of the shielding mesh according to FIG. 33.

FIG. 35 shows a transmission damping chart 702 for various shielding mesh embodiments from 1-10 GHz in terms of dB for the mesh 700 of FIGS. 33 and 34. As shown, four shielding meshes are depicted. As shown, in descending order for transmission damping across 1-10 GHz, are Aaronia X-Dream, Aaronia X-Steel, Aaronia-Shield, and A2000+.

Figure 36:
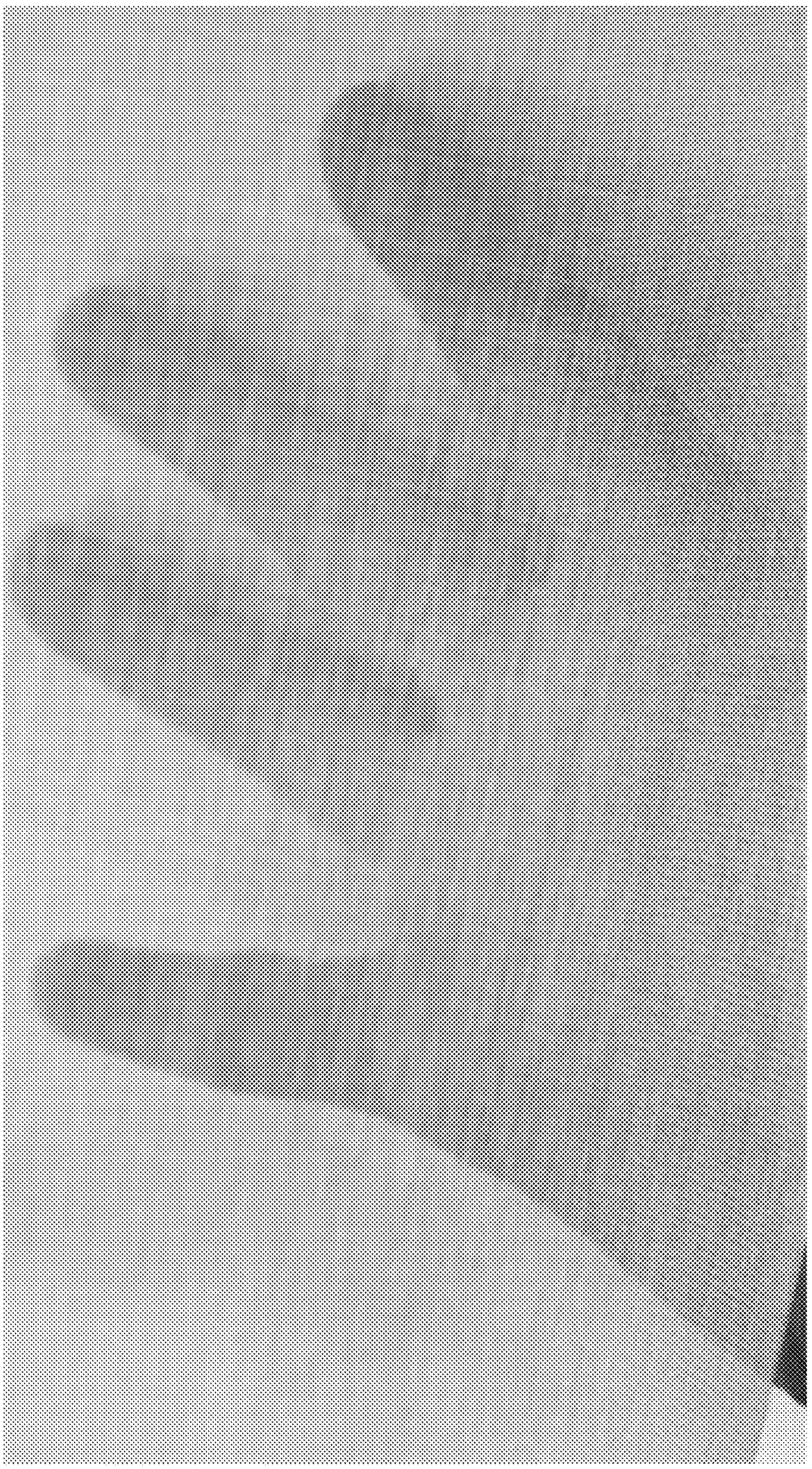
FIG. 36 is a detail view of another shielding mesh according to various embodiments.
Figure 37:
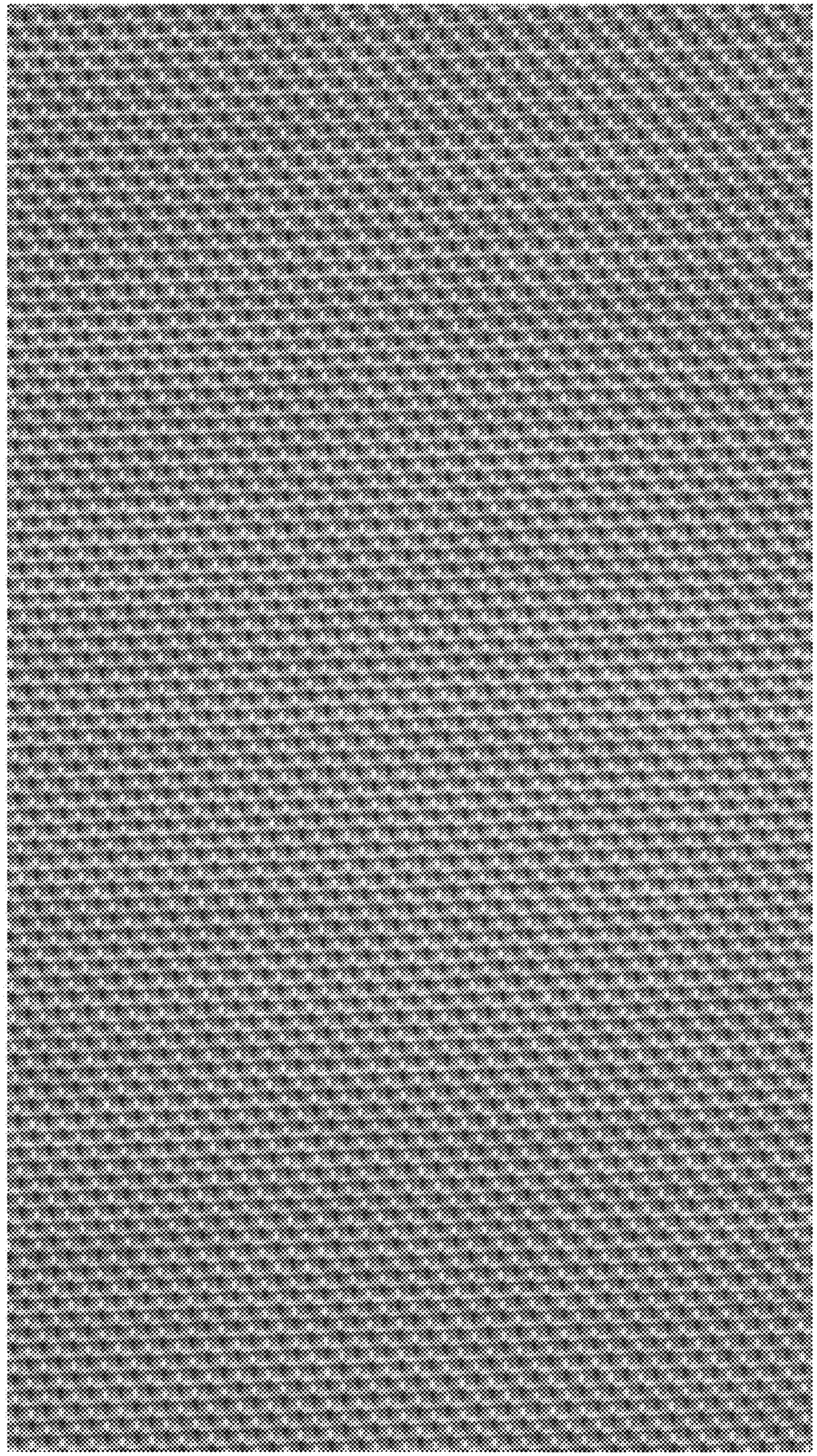
FIG. 37 is another view of the shielding mesh of FIG. 36.

FIGS. 36 and 37 show another embodiment of shielding mesh, a fireproof shielding fabric mesh 800. The fireproof shielding fabric mesh 800 can be sourced from Aaronia AG, and is a stainless-steel EMC/EMF shielding mesh for usage under extreme conditions. The fireproof shielding mesh 800 is usable up to 1200° C., can be half transparent, has high attenuation, and is both odorless and rot resistant. The fireproof shielding fabric mesh 800 has microwave attenuation as follows: 108 dB at 1 kHz, 100 dB at 1 MHz, 60 dB at 100 MHz, 44 dB at 1 GHz, 30 dB at 10 GHz.

Some example specifications of the fireproof shielding fabric mesh 800 include: lane Width: 1 m; thickness: 0.2 mm; mesh size: about 0.1 mm; color: stainless steel; weight: approx. 400 g/m; usable until about 1200° C.; yield strength: 220 MPa; tensile strength: 550 MPa; hardness: 180 HB; can be breathable; odorless; transparent; rot resistant; frost proof; washable; foldable; bendable; mesh material: stainless steel.

The fireproof shielding fabric mesh 800 has screening performance for static fields of: 99.9999% to 99.99999% (e.g., when grounded). The fireproof shielding fabric mesh 800 has screening performance for low electric fields of: 99.9999% to 99.99999% (e.g., when grounded). The fireproof shielding fabric mesh 800 is suitable for industrial applications as well as for research and development. The fireproof shielding fabric mesh 800 is designed for use under adverse conditions (e.g., salt air, extreme temperatures, vacuum, etc.).

The fireproof shielding fabric mesh 800 is made of 100% stainless steel, is temperature stable up to 1200° C., has a high microwave attenuation, and yet is breathable. The material of mesh 800 absorbs reliable E&H fields. In particular, in the kHz and low MHz range mesh 800 offers a high shielding factor of up to 108 dB (E-field). Mesh 800 is easy to process and can in some embodiments be cut with a standard pair of scissors or the like.

Figure 38:
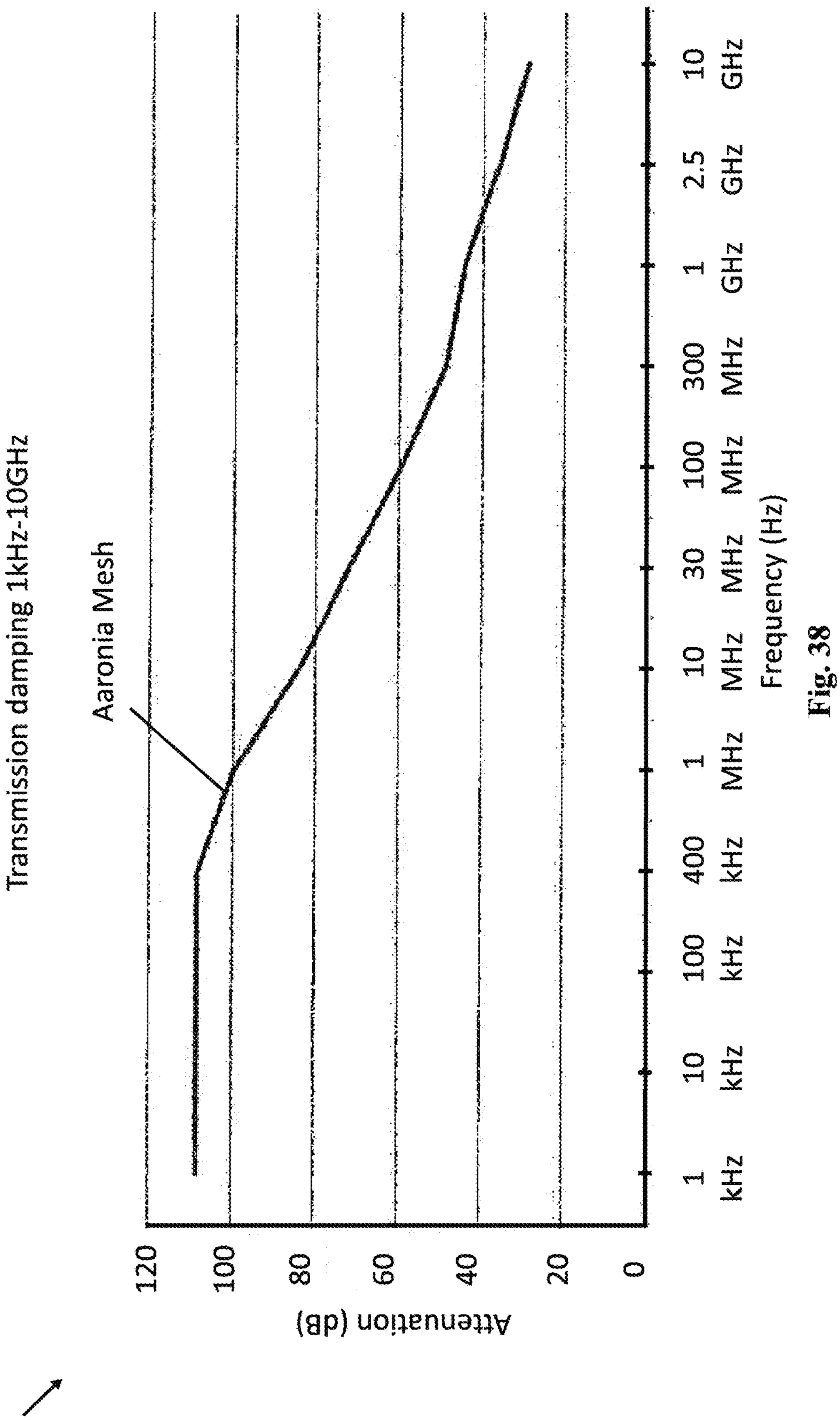
FIG. 38 is a transmission damping chart of the shielding mesh of FIG. 36.

FIG. 38 is a transmission damping chart 802 from 1-10 GHz in terms of dB for the fireproof mesh 800 of FIGS. 36 and 37.

Figure 39:
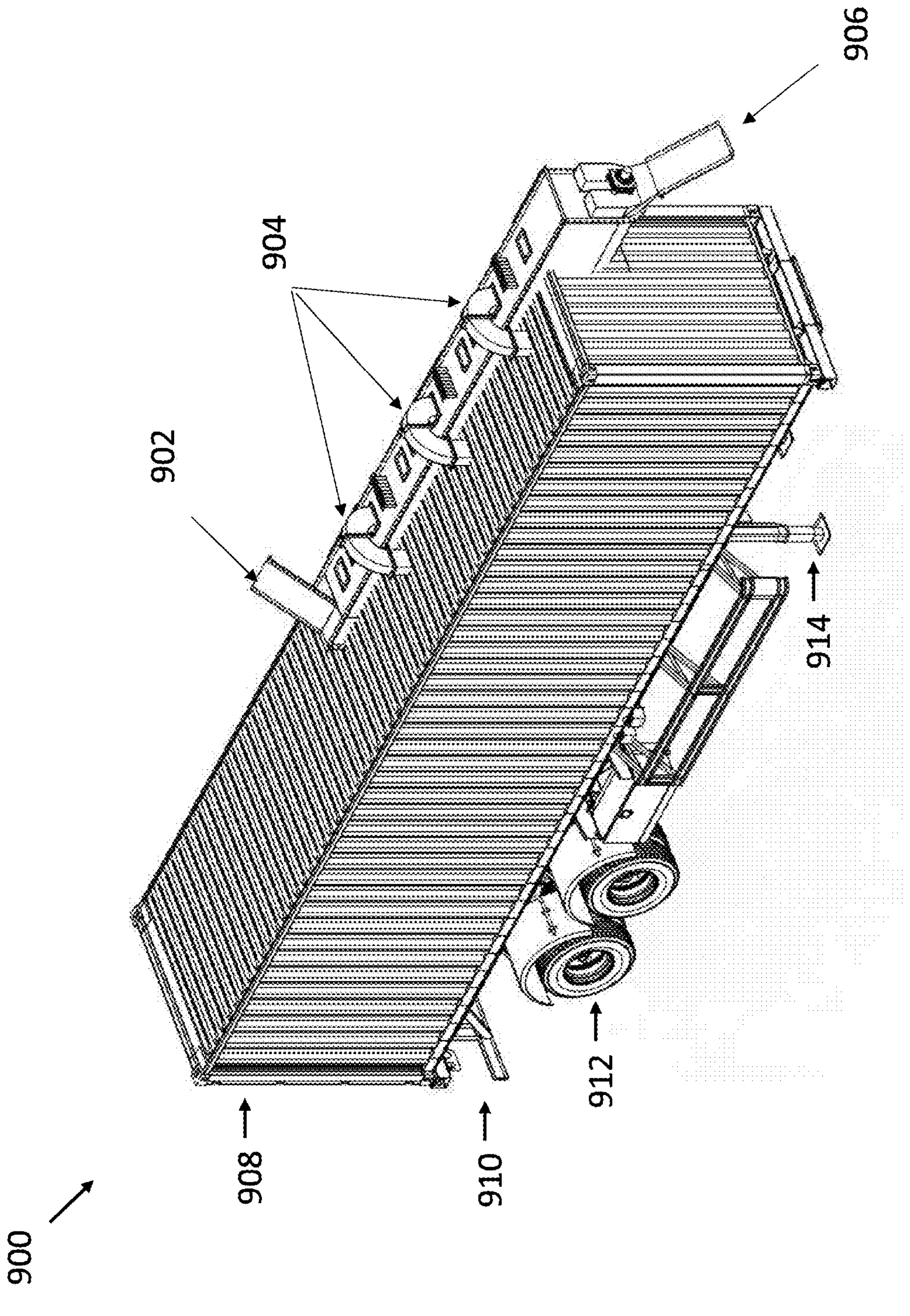
FIG. 39 is a perspective view of another embodiment of a portable, continuous material processing system.

FIG. 39 is a perspective view of another embodiment of a portable, continuous precursor material processing system 900. The system 900 includes a trailer 910 with wheels 912, and a body 908. The body 908 is preferably supported by the trailer 910 and can be removable in some embodiments. The body 908 can be a shipping container or a modified shipping container in various embodiments. As described in other embodiments herein, the system 900 includes an inlet 902, one or more microwave waveguides 904, and an outlet 906, in addition to preferably including one or more microwave generators (not shown) internally to the body 908. The trailer 910 is also equipped optionally with one or more stabilizers 914, which can be used for leveling the system 900 when a tractor or truck (not shown) is removed from the trailer 910. The stabilizers 914 can be telescopic and adjustable in length. The system 900 is preferably substantially level when prepared for material heating operation. As the system 900 is portable and/or towable, it is easily transported between various material processing sites and/or facilities. Smaller and/or scaled down versions of the system 900 can meet certain target temperatures (or reaction points) and heating times according to certain physical and mechanical limitations and constraints. System 900 also optionally includes one or more mechanical processing apparatuses as described herein, either internally or externally.

With reference to portable systems such as 900, in some embodiments a mining site or processing facility can be equipped with an auger configured to deliver precursor material from a pile or truck hauling material to be processed. In some cases, a clearance height of the auger can be insufficient to get system 900 unit under the auger. An additional conveyor can in such cases be implemented to bridge a gap or otherwise connect a storage facility or source of material to the system 900. It is contemplated that some additional form of material handling equipment can be used to adapt system 900 to an existing system, setup, or facility.

As described in this disclosure, precursor material is an embodiment of one or more material to be heated and/or processed as described herein. Material, such as any natural or human-made or human-modified material, or any liquid, solids, or slurries thereof, can be heated and/or processed using microwaves as described in further detail herein. As discussed above, various materials to be processed as contemplated herein can be sourced from a surface, can be unearthed or removed from below ground, or can be otherwise removed or sourced from natural or man-made deposits. A product as used herein can denote a material in a state post-processing, or at least partially processed as disclosed herein.

As used in this disclosure, a conveyor or conveyor unit can be any vessel or mechanism that moves precursor material from an inlet to an outlet. The material being heated can be carried in various embodiments by another type of conveyance mechanism, such as by an auger or various types of conveyor belts or chains or the like. Therefore, in some alternative embodiments a conveyorized modular industrial microwave power system can be employed instead of an auger-based system such as system 100. A conveyor unit can also be referred to more generally as an auger.

Based on power requirements, two or more microwave power modules or heating units can be installed on the same conveyor. To assure uniform heat distribution in a large variety of load configurations, a multimode cavity can be provided with a waveguide splitter with dual microwave feed points and mode stirrers.

In embodiments that use a conveyor belt, a belt material and configuration are selected based on the nature of the material to be heated. Each end of the conveyor is preferably also provided with a special vestibule to suppress any microwave leakage. Air intake and exhaust vents or ports are provided for circulating air to be used in cases where vapors or fumes are developed during the heating process.

Unlike home microwave ovens, examples of industrial microwave-based heating systems contemplated herein preferably separate microwave generation from a heating/drying cavity such as a trough or housing of a conveyor unit. An industrial microwave heating system can be constructed to use one or more microwave generator units. Examples of microwave generators and heating units come in 75 kW and 100 kW (output power) models. Using specialized ducts called waveguides or microwave guides, the microwave energy is carried to one or more industrial microwave cavities. In a conveyor belt-based embodiment, a conveyor belt, auger, etc. carries the material through the cavities. A simple system may include one microwave generator and one cavity, while a larger and/or more complex system may have a dozen generators and six cavities. This inherent modularity provides great flexibility in scaling a system, or building systems, which can be easily expanded in the future.

In alternative embodiments, microwave suppression flap (s) can be rigid and non-flexible, but can be attached to top portion using hinges or any other articulating hardware as known in the art. Alternative hardware and flap fastening arrangements are also contemplated.

These and other advantages will be apparent to those of ordinary skill in the art. While the various embodiments of the invention have been described, the invention is not so limited. Also, the method and apparatus of the present invention is not necessarily limited to any particular field, but can be applied to any field where an interface between a user and a computing device is applicable.

Unless otherwise defined, all technical and scientific terms used in this disclosure have the same meaning as commonly understood by one of ordinary skill in the art to which this invention belongs. Although methods and materials similar to or equivalent to those described herein can be used in the practice or testing of the present invention, suitable methods, and materials are described below. All publications, patent applications, patents, and other references mentioned herein are incorporated by reference in their entirety to the extent allowed by applicable law and regulations. In case of conflict, the present specification, including definitions, will control.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention. Those of ordinary skill in the art that have the disclosure before them will be able to make modifications and variations therein without departing from the scope of the invention.

The disclosures of published PCT patent applications, PCT/US2017/023840 (WO2017165664), PCT/US2013/039687 (WO2013166489), PCT/US2013/039696 (WO2013166490), PCT/US2020/040464 (WO2021003250), and PCT/US2021/033145 (filed May 19, 2021), PCT/US2021/034241 (filed May 26, 2021) are each hereby incorporated by reference in their respective entireties for all purposes herein.

Selected embodiments of the present disclosure:

Embodiment 1. A system for processing precursor material, comprising:

at least one microwave generator;

at least one microwave guide operatively connecting the at least one microwave generator to at least a first conveyor unit;

the first conveyor unit provided in a first housing that comprises at least one opening configured to receive microwave energy via a first microwave guide; and wherein the first conveyor unit is configured to receive and process a quantity of precursor material, which includes heating the precursor material to a first temperature by applying microwave energy to the precursor material within the first housing.

Embodiment 2. The system of embodiment 1, wherein the quantity of precursor material is sourced from at least one mine.

Embodiment 3. The system of embodiment 1, wherein the quantity of precursor material contains ore.

Embodiment 4. The system of embodiment 1, wherein the quantity of precursor material contains tailings.

Embodiment 5. The system of embodiment 1, wherein the quantity of precursor material contains gemstone.

Embodiment 6. The system of embodiment 1, wherein the quantity of precursor material contains rock.

Embodiment 7. The system of embodiment 1, wherein the quantity of precursor material contains metal.

Embodiment 8. The system of embodiment 1, wherein the quantity of precursor material contains mineral.

Embodiment 9. The system of embodiment 1, wherein the quantity of precursor material is at least partially fractured by the applying the microwave energy to the precursor material.

Embodiment 10. The system of any preceding embodiment, further comprising a second conveyor unit, the second conveyor unit provided in a second housing that comprises at least one opening configured to receive microwave energy via a second microwave guide, wherein the second conveyor is configured to receive and process the quantity of precursor material, which includes heating the precursor material to a second temperature greater than the first temperature by applying microwave energy to the material within the second housing.

Embodiment 11. The system of any preceding embodiment, wherein the at least one microwave generator comprises a plurality of microwave generators.

Embodiment 12. The system of any preceding embodiment, wherein the at least one microwave guide comprises a plurality of microwave guides.

Embodiment 13. The system of any preceding embodiment, wherein the quantity of precursor material is at least partially quenched using a liquid applied to the precursor material.

Embodiment 14. The system of any preceding embodiment, wherein the quantity of precursor material being processed has an initial maximum particle or chunk size, and wherein the size is reduced to a second size by milling, crushing, shredding, screening, filtering, and/or sorting.

Embodiment 15. The system of any preceding embodiment, further comprising a third conveyor unit provided in a third housing that comprises at least one opening configured to receive microwave energy via a third microwave guide, and wherein the third conveyor is configured to receive and process the quantity of precursor material, which includes heating the quantity of precursor material to a third temperature greater than the second temperature by applying microwave energy to the material within the third housing.

Embodiment 16. The system of any preceding embodiment, further comprising a first loader unit configured to receive and feed the precursor material to the first conveyor unit.

Embodiment 17. The system of any preceding embodiment, further comprising at least one microwave suppression system, comprising:

at least an inlet and an outlet; and a tunnel within at least one of the inlet and outlet that comprises at least one flexible and/or movable microwave reflecting component within the tunnel, and wherein at least a portion of the at least one movable microwave reflecting component is configured to be deflected as the material passes through the tunnel and then returning to a resting, closed position when the material is no longer passing through the tunnel.

Embodiment 18. The system of any preceding embodiment, wherein the movable microwave reflecting component is a mesh flap.

Embodiment 19. The system of any preceding embodiment, wherein the movable microwave reflecting component comprises stainless steel.

Embodiment 20. The system of any preceding embodiment, wherein the movable microwave reflecting component is coated with a protective material.

Embodiment 21. The system of any preceding embodiment, wherein the protective material is selected from the group consisting of silicone, Teflon, polyurethane, and plastic.

Embodiment 22. The system of any preceding embodiment, wherein the movable microwave reflecting component comprises a plurality of strips.

Embodiment 23. The system of any preceding embodiment, wherein the movable microwave reflecting component comprises a plurality of chains.

Embodiment 24. The system of any preceding embodiment, further comprising at least a second microwave suppression system.

Embodiment 25. The system of any preceding embodiment, wherein at least one of the first, second, and third conveyor units comprises at least one helical auger.

Embodiment 26. The system of any preceding embodiment, further comprising a motor configured to rotate the at least one helical auger.

Embodiment 27. The system of any preceding embodiment, wherein the motor has a power rating of approximately 50-150 kilowatts.

Embodiment 28. The system of any preceding embodiment, wherein the motor has a power rating of approximately 70-130 kilowatts.

Embodiment 29. The system of any preceding embodiment, wherein the motor has a power rating of approximately 80-110 kilowatts.

Embodiment 30. The system of any preceding embodiment, wherein the motor has a power rating of approximately 90-100 kilowatts.

Embodiment 31. The system of any preceding embodiment, further comprising a mechanical processing apparatus configured to receive the quantity of precursor material being processed from a conveyor unit, wherein the quantity of precursor material enters a different conveyor unit after exiting the mechanical processing apparatus.

Embodiment 32. The system of any preceding embodiment, wherein the mechanical processing apparatus is a hammer mill, crusher, pugmill, a drum mixer, or a mixing chamber.

Embodiment 33. The system of any preceding embodiment, further comprising a lifting conveyor configured to receive precursor material being processed from the mixer and configured to lift the quantity of precursor material vertically before the precursor material enters a different conveyor unit.

Embodiment 34. The system of any preceding embodiment, wherein the quantity of precursor material being processed comprises a product to be dried.

Embodiment 35. The system of any preceding embodiment, wherein the product comprises a slurry.

Embodiment 36. The system of any preceding embodiment, wherein the quantity of precursor material being processed contains at least some water.

Embodiment 37. The system of any preceding embodiment, wherein the quantity of precursor material being processed contains ninety percent or less water by weight.

Embodiment 38. The system of any preceding embodiment, wherein the quantity of precursor material being processed contains at least five percent water by weight.

Embodiment 39. The system of any preceding embodiment, wherein the quantity of precursor material being processed contains at least ten percent water by weight.

Embodiment 40. The system of any preceding embodiment, wherein the quantity of precursor material being processed contains between twenty and ninety percent water by weight.

Embodiment 41. The system of any preceding embodiment, wherein the quantity of precursor material being processed contains between fifty and ninety percent water by weight.

Embodiment 42. The system of any preceding embodiment, further comprising at least one heat exchanger apparatus configured to recover a heat byproduct from the material being processed.

Embodiment 43. The system of any preceding embodiment, wherein the heat byproduct is recovered from the heating of the water within the material being processed.

Embodiment 44. The system of any preceding embodiment, wherein each conveyor unit is configured to receive between 1 and 30 microwave guides via corresponding openings.

Embodiment 45. The system of any preceding embodiment, wherein each conveyor unit is configured to receive between 7 and 10 microwave guides via corresponding openings.

Embodiment 46. The system of any preceding embodiment, wherein the quantity of precursor material being processed receives about 0.33 and 0.44 kilowatts of microwave power per pound, including any moisture present within the material.

Embodiment 47. The system of any preceding embodiment, wherein the quantity of precursor material being processed receives less than 0.33 kilowatts of microwave power per pound, including any moisture present within the material.

Embodiment 48. The system of any preceding embodiment, wherein each conveyor unit has a weight capacity of at least 500 pounds of precursor material.

Embodiment 49. The system of any preceding embodiment, wherein each conveyor unit has a weight capacity of at least 8,500 pounds of precursor material.

Embodiment 50. The system of any preceding embodiment, wherein each conveyor unit has a weight capacity of at least 40,000 pounds of precursor material.

Embodiment 51. The system of any preceding embodiment, wherein the first conveyor unit comprises a baffle configured to restrict the quantity of precursor material being processed as it proceeds through the first housing.

Embodiment 52. The system of any preceding embodiment, wherein an additive is added to the quantity of precursor material being processed.

Embodiment 53. The system of any preceding embodiment, wherein the quantity of precursor material being processed has a maximum largest dimension of eight inches.

Embodiment 54. The system of any preceding embodiment, wherein the quantity of precursor material being processed has a maximum largest dimension of six inches.

Embodiment 55. The system of any preceding embodiment, further comprising an impactor, shredder, mixer, mesh, screen, filter, brush, mill, or other suitable mechanical device configured to perform a comminution or sorting process or otherwise reduce a maximum largest dimension or increase the density of the quantity of precursor material being processed.

Embodiment 56. The system of any preceding embodiment, wherein the system processes between about 10 tons and about 1000 tons of precursor material per hour.

Embodiment 57. The system of any preceding embodiment, wherein the system processes between about 50 tons and about 100 tons of precursor material per hour.

Embodiment 58. The system of any preceding embodiment, wherein at least some of the quantity of precursor material being processed is milled, crushed, shredded, or reduced in size within or prior to entering the first conveyor unit.

Embodiment 59. The system of any preceding embodiment, wherein the system is modular and portable.

Embodiment 60. The system of any preceding embodiment, wherein the system is contained within one or more trailers.

Embodiment 61. The system of any preceding embodiment, wherein the one or more trailers are transported to various processing locations on demand.

Embodiment 62. The system of any preceding embodiment, wherein at least one conveyor unit comprises a heated auger.

Embodiment 63. The system of any preceding embodiment, wherein the heated auger is a jacketed auger.

Embodiment 64. The system of any preceding embodiment, wherein at least one conveyor unit comprises a non-stick coating.

Embodiment 65. The system of any preceding embodiment, wherein at least one conveyor unit is thermally insulated.

Embodiment 66. The system of any preceding embodiment, wherein the quantity of precursor material is heated to a target fracture temperature, wherein the target fracture temperature is based on dielectric properties of the quantity of precursor material.

Embodiment 67. A method of processing material, comprising:
- receiving a quantity of precursor material at a first conveyor unit provided in a first housing; and
- performing a first processing step to the quantity of precursor material within the first conveyor unit using at least one microwave generator coupled to the housing of the first conveyor unit, wherein the precursor material is heated within the first conveyor unit.

Embodiment 68. The method of embodiment 67, further comprising:
- receiving the quantity of precursor material at a mechanical processing apparatus, wherein a mixing step is performed to the precursor material within the mechanical processing apparatus.

Embodiment 69. The method of any preceding embodiment, wherein at least some of the quantity of precursor material is milled, crushed, shredded, mixed, blended, sorted, reduced in size, and/or homogenized before or during the first processing step.

Embodiment 70. The method of any preceding embodiment, further comprising:
- receiving the quantity of precursor material at a second conveyor unit provided in a second housing; and
- performing a second processing step to the quantity of precursor material within the second conveyor unit using the at least one microwave generator coupled to the housing of the second conveyor, wherein the precursor material is heated to a greater temperature in the second processing step than in the first processing step.

Embodiment 71. The method of any preceding embodiment, further comprising:
- receiving the quantity of precursor material at a third conveyor unit provided in a third housing; and
- performing a third processing step to the quantity of precursor material within the third conveyor unit using the at least one microwave generator coupled to the housing of the third conveyor, wherein the precursor material is heated to a greater temperature in the third processing step than in the first or second processing steps.

Embodiment 72. The method of any preceding embodiment, wherein the quantity of precursor material received at the mixer is received from a conveyor unit, and wherein the precursor material enters a different conveyor unit after exiting the mixer.

Embodiment 73. The method of any preceding embodiment, wherein the at least first conveyor unit comprises a number and arrangement of conveyor units selected such that a desired result is reached.

Embodiment 74. The method of any preceding embodiment, wherein at least two conveyor units are arranged in series.

Embodiment 75. The method of any preceding embodiment, wherein at least two conveyor units are arranged in parallel.

Embodiment 76. The method of any preceding embodiment, wherein a processing speed of the at least one conveyor unit is adjusted based on the series or parallel arrangement.

Embodiment 77. The method of any preceding embodiment, wherein the processing speed can be reduced to increase heating, or can be increased to reduce heating of the quantity of precursor material being processed in the at least one conveyor unit.

Embodiment 78. The method of any preceding embodiment, wherein for a given processing speed, two or more conveyor units operating in parallel increases a precursor material throughput based at least on the number of parallel conveyor units.

Embodiment 79. The method of any preceding embodiment, further comprising using a microwave radar of a frequency different than any heating microwaves to perform at least a level measurement.

Embodiment 80. The method of any preceding embodiment, wherein based on the level measurement at least one of a processing speed and heating power is adjusted.

Embodiment 81. A product made by any system or method of any preceding embodiment.

Embodiment 82. A product or system of any preceding embodiment wherein processing of the quantity of precursor material is continuous.

Embodiment 83. A product or system of any preceding embodiment wherein processing of the quantity of precursor material is in batches.

Embodiment 84. A method for portably providing precursor material processing upon demand, comprising:
- receiving a request for processing a first quantity of precursor material at a first location;
- determining that the first location has a first group of characteristics that include at least a distance from the first location to an external power source of a first power output and a distance from a source of the precursor material;
- deploying a portable system for processing precursor material at the first location based on at least the first quantity of precursor material and the first group of characteristics, the portable system comprising:
- at least one power generator configured to provide at least the first power output,
- at least one microwave generator operatively coupled to the power generator,
- at least one conveyor unit configured to receive and process a quantity of precursor material to achieve at least a target temperature for a target time; and
- applying microwave energy to the precursor material within the conveyor unit of the portable system.

Embodiment 85. The method of embodiment 84, wherein the processing of the quantity of precursor material operates continuously.

Embodiment 86. The method of embodiment 84, wherein the processing of the quantity of precursor material operates in batches.

Embodiment 87. A microwave suppression system, comprising:
- at least an inlet and an outlet; and
- a tunnel within at least one of the inlet and outlet that comprises at least one movable mesh flap within the tunnel,
- wherein the at least one movable mesh flap is configured to absorb, deflect, or block microwave energy, and
- wherein the at least one movable mesh flap is configured to be deflected as a quantity of precursor material passes through the tunnel and then to return to a resting, closed position when the precursor material is no longer passing through the tunnel.

Embodiment 88. The microwave suppression system of embodiment 87, wherein the movable mesh flap comprises stainless steel.

Embodiment 89. The microwave suppression system of embodiment 87, wherein the microwave suppression system operates to process precursor material continuously.

Embodiment 90. An apparatus for processing precursor material, comprising:

a conveyor unit comprising a helical auger having an auger shaft provided along an auger rotational axis, the auger configured to rotate in a direction such that a quantity of precursor material received at the conveyor unit is caused to be transported according the auger rotational axis; and at least one microwave energy generator, each microwave energy generator being operatively connected to a respective microwave guide configured to cause microwaves emitted by the microwave energy generator to heat the precursor material within the conveyor unit by converting the microwaves to heat when absorbed by at least a portion of the quantity of precursor material within the conveyor unit;

wherein the quantity of precursor material is heated using the microwave energy, and wherein the quantity of precursor material is caused to exit the conveyor unit after being heated to a target temperature.

Embodiment 91. The apparatus of embodiment 90, wherein the apparatus processes the quantity of precursor material continuously.

Embodiment 92. The apparatus of embodiment 90, wherein the auger shaft defines an internal auger fluid path provided along the auger rotational axis, and further comprising a fluid management device configured to heat the auger and transfer heat to the quantity of precursor material through the auger, wherein the quantity of precursor material is heated using a combination of the microwave energy and fluidic heat.

Embodiment 93. The apparatus of embodiment 90, further comprising:

a material inlet and a material outlet;

a tunnel within at least one of the precursor material inlet and material outlet that comprises a microwave suppression system;

at least one movable mesh flap within the tunnel, wherein the at least one mesh flap is configured to absorb, deflect, or block microwave energy, and wherein the at least one movable mesh flap is configured by be deflected as the precursor material passes through the tunnel and then returning to a resting, closed position when the material is no longer passing through the tunnel.

Embodiment 94. The apparatus of embodiment 93, wherein the movable mesh flap comprises stainless steel.

Embodiment 95. A method of processing material using microwave energy, comprising:

receiving a quantity of precursor material at a conveyor unit comprising an auger, wherein the precursor material passes through at an inlet microwave suppression tunnel before entering the conveyor unit;

transporting the quantity of precursor material along the conveyor unit by causing the auger to rotate;

heating the quantity of precursor material within the conveyor unit using at least one microwave generator operatively connected to a respective microwave guide configured to cause microwaves emitted by the microwave energy generator to heat the quantity of precursor material within the conveyor unit by converting the microwaves to heat when absorbed by at least a portion of the quantity of precursor material within the conveyor unit; and causing the heated quantity of precursor material to exit the conveyor unit through an outlet microwave suppression tunnel, wherein the quantity of precursor material that exits the conveyor unit is a reusable product.

Embodiment 96. The method of embodiment 95, wherein the quantity of precursor material is heated to a target temperature before being caused to exit the conveyor unit.

Embodiment 97. The method of embodiment 95, wherein the quantity of precursor material is heated such that it is at least partially fractured or prepared for fracturing.

Embodiment 98. The method of embodiment 95, wherein the inlet suppression tunnel comprises:

at least one inlet movable mesh flap within the inlet suppression tunnel, wherein the at least one inlet movable mesh flap is configured to absorb, deflect, or block microwave energy, and wherein the at least one inlet movable mesh flap is configured to be deflected as the quantity of precursor material passes through the inlet suppression tunnel and then to return to a resting, closed position when the quantity of precursor material is no longer passing through the inlet suppression tunnel.

Embodiment 99. The method of embodiment 98, wherein the inlet movable mesh flap comprises stainless steel.

Embodiment 100. The method of embodiment 95, wherein the outlet suppression tunnel comprises:

at least one outlet movable mesh flap within the outlet suppression tunnel, wherein the at least one outlet movable mesh flap is configured to absorb, deflect, or block microwave energy, and wherein the at least one outlet movable mesh flap is configured to be deflected as the quantity of precursor material passes through the outlet suppression tunnel and then to return to a resting, closed position when the quantity of precursor material is no longer passing through the outlet suppression tunnel.

Embodiment 101. The method of embodiment 100, wherein the outlet movable mesh flap comprises stainless steel.

Embodiment 102. The method of embodiment 95, wherein the processing of the precursor material operates continuously.

Embodiment 103. A method for sharing portable precursor material processing, comprising:

receiving a request for processing a first quantity of precursor material at a first location and a second location separate from the first location;

determining that the first location has a first group of characteristics;

determining that the second location has a second group of characteristics deploying a portable system for processing precursor material at the first location or the second location based on at least the first quantity of precursor material and the first group of characteristics or the second quantity of precursor material and the second group of characteristics, the portable system comprising:

at least one power generator configured to provide at least the first power output, at least one microwave generator operatively coupled to the power generator, at least one conveyor unit configured to receive and process a quantity of precursor material to achieve at least a target temperature for a target time; and applying microwave energy to the first or second quantity precursor material within the conveyor unit of the portable system.

Embodiment 104. The method of embodiment 103, wherein the target temperature achieved by the quantity of precursor material and the target time are defined based on a desired degree of fracture, separation, loosening, and/or expansion to be experienced by at least a portion of the quantity of precursor material.

Embodiment 105. The system, apparatus, or method of any preceding embodiment, wherein the quantity of precursor material is cooled to a temperature lower than ambient temperature prior to the first conveyor unit receiving and processing the quantity of precursor material.

Embodiment 106. The system, apparatus, or method of embodiment 105, wherein a quantity of liquid is added to the quantity of precursor material prior to the cooling.

Embodiment 107. The system, apparatus, or method of embodiment 105 or 106, wherein the cooling comprises at least some freezing.

Embodiment 108. The system of embodiment 52, wherein the additive comprises cyanide.

Embodiment 109. The system, apparatus, or method of any preceding embodiment, wherein the precursor material comprises copper tailings.

Embodiment 110. The system, apparatus, or method of any preceding embodiment, wherein at least one conveyor unit comprises a conveyor belt.

Embodiment 111. The system, apparatus, or method of any preceding embodiment, wherein the precursor material comprises more than one constituent substance.

Embodiment 112. The system, apparatus, or method of any preceding embodiment, wherein the precursor material comprises a first constituent substance with a first rate of reaction or expansion when microwave energy is received, and a second constituent substance with a second rate of reaction or expansion when microwave energy is received.

Embodiment 113. The system, apparatus, or method of any preceding embodiment, wherein a difference between the first rate of reaction or expansion and the second rate of reaction or expansion assists thermally-assisted liberation (TAL) of at least one constituent substance of the precursor material.

Embodiment 114. The system, apparatus, or method of any preceding embodiment, wherein the precursor material comprises at least a primary ore.

Embodiment 115. The system, apparatus, or method of any preceding embodiment, wherein the precursor material comprises at least a primary ore and a secondary ore.

The invention claimed is:

1. A system for processing precursor material, comprising:

at least one microwave generator;

a first conveyor unit;

at least a first microwave guide operatively connecting the at least one microwave generator to at least the first conveyor unit;

the first conveyor unit provided in a first housing that comprises at least one opening configured to receive microwave energy via the first microwave guide; and at least one microwave suppression tunnel comprising at least one flexible and/or movable microwave reflecting component within the tunnel, wherein the microwave reflecting component comprises a mesh flap configured to absorb, deflect, and/or block microwave energy, wherein the first conveyor unit is configured to receive and process a quantity of precursor material comprising at least two constituent substances, the system being configured to apply microwave energy to the precursor material within the first housing at a first processing step, wherein at least a portion of the microwave reflecting component is configured to be deflected as the precursor material passes through the tunnel and then to return to a resting, closed position when the precursor material is no longer passing through the tunnel, and wherein the precursor material comprises at least a) a first constituent substance with a first rate of reaction or expansion when microwave energy is applied, and b) a second constituent substance with a second rate of reaction or expansion when microwave energy is applied.

2. The system according to claim 1, wherein the mesh flap comprises metallic shielding.

3. The system according to claim 1, wherein the tunnel is either:

a) an inlet microwave suppression tunnel associated with an inlet of the first conveyor unit, or b) an outlet microwave suppression tunnel associated with an outlet of the first conveyor unit.

4. The system according to claim 1, wherein the first processing step comprises heating the precursor material to a first temperature.

5. The system according to claim 4, wherein the first temperature is a temperature associated with at least one precursor material characteristic.

6. The system according to claim 4, wherein the first temperature achieves at least some thermally-assisted liberation (TAL) of at least one of the first and second constituent substances of the precursor material.

7. The system according to claim 1, further comprising a second conveyor unit, the second conveyor unit provided in a second housing that comprises at least one opening configured to receive microwave energy via a second microwave guide, wherein the second conveyor unit is configured to receive the quantity of precursor material, and is further configured to apply microwave energy to the precursor material within the second housing at a second processing step.

8. The system according to claim 7, wherein the first processing step comprises heating the precursor material to a first temperature, wherein the second processing step comprises heating the precursor material to a second temperature, and wherein the second temperature is greater than the first temperature.

9. The system according to claim 8, wherein the heating the precursor material to at least one of the first temperature and the second temperature is configured to achieve a reaction of at least a portion of the quantity of precursor material, and wherein the reaction relates to a fracture, separation, loosening, expansion, and/or dielectric stress to be experienced by at least a portion of the quantity of precursor material.

10. The system according to claim 1, wherein the precursor material is processed for a first time period within the first housing.

11. The system according to claim 1, wherein the precursor material is cooled prior to, during, and/or after the first processing step.

12. The system according to claim 11, wherein the cooling comprises quenching.

13. The system according to claim 1, wherein the first and second constituent substances comprise a primary ore and a secondary ore.

14. The system according to claim 1, wherein a difference between the first rate of reaction or expansion and the second rate of reaction or expansion assists thermally-assisted liberation (TAL) of at least one of the first and second constituent substances of the precursor material.

15. The system according to claim 1, wherein the precursor material receives sufficient energy to reach a first reaction point during the first processing step, and wherein the first reaction point relates to a fracture, separation, expansion, and/or dielectric stress to be experienced by at least a portion of the quantity of precursor material.

16. The system according to claim 1, further comprising causing the precursor material to exit through an outlet microwave suppression tunnel after the precursor material a) reaches a first temperature and/or b) undergoes a reaction within at least the conveyor unit.

17. The system according to claim 1, wherein the precursor material comprises a mined material comprising rock, mineral, and/or any processable material relating to or associated with the mining industry.

18. A method, comprising the steps of:

receiving a quantity of precursor material comprising at least two constituent substances at a first conveyor unit, wherein the quantity of precursor material passes through at an inlet microwave suppression tunnel before entering the first conveyor unit;

transporting the quantity of precursor material along the first conveyor unit;

causing microwaves emitted by at least one microwave generator operatively connected to a respective microwave guide to process the quantity of precursor material within the first conveyor unit when the emitted microwaves are absorbed by at least a portion of the quantity of precursor material at a first processing step within the first conveyor unit; and causing the processed quantity of precursor material to exit through an outlet microwave suppression tunnel, wherein at least one of the inlet and the outlet microwave suppression tunnel comprises at least one flexible and/or movable mesh flap within the respective inlet/outlet microwave suppression tunnel, wherein the at least one mesh flap is configured to absorb, deflect, and/or block microwave energy, wherein at least a portion of the mesh flap is configured to be deflected as the quantity of precursor material passes through the respective inlet/outlet microwave suppression tunnel and then to return to a resting, closed position when the quantity of precursor material is no longer passing through the respective inlet/outlet microwave suppression tunnel, and wherein the quantity of precursor material comprises at least a) a first constituent substance with a first rate of reaction or expansion when microwave energy is applied, and b) a second constituent substance with a second rate of reaction or expansion when microwave energy is applied.

19. The method according to claim 18, wherein a difference between the first rate of reaction or expansion and the second rate of reaction or expansion assists thermally-assisted liberation (TAL) of at least one of the first and second constituent substances of the quantity of precursor material.

20. The method according to claim 18, wherein the quantity of precursor material receives sufficient energy to reach a first reaction point during the first processing step, and wherein the first reaction point relates to a fracture, separation, expansion, and/or dielectric stress to be experienced by at least a portion of the quantity of precursor material.

* * * * *